(12) United States Patent
Fonte et al.

(10) Patent No.: US 11,781,808 B2
(45) Date of Patent: Oct. 10, 2023

(54) BREWING AND COOLING A BEVERAGE

(71) Applicant: ColdSnap, Corp., Billerica, MA (US)

(72) Inventors: Matthew Fonte, Concord, MA (US); Benjamin Fichera, Newburyport, MA (US); Ian McGinty, Chelmsford, MA (US)

(73) Assignee: ColdSnap, Corp., Billerica, MA (US)

( * ) Notice: Subject to any disclaimer, the term of this patent is extended or adjusted under 35 U.S.C. 154(b) by 470 days.

(21) Appl. No.: 16/844,781

(22) Filed: Apr. 9, 2020

(65) Prior Publication Data

US 2020/0326124 A1 Oct. 15, 2020

Related U.S. Application Data

(60) Provisional application No. 62/831,666, filed on Apr. 9, 2019.

(51) Int. Cl.
| | |
|---|---|
| *F25D 31/00* | (2006.01) |
| *A47J 31/02* | (2006.01) |
| *A23G 9/28* | (2006.01) |
| *A47J 31/54* | (2006.01) |
| *A23G 9/52* | (2006.01) |
| *F25D 17/02* | (2006.01) |
| *A47J 31/34* | (2006.01) |

(52) U.S. Cl.
CPC ............ *F25D 31/005* (2013.01); *A23G 9/281* (2013.01); *A23G 9/52* (2013.01); *A47J 31/02* (2013.01); *A47J 31/34* (2013.01); *A47J 31/542* (2013.01); *F25D 17/02* (2013.01); *F25D 2400/28* (2013.01)

(58) Field of Classification Search
CPC .... F25D 31/005; F25D 17/02; F25D 2400/28; A23G 9/281; A23G 9/52; A23G 9/28; A47J 31/02; A47J 31/34; A47J 31/542
See application file for complete search history.

(56) References Cited

U.S. PATENT DOCUMENTS

| | | |
|---|---|---|
| 3,393,900 A | 7/1968 | Wagner et al. |
| 3,914,673 A | 10/1975 | Wallin |
| 3,951,289 A | 4/1976 | Landen |

(Continued)

FOREIGN PATENT DOCUMENTS

| | | | |
|---|---|---|---|
| DE | 602004009588 T2 * | 7/2008 | ............. B64D 13/00 |
| EP | 0471904 A1 | 2/1992 | |

(Continued)

OTHER PUBLICATIONS

U.S. Appl. No. 16/824,616, filed Mar. 19, 2020, Fonte et al.

(Continued)

*Primary Examiner* — Emmanuel E Duke

(74) *Attorney, Agent, or Firm* — Fish & Richardson P.C.

(57) ABSTRACT

A machine for brewing and cooling a beverage includes a housing, a refrigeration system, a first nest, a second nest, a fluid system, and a dispensing port. The first and second nests are arranged in the housing and include first and second recesses, respectively. The second nest has walls defining the second recess. The refrigeration system is located within the machine and is confirmed to cool the walls of the second nest. The fluid system is configured to transfer water to the first recess of the first nest. The dispensing port is fluidly connected with the recess of the first nest.

23 Claims, 41 Drawing Sheets

(56) References Cited

U.S. PATENT DOCUMENTS

| | | |
|---|---|---|
| 4,110,476 A | 8/1978 | Rhodes |
| 4,408,690 A | 10/1983 | Ferrero |
| 4,632,566 A | 12/1986 | Masel et al. |
| 4,664,529 A | 5/1987 | Cavalli |
| 4,784,886 A | 11/1988 | Wissgott |
| 4,827,732 A | 5/1989 | Suyama et al. |
| 4,913,645 A | 4/1990 | Daouse et al. |
| 5,264,237 A | 11/1993 | Traitler et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,823,675 A | 10/1998 | Myerly |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 7,211,283 B2 | 5/2007 | Jones et al. |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,628,811 B2 | 1/2014 | Panyam et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,351,503 B2 | 5/2016 | Amend et al. |
| 9,351,504 B2 | 5/2016 | Ricco et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,111,447 B2 | 10/2018 | Noth et al. |
| 10,117,445 B2 | 11/2018 | Imer |
| 10,334,868 B2 | 7/2019 | Fonte |
| 10,426,180 B1 | 10/2019 | Fonte |
| 10,543,978 B1 | 1/2020 | Fonte et al. |
| 10,612,835 B2 | 4/2020 | Fonte et al. |
| 2001/0052294 A1 | 12/2001 | Schmed |
| 2002/0001644 A1 | 1/2002 | Busse et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0178796 A1 | 8/2005 | Schraiber |
| 2005/0189375 A1 | 9/2005 | McGill |
| 2005/0193896 A1 | 9/2005 | McGill |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0255066 A1 | 11/2006 | Damiano et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |

(56) References Cited

U.S. PATENT DOCUMENTS

| | | |
|---|---|---|
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0282723 A1 | 11/2008 | Perrier et al. |
| 2009/0017149 A1 | 1/2009 | Richman |
| 2009/0090254 A1 | 4/2009 | Rusch |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0124599 A1 | 5/2010 | Saikali et al. |
| 2010/0132310 A1 | 6/2010 | Dose et al. |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0209562 A1 | 8/2010 | Henriet et al. |
| 2010/0209571 A1 | 8/2010 | Vaghela et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0351426 A1 | 12/2015 | Ricco et al. |
| 2015/0351430 A1 | 12/2015 | Pipe et al. |
| 2016/0135479 A1 | 5/2016 | Ummadi et al. |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0055761 A1* | 3/2017 | Roberts .................. A47J 31/407 |
| 2017/0079305 A1 | 3/2017 | Barniol Gutierrez et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0326749 A1 | 11/2017 | Amend |
| 2017/0332656 A1 | 11/2017 | Amend |
| 2017/0339976 A1 | 11/2017 | Amend |
| 2017/0360061 A1* | 12/2017 | Fonte ..................... A23G 9/224 |
| 2017/0367371 A1 | 12/2017 | Lebleu et al. |
| 2018/0042279 A1 | 2/2018 | Kerler et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0146695 A1 | 5/2018 | Amend et al. |
| 2018/0146699 A1 | 5/2018 | Vafeiadi et al. |
| 2018/0177545 A1 | 5/2018 | Noth |
| 2018/0213816 A1 | 8/2018 | Amend |
| 2018/0263274 A1 | 9/2018 | Ray et al. |
| 2018/0271115 A1 | 9/2018 | Ray et al. |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0325182 A1 | 10/2019 | Noth et al. |
| 2019/0329948 A1 | 10/2019 | Ritzenhoff et al. |
| 2020/0056814 A1 | 2/2020 | Fonte et al. |
| 2020/0056835 A1 | 2/2020 | Fonte et al. |

FOREIGN PATENT DOCUMENTS

| | | |
|---|---|---|
| EP | 1907300 | 4/2008 |
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 250108 A1 | 9/1982 |

(56) References Cited

FOREIGN PATENT DOCUMENTS

| WO | WO 1996/001224 | | 1/1996 | | |
|---|---|---|---|---|---|
| WO | WO 2004/054380 A1 | | 7/2004 | | |
| WO | WO 2015/077825 A1 | | 11/2006 | | |
| WO | WO 2010/103483 A2 | | 9/2010 | | |
| WO | WO 2013/121421 | | 8/2013 | | |
| WO | WO 2015/063092 | | 5/2015 | | |
| WO | WO 2015/063094 A1 | | 5/2015 | | |
| WO | WO-2015100250 A1 | * | 7/2015 | ............. | A47J 31/24 |
| WO | WO 2016/079641 | | 5/2016 | | |
| WO | WO 2016/081477 A2 | | 5/2016 | | |
| WO | WO 2017/087970 A2 | | 5/2017 | | |
| WO | WO 2017/139395 A1 | | 8/2017 | | |
| WO | WO-2018039675 A1 | * | 3/2018 | ............. | A23F 5/243 |
| WO | WO-2018156361 A1 | * | 8/2018 | ............. | A23F 5/262 |

OTHER PUBLICATIONS

EP Extended Search Report in European Appln. No. 17814210.5, dated Jan. 20, 2020, 11 Pages.

PCT International Search Report and Written Opinion in International Appln. No. PCT/US17/37972, dated Oct. 27, 2017, 16 pages.

PCT International Search Report and Written Opinion in International Appln. No. PCT/US19/13286, dated May 31, 2019, 21 pages.

PCT International Search Report and Written Opinion in International Appln. No. PCT/US2019/013286, dated Jan. 11, 2019, 21 pages.

PCT International Search Report and Written Opinion in International Appln. No. PCT/US2019/046946, dated Jan. 24, 2020.

PCT International Search Report and Written Opinion in International Appln. No. PCT/US2019/046954, dated Nov. 21, 2019, 20 pages.

PCT International Search Reportand Written Opinion in International Appln. No. PCT/US2019/046954, dated Sep. 21, 2019, 20 pages.

PCT Invitation to Pay Additional Fees in International Appln. No. PCT/US2019/013286, dated Apr. 4, 2019, 19 pages.

PCT Invitation to Pay Additional Fees in International Appln. No. PCT/US2019/046946, dated Dec. 2, 2019, 19 pages.

U.S. Notice of Allowance in U.S. Appl. No. 16/592,031, dated Jan. 10, 2020, 8 pages.

Xiao, "This New Kitchen Gadget Makes Fro-Yo in Minutes," by Bloomberg, Aug. 8, 2017, retrieved from URL <http://fortune.com/2017/08/08/wim-frozen-yogurt-minutes>, dated Oct. 12, 2018, 4 pages.

* cited by examiner

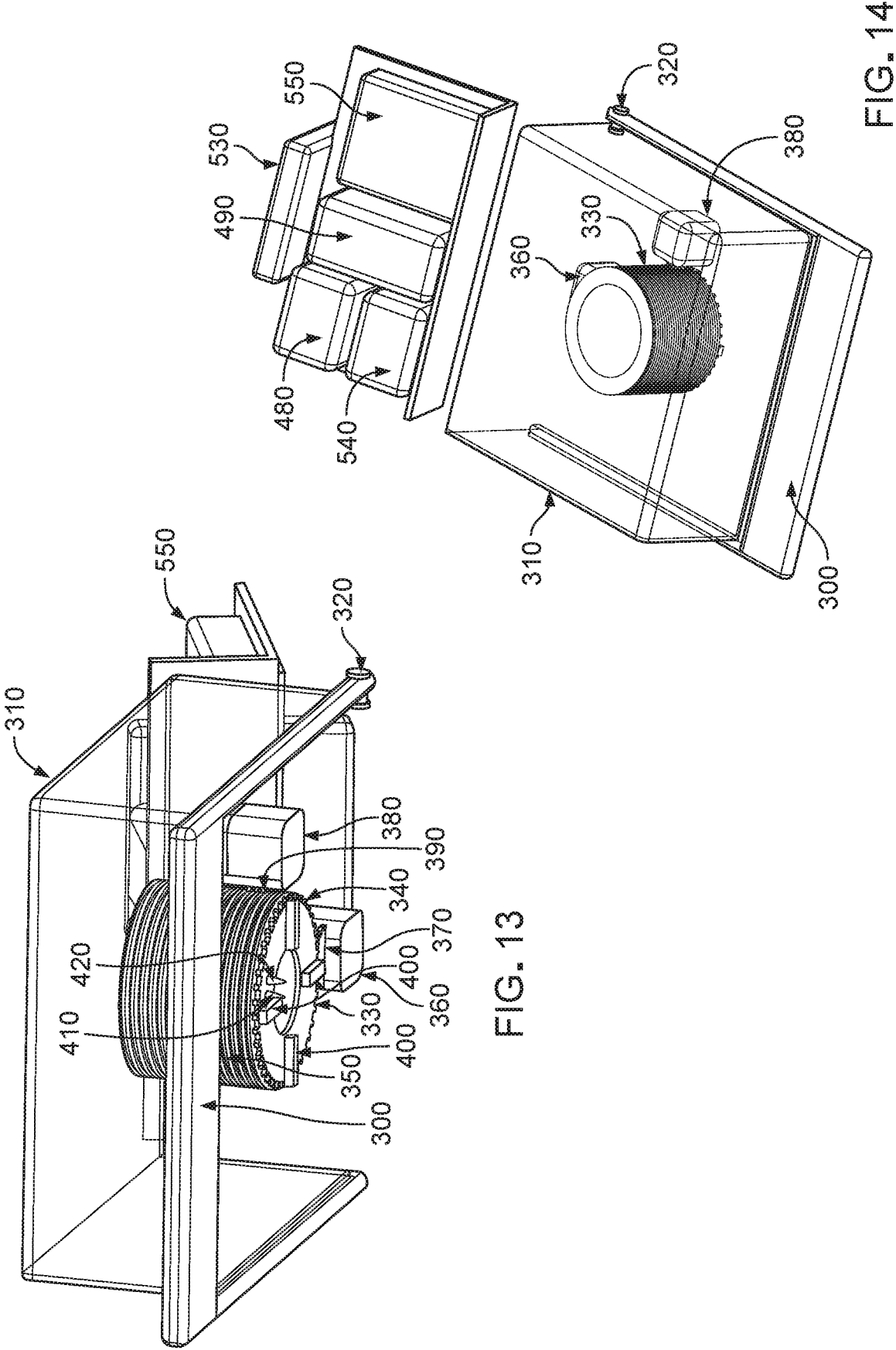

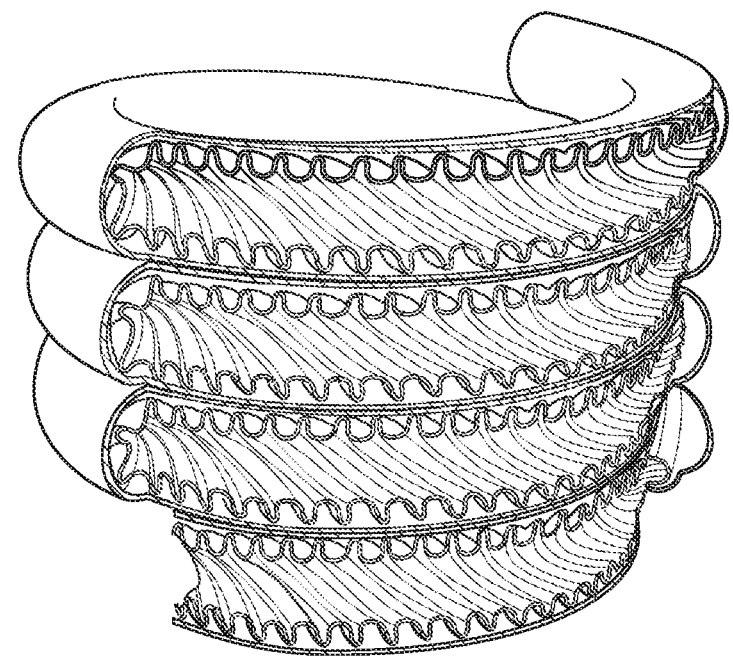
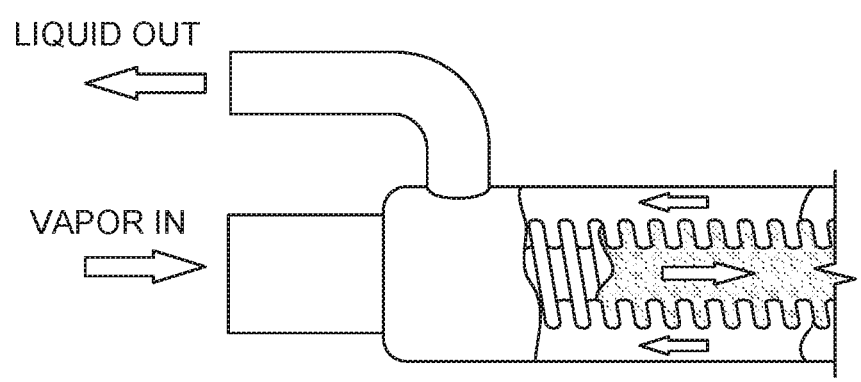
FIG. 37

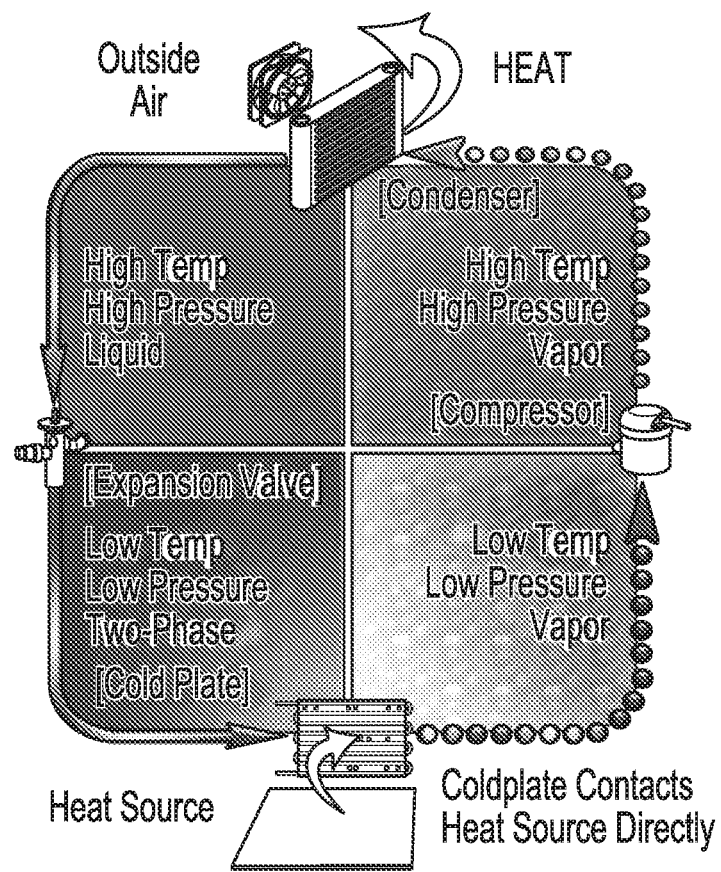
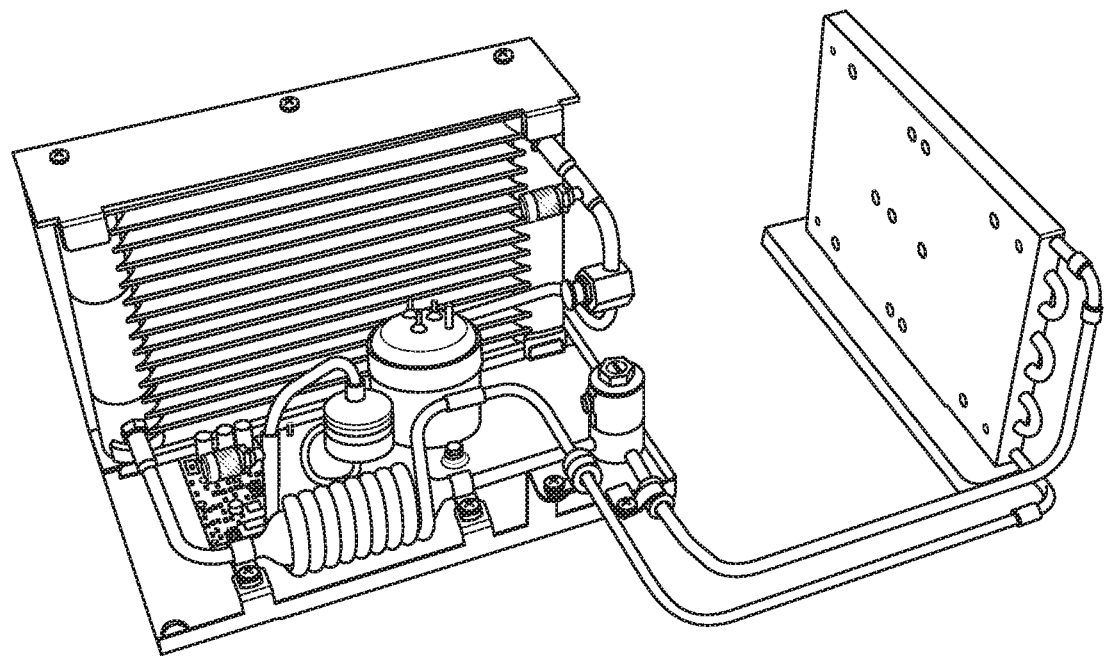
FIG. 38

BREWING AND COOLING A BEVERAGE

CROSS-REFERENCE TO RELATED APPLICATIONS

Pursuant to 35 USC § 119(e), this application claims the benefit of prior U.S. Provisional Application 62/831,666, filed Apr. 9, 2019. The application is incorporated by reference in its entirety.

TECHNICAL FIELD

This specification relates generally to systems for brewing and then cooling a beverage and systems for providing a frozen confection.

BACKGROUND

Current domestic ice cream makers are generally designed to produce relatively large batches of ice cream, typically ranging from 1.0 liter to 2.0 liters or more, in a time period of approximately 20-60 minutes. In addition, most current domestic ice cream makers also require that the containers (within which the ice cream will be produced) be "frozen" before making the ice cream, i.e., the container must be placed in a freezer for approximately 4-8 hours before use. Thus, there is a substantial delay between the time that the making of the ice cream commences and the time that the batch of ice cream is completed. Furthermore, even after the batch of ice cream has been completed, it is still necessary to manually remove the ice cream from the ice cream maker, and then it is also necessary to scoop out single servings of the ice cream into a separate container (e.g., a bowl, a cone, etc.) for consumption.

SUMMARY

This specification describes systems and methods for rapidly cooling food and drinks. Some devices and methods provide a single serving of a frozen confection, in a reduced period of time, which is dispensed directly into the container (e.g., a bowl, a cone, etc.) from which it will be consumed. The novel system is small enough to fit onto kitchen countertops, fit underneath kitchen cabinets (which are typically 18 inches in height or less), be powered by 120 volt kitchen electric wall sockets with a maximum of 1800 watts, and weigh less than 50 lbs. The novel system is capable of making at least 5 fluid ounces of frozen confection in approximately 5 minutes or less and is capable of producing at least 4 batches of frozen confection sequentially without any lag time between the batches. The same system is also capable of providing a single serving of a cold beverage, and/or a single serving of a hot beverage.

Some devices and methods for brewing and cooling a beverage include a method of inserting a pod into a recess of a machine for providing the beverage, the pod comprising granulated ingredients and a filter. The method includes displacing a cap of the pod, by a plunger, into the pod, the plunger being used to compress the graduated ingredients and the filter. The method includes heating water within the machine using a refrigeration system of the machine. The method includes flowing the heated water through the compressed granulated ingredients and through the filter of the pod to brew a brewed beverage. The method includes dispensing the brewed beverage from the pod.

Some devices and methods include a method for providing a single serving of ice cream. The method includes providing a pod including a tapered body having a smaller first end, a larger second end and a side wall extending between, the tapered body defining an interior. The method includes providing a cap permanently mounted to the larger second end of the tapered body. The method includes providing a scraper mixing paddle movably disposed within the interior of the tapered body, the scraper mixing paddle including a blade. The method includes providing an exit port formed in the first end of the tapered body and communicating with the interior of the tapered body. The method includes providing an ingredient for providing a single serving of ice cream when cooled. The method includes providing a nest including a tapered cavity having a smaller first end, a larger second end and a side wall extending between. The method includes inserting the pod into the second end of the tapered cavity of the nest and causing the side wall of the tapered body of the pod to seat substantially flush against the side wall of the tapered cavity of the nest. The method includes cooling the nest and rotating the scraper mixing paddle so as to stir the ingredient as the ingredient is converted into ice cream, with the blade of the scraper mixing paddle contacting, and riding against and scraping, the side wall of the pod. The method includes opening the exit port and dispensing the ice cream from the pod through the exit port.

Some devices and methods for brewing and cooling a beverage include a machine with a pod located within a recess of the machine, the pod including granulated ingredients and a filter. The machine includes a receptacle of the machine. The machine includes a first fluid connection between a fluid reservoir and the pod configured to transfer water from the reservoir to the pod. The machine includes a second fluid connection between the pod and the receptacle configured to transfer a brewed beverage from the first pod to the receptacle. The machine includes a refrigeration system configured to heat the water and cool the receptacle. The machine includes a controller within the machine, the controller configured to heat the water, press the granulated ingredients, flow water into the pod using the first fluid connection, flow water through the filter, flow the beverage into the receptacle using the second fluid connection, cool the beverage, and dispense the beverage from the machine.

Some devices and methods for brewing and cooling a beverage include a machine with a housing. The machine includes a refrigeration system located within the housing and configured to provide heating of water and cooling of a beverage within the machine. The machine includes a first receptacle located within the housing, the first receptacle being accessible to a user of the machine and configured to hold granulated ingredients and a filter. The machine includes a fluid system configured to transfer water through the granulated ingredients and the filter within the first receptacle to create a beverage. The machine includes a second receptacle located within the housing, the second receptacle being in fluid communication with the first receptacle and configured to cool the beverage when the beverage is transferred from the first receptacle to the second receptacle. The machine includes a dispensing port located on the housing configured to dispense the beverage from the machine.

Some devices and methods include a machine for providing a single serving of an ingestible substance, the machine including a nest for receiving a pod containing at least one ingredient for forming a single serving of the ingestible substance, where the nest includes an annular recess for receiving a pod having an annular configuration;

a cooling unit for cooling the pod; and a water supply for introducing water into the pod.

Some devices and methods include a machine for providing and dispensing a single serving of a ingestible substance. The machine including a nest for receiving a pod containing at least one ingredient for forming a single serving of the ingestible substance, where the pod includes at least one internal paddle. The machine includes a cooling unit for cooling the pod and a water supply for introducing water into the pod. The machine includes a rotation unit for rotating the at least one internal paddle of the pod.

Embodiments of these machines can include one or more of the following features.

In some embodiments, the method includes dispensing the brewed beverage from the machine.

In some embodiments, heating the water within the machine is performed using a thermal battery of the refrigeration system.

In some embodiments, heating the water within the machine is performed using one or more thermoelectric units of the refrigeration system, each of the one or more thermoelectric units generating a cool side and a hot side when electricity is applied to the respective one or more thermoelectric units, wherein the hot side is used to heat the water.

In some embodiments, the pod is a reusable frusto-conical-shaped pod.

In some embodiments, the method includes transferring the brewed beverage into a receptacle within the machine. The method including cooling a sidewall of the receptacle using the refrigeration system of the machine to cool the brewed beverage within the receptacle. The method including dispensing the cooled beverage from the receptacle.

In some embodiments, the method includes dispensing the cooled beverage from the machine.

In some embodiments, the method includes cooling a sidewall of the receptacle comprises flowing a two-phase refrigerant fluid through an evaporator of the refrigeration system.

In some embodiments, the method includes rotating a mixing paddle of the machine to distribute the beverage and facilitate quicker heat transfer.

In some embodiments, heating the water and cooling a sidewall of the receptacle is performed using one or more thermoelectric units of the refrigeration system.

In some embodiments, the machine includes a press configured for pressing the granulated ingredients within the pod.

In some embodiments, the machine includes a third fluid connection between the pod and a dispensing port and configured to transfer a brewed beverage from the first pod to the dispensing port when the beverage is to be dispensed without cooling.

In some embodiments, the machine includes one or more thermoelectric units of the refrigeration system, each of the one or more thermoelectric units generating a cool side and a hot side when electricity is applied to the respective one or more thermoelectric units, wherein the hot side is used to heat the water and the cool side is used to cool the receptacle.

In some embodiments, the pod is a frusto-conical-shaped pod and is reusable.

In some embodiments, the pod is an aluminum beverage can.

In some embodiments, the machine includes a fluid connection between the first receptacle and the dispensing port and the fluid system is further configured to transfer the beverage from the first receptacle directly to the dispensing port when the beverage is to be dispensed without cooling.

In some embodiments, the machine includes a press configured for pressing the granulated ingredients within the first receptacle.

In some embodiments, the machine includes one or more thermoelectric units of the refrigeration system, each of the one or more thermoelectric units generating a cool side and a hot side when electricity is applied to the respective one or more thermoelectric units, wherein the hot side is used to heat the water and the cool side is used to cool the second receptacle.

In some embodiments, the machine includes a mixing paddle configured to distribute the beverage and facilitate quicker heat transfer.

In some embodiments, the machine includes a heat transfer unit for transferring heat between the pod and the nest, where the heat transfer unit is capable of (i) taking heat out of the pod, and (ii) supplying heat to the pod; and a water supply for introducing water into the pod.

In some embodiments, the machine provides a pod including at least one ingredient for providing a single serving of a frozen confection. The machine cool the pod. The machine introduces water into the pod. The machine simultaneously stirs the contents of the pod while scraping at least one wall of the pod to prevent a build-up of the frozen confection on the at least one wall of the pod. The machine ejects the frozen confection out of the pod.

In some embodiments, the pod includes a sealed container including at least one ingredient disposed within the sealed container for forming a single serving of the ingestible substance. The at least one paddle disposed within the sealed container used for agitating the at least one ingredient.

The details of one or more embodiments of these systems and methods are set forth in the accompanying drawings and the description below. Other features, objects, and advantages of these systems and methods will be apparent from the description and drawings, and from the claims.

DESCRIPTION OF FIGURES

FIGS. 13 and 14 are schematic views showing further details of (i) the lid assembly of the system shown in FIGS. 1-6, (ii) portions of the cold water and air delivery assembly of the system shown in FIGS. 1-6, and (iii) the control electronics of the system shown in FIGS. 1-6.

FIG. 37 is a schematic view showing a coaxial tube for delivering the refrigerant driven by the compressor with enhanced efficiency.

FIG. 38 is a schematic view showing a direct expansion system which may be used to cool the nest assembly.

Like reference symbols in the various drawings indicate like elements.

DETAILED DESCRIPTION

Figure 1:
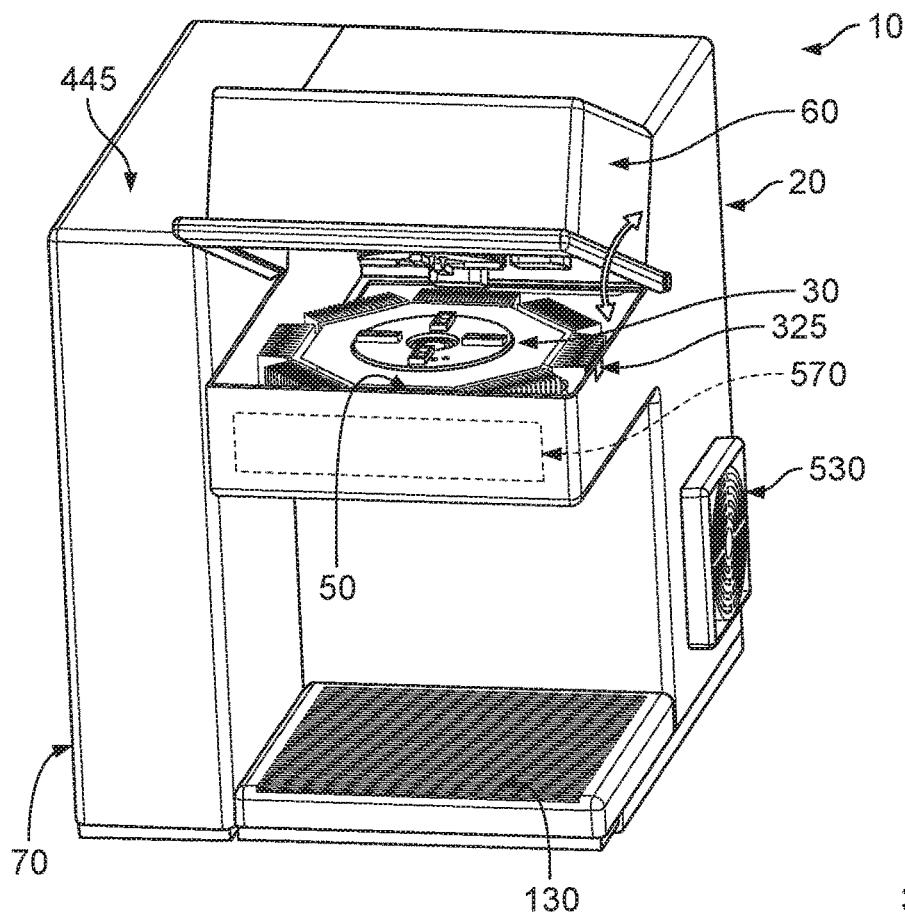
FIGS. 1-6 are schematic views showing a novel system for providing a single serving of a frozen confection, wherein all of the components of the system are shown in FIGS. 1-3 as being opaque and wherein some of the components of the system are shown in FIGS. 4-6 as being transparent.
Figure 2:
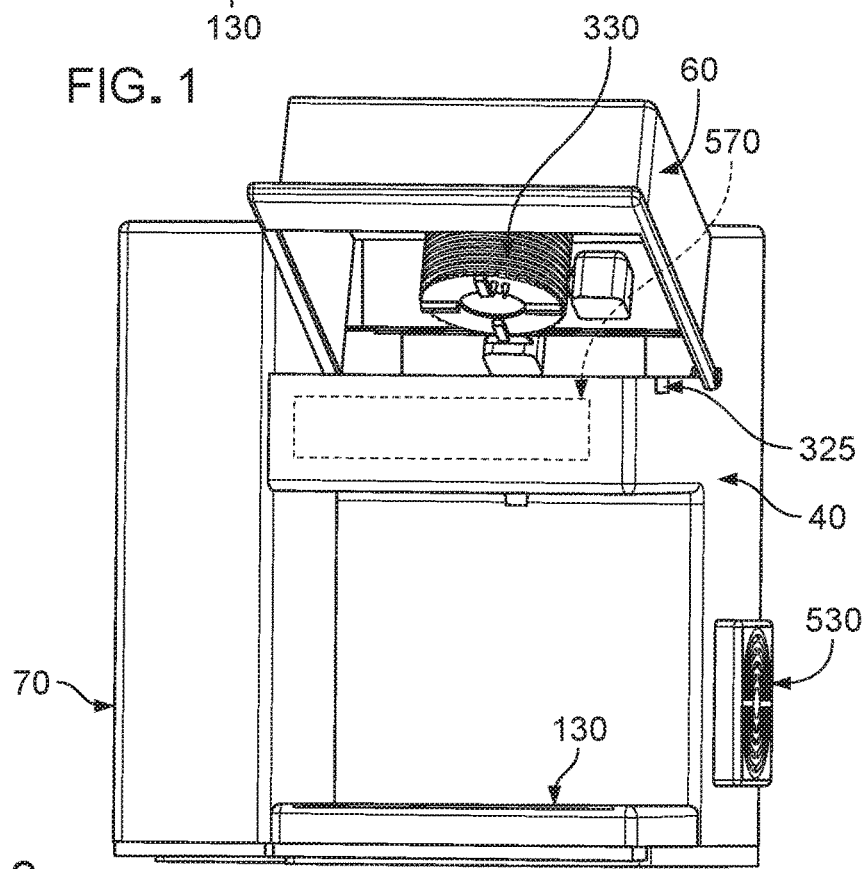
Figure 3:
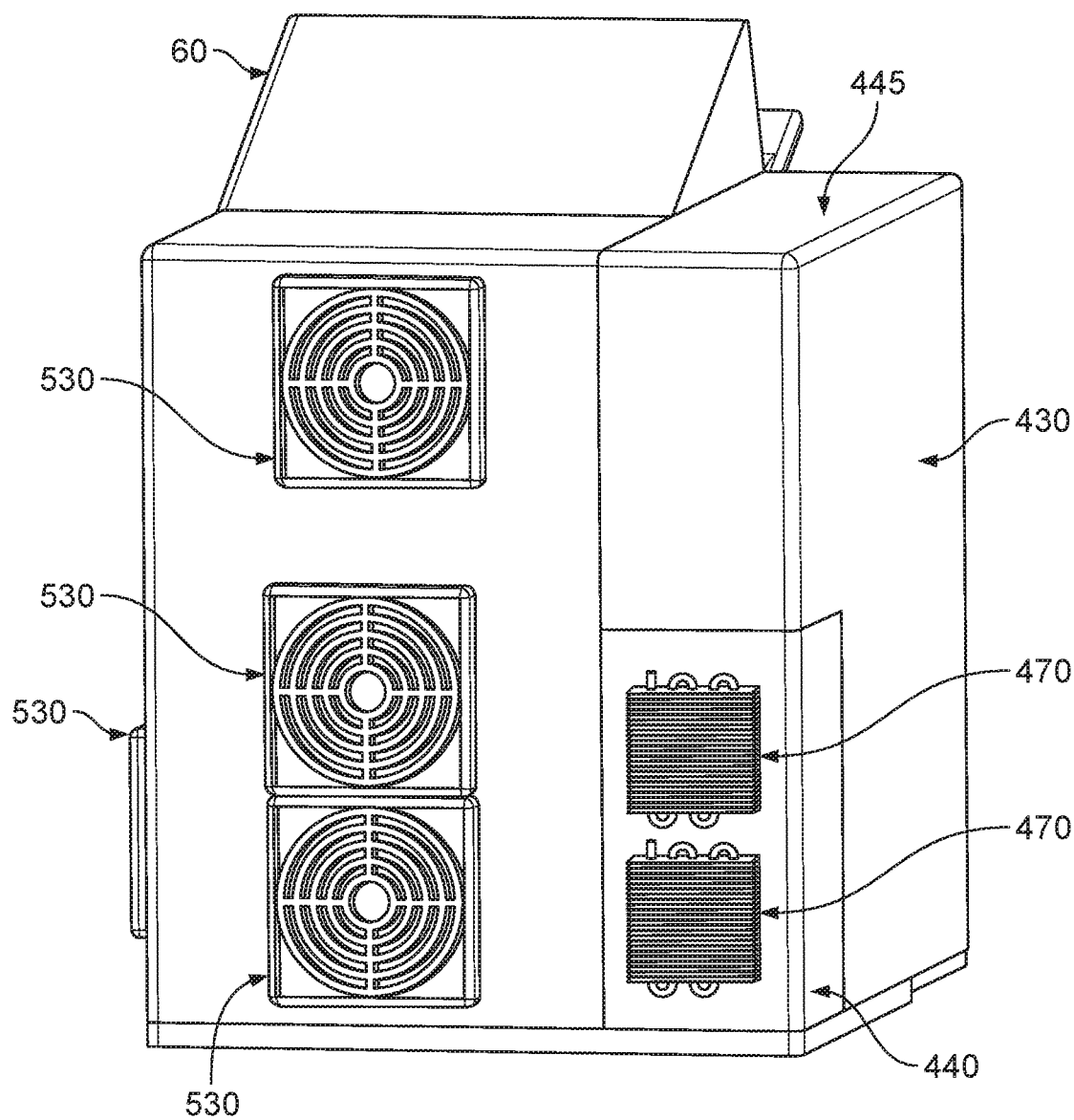
Figure 4:
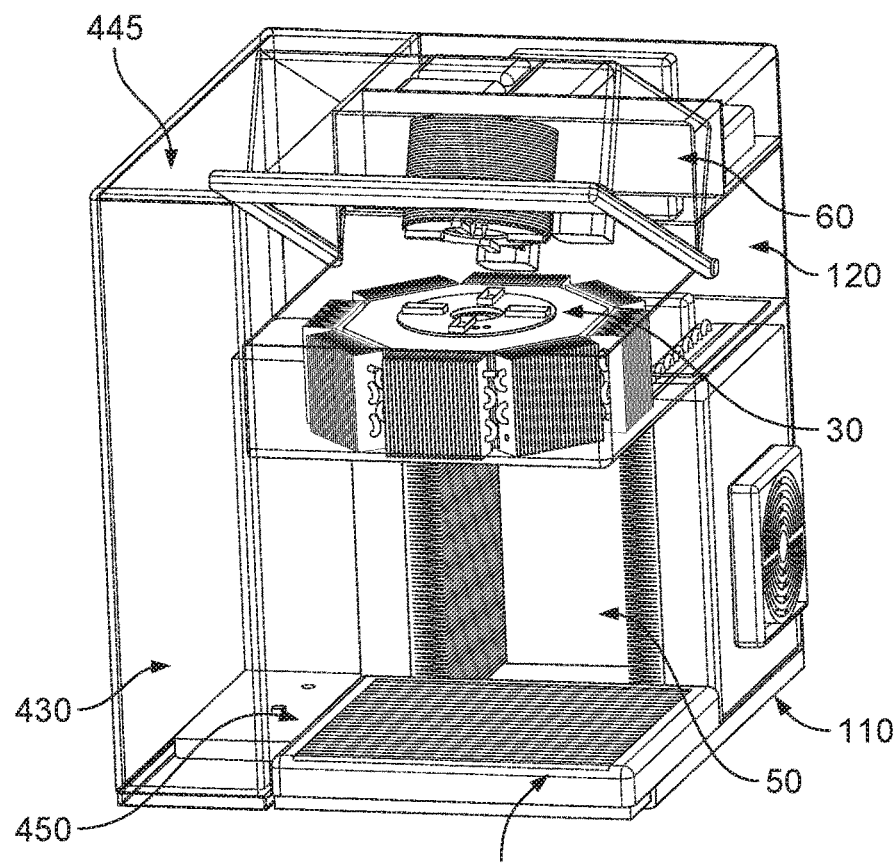
Figure 5:
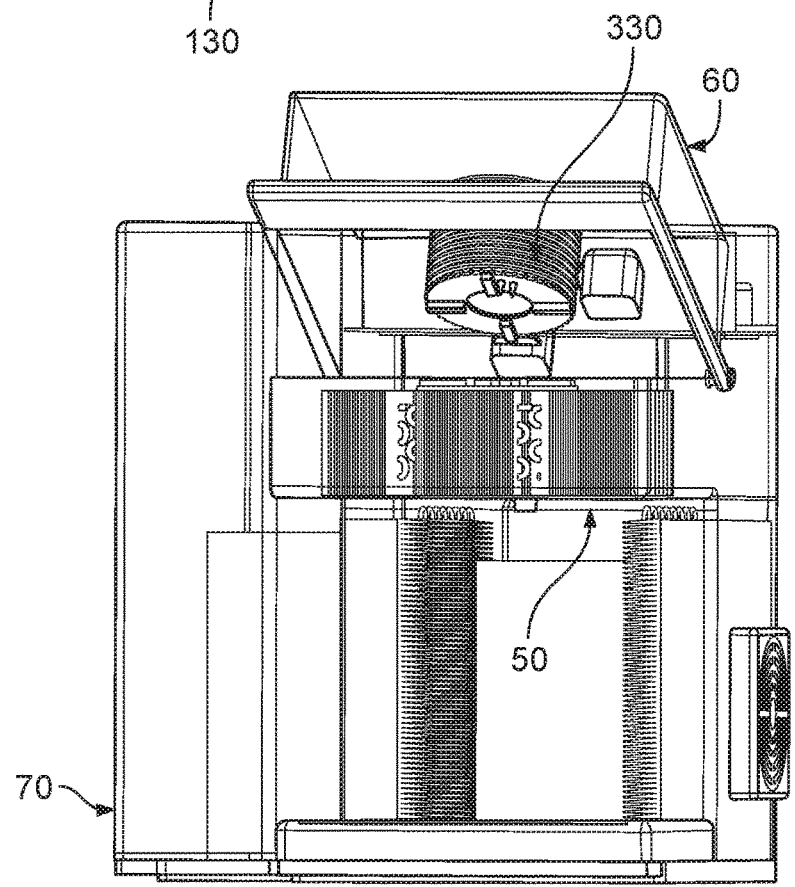

This specification describes systems and methods for providing a single serving of a frozen confection, in a reduced period of time, which is dispensed directly into the container (e.g., a bowl, a cone, etc.) from which it will be consumed. The same system is also capable of providing a single serving of a cold beverage, and/or a single serving of a hot beverage.

FIGS. 1-6 are perspective views of a system 10 for providing a single serving of a frozen confection (e.g., ice cream, frozen yogurt, a smoothie, etc.). System 10 is also capable of providing a single serving of a cold beverage, and/or a single serving of a hot beverage.

System 10 will first be described in the context of providing a single serving of a frozen confection. System 10 will then be described in the context of providing a single serving of a cold beverage. System 10 will then be described in the context of providing a single serving of a hot beverage.

System 10 generally includes a machine 20 and a pod 30, wherein machine 20 is configured to, among other things, receive a pod 30 containing a supply of ingredients for forming a single serving of the frozen confection, cool pod 30 (and its contents), introduce cold water and air into pod 30, agitate the contents of pod 30 so as to form the frozen confection, and then eject the frozen confection from pod 30 directly into the container (e.g., a bowl, a cone, etc.) from which it will be consumed.

Machine 20 is configured to, among other things, receive a pod 30 containing a supply of ingredients for forming a single serving of the frozen confection, cool pod 30 (and its contents), introduce cold water and air into pod 30, agitate the contents of pod 30 to form the frozen confection, and then eject the frozen confection from pod 30 directly into the container (e.g., a bowl, a cone, etc.) from which it will be consumed.

Machine 20 is a reusable device which generally includes a housing 40, a nest assembly 50, a lid assembly 60, a water supply 70, a cold water and air delivery assembly 80, a heat dissipation assembly 90 and control electronics 100. These machines are described in more detail in U.S. patent application Ser. No. 16/459,176 filed Jul. 1, 2019 and U.S. patent application Ser. No. 16/824,616 filed Mar. 19, 2020, both of which are incorporated herein by reference in their entirety.

FIGS. 1-6 show the housing 40. Housing 40 generally includes a base 110, a cover 120 mounted to base 110, and a tray 130 mounted to base 110. Cover 120 serves to enclose interior components of machine 20 and to support other components of machine 20. Tray 130 serves to receive a container (e.g., a bowl) into which the frozen confection is to be ejected and from which the frozen confection is to be consumed (alternatively, where the frozen confection is to be consumed from a cone, the cone is held above tray 130). If desired, a cooling element (e.g., a thermoelectric (TEC) assembly including a thermoelectric cooler (TEC) element) may be disposed in the base of tray 130 so that tray 130 can "pre-cool" a container (e.g., a bowl) which is to receive the frozen confection.

FIGS. 7-12 show the nest assembly 50 in further detail. Nest assembly 50 serves to receive a pod 30 containing a supply of ingredients for forming a single serving of the frozen confection and, among other things, rapidly cool pod 30 (and its contents) so as to provide a single serving of a frozen confection in a reduced period of time. To this end, and as will hereinafter be discussed, nest assembly 50 and pod 30 are each provided with a unique configuration and a unique construction so as to speed up cooling of pod 30.

More particularly, nest assembly 50 generally includes a nest 140 having a top surface 150, a bottom surface 160 and a plurality of outer faces 170. Nest 140 has eight outer faces 170, so that nest 140 has a generally octagonal configuration. Alternatively, nest 140 may have a different number of outer faces 170. Nest 140 is preferably formed out of a high heat-transfer material such as aluminum.

Nest 140 also includes a bore 180 and a counterbore 190. A hollow cylinder 200 is disposed in bore 180 and extends upward into counterbore 190. As a result of this construction, an annular recess 210 (i.e., a toroidal recess 210) is formed in top surface 150 of nest 140. Annular recess 210 is generally characterized by an outer wall 220 (which is defined by the aforementioned counterbore 190) and an inner wall 230 (which is defined by the aforementioned hollow cylinder 200). Annular recess 210 is sized to receive pod 30 therein as will hereinafter be discussed.

Nest 140 also includes a bore 232 which opens on bottom surface 160 of nest 140 and communicates with the interior of annular recess 210. An exit nozzle 233 is mounted to bottom surface 160 of nest 140 at bore 232 so that exit port 234 of exit nozzle 233 communicates with the interior of annular recess 210. A pod sensor 235 is provided in nest 140 to detect when a pod 30 is disposed in annular recess 210 of nest 140.

Figure 7:
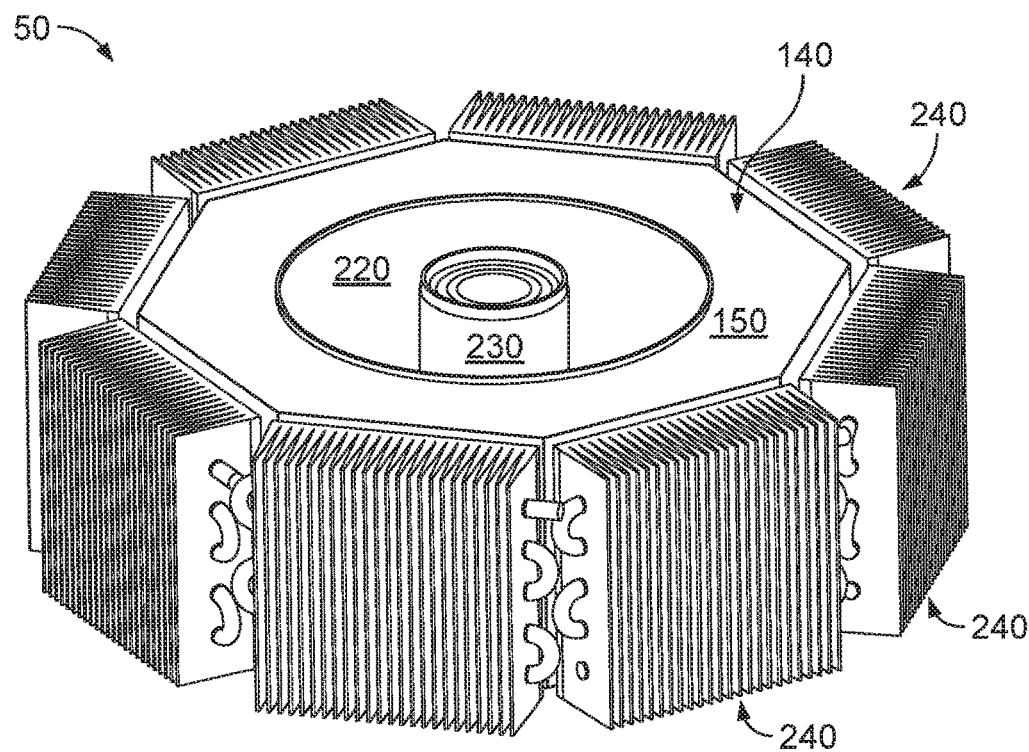
FIGS. 7-12 are schematic views showing further details of the nest assembly of the system shown in FIGS. 1-6.
Figure 8:
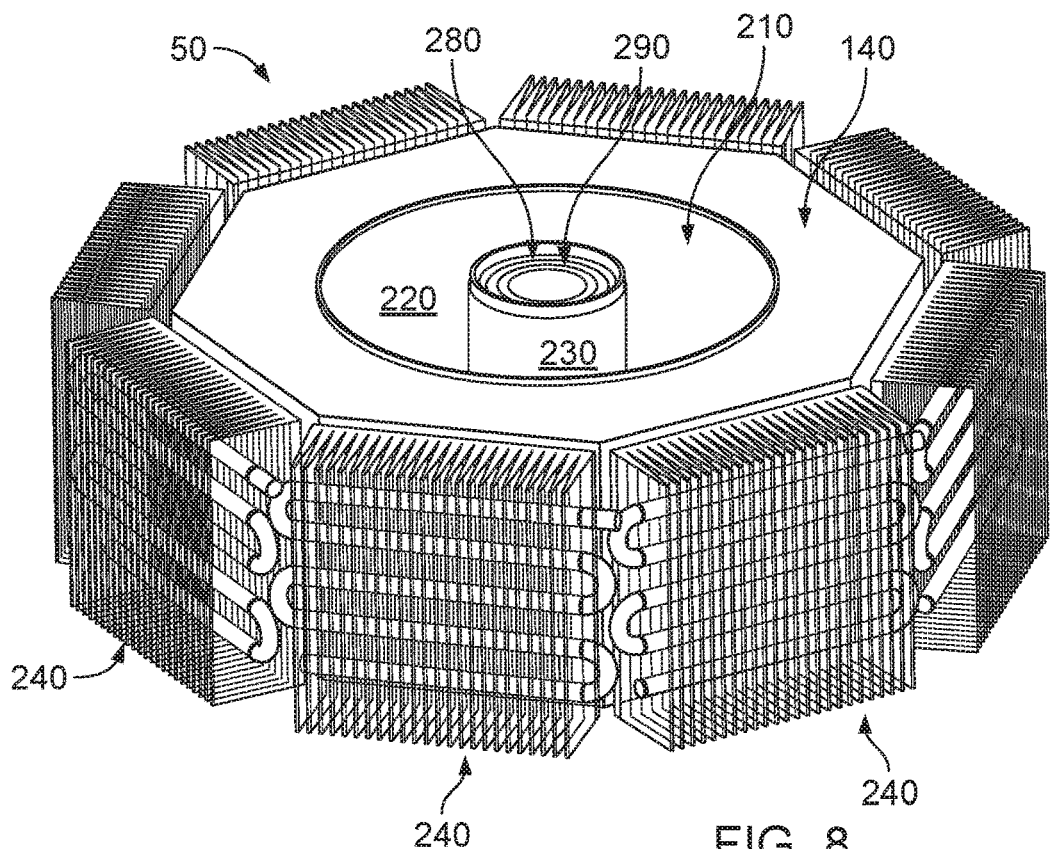
Figure 10:
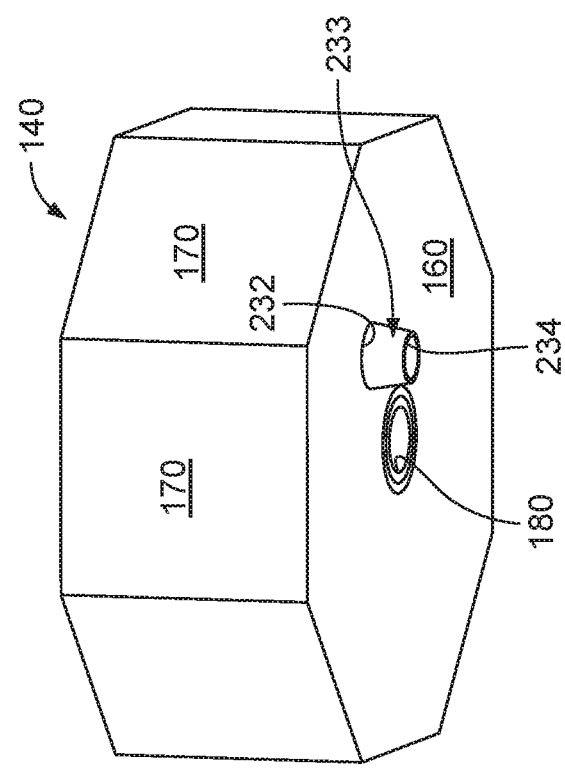
Figure 9:
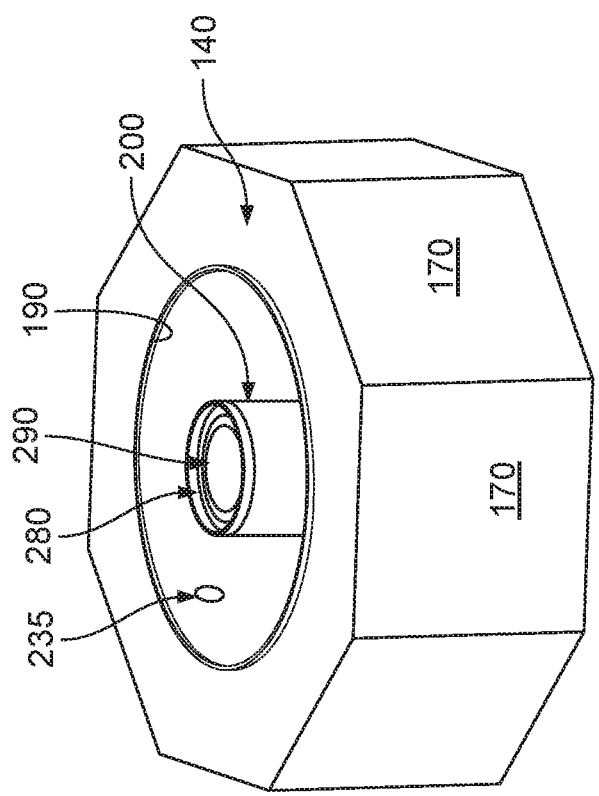
Figure 11:
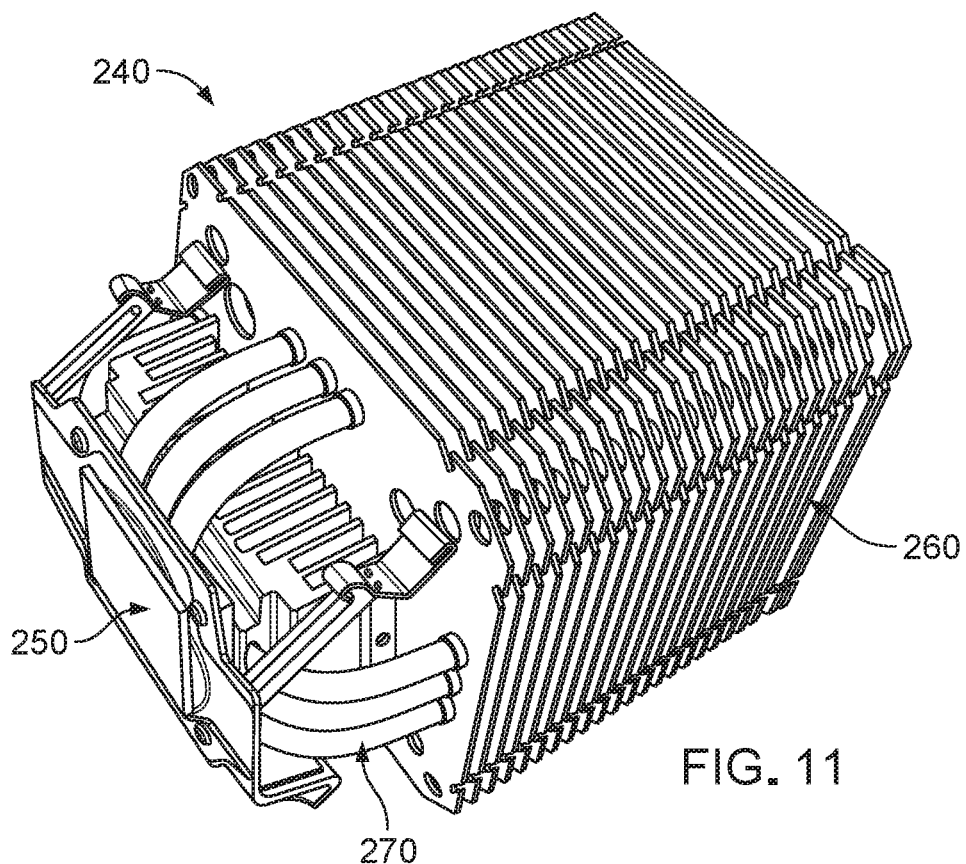

Nest assembly 50 also includes a plurality of thermoelectric (TEC) assemblies 240. TEC assemblies 240 each include a thermoelectric cooler (TEC) element 250, a heat sink 260 and a plurality of heat pipes 270 extending between TEC element 250 and heat sink 260 so as to transfer heat from TEC element 250 to heat sink 260. If desired, multiple TEC elements 250 can be stacked on each heat sink 260 so as to achieve higher temperature differences than can be had with single-stage TEC elements 250. As seen in FIGS. 7, 8 and 11, TEC assemblies 240 are positioned against outer faces 170 of nest 140 so that TEC elements 250 can provide cold or heat to outer faces 170 of nest 140, depending on the direction of the electric current flow supplied to TEC elements 250, whereby to provide cold or heat to outer wall 220 of annular recess 210 of nest 140 (and hence to provide cold or heat to a pod 30 disposed in annular recess 210 of nest 140). It will be appreciated that when machine 20 is to be used to provide a frozen confection, the direction of the electric current flow supplied to TEC elements 250 causes cold to be applied to outer faces 170 of nest 140.

Figure 12:
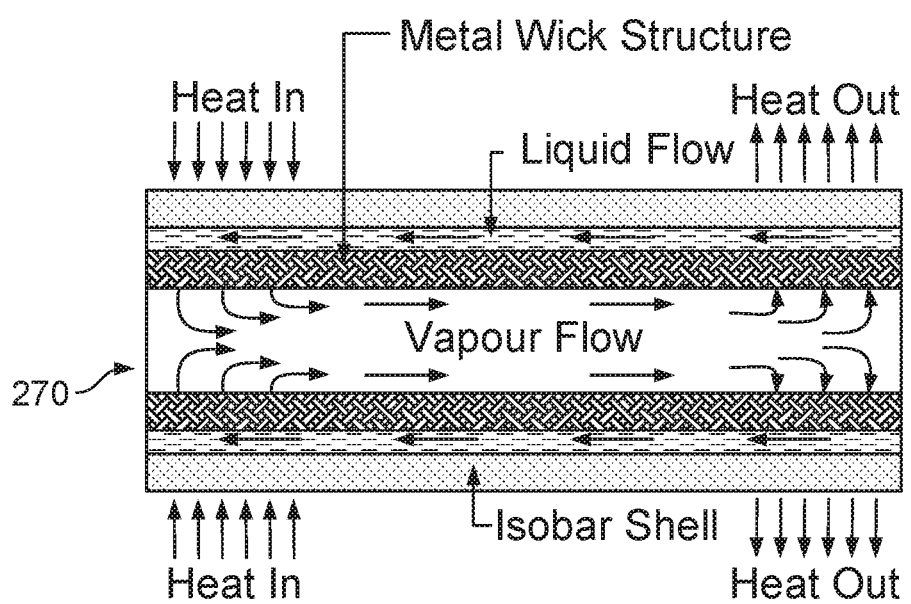

FIG. 12 is a schematic of the heat pipes 270. The heat pipes 270 provide a high heat-transfer capacity for transferring heat from TEC elements 250 to heat sinks 260. Heat pipes 270 are preferably also connected to heat dissipation assembly 90 to carry the heat collected by heat pipes 270 to heat dissipation assembly 90 for further dissipation to the environment.

Nest assembly 50 also includes a cylindrical TEC 280 for providing cold to inner wall 230 of annular recess 210, and a cylindrical TEC 290 for supplying heat to inner wall 230 of annular recess 210. The nest assembly 50 can also be formed as an evaporator as described in more detail in U.S. patent application Ser. No. 16/459,388 filed Jul. 1, 2019 and incorporated herein by reference in its entirety.

FIGS. 13 and 14 are perspective views of the lid assembly 60. Lid assembly 60 generally includes a handle 300 to which is mounted a lid 310, such that lid 310 moves in conjunction with handle 300. Handle 300 is pivotally mounted to cover 120 of housing 40 via a pivot pin 320. Lid assembly 60 can pivot towards or away from nest assembly 50 (see FIG. 1). A lid sensor 325 (FIGS. 1 and 2) is provided for detecting when lid 310 is in its closed position.

Lid assembly 60 includes a plunger 330 which is movably mounted to lid 310. More particularly, plunger 330 includes a circumferential gear 340 and a longitudinal gear 350, and lid assembly 60 includes a rotation motor 360 for driving a rotation gear 370 and a vertical motor 380 for driving a vertical gear 390, with rotation gear 370 of rotation motor 360 engaging circumferential gear 340 of plunger 330, and with vertical gear 390 of vertical motor 380 engaging longitudinal gear 350 of plunger 330. Rotation motor 360 can cause plunger 330 to rotate within lid 310, and vertical motor 380 can cause plunger 330 to move vertically within lid 310.

Plunger 330 further includes a plurality of fingers 400 for engaging counterpart fingers on pod 30 (see below), and a pair of hollow fangs 410, 420 for penetrating the top of pod 30 and delivering additional ingredients into pod 30 (see below).

FIGS. 1-6 show the system 10 including a water supply 70. The water supply 70 includes an ambient-temperature water tank 430 and a cold water tank 440. Ambient-temperature water tank 430 may hold approximately 2.0 liters of water, and cold water tank 440 may hold approximately 0.5 liter of water. Ambient-temperature water tank 430 includes a removable cover 445 to enable ambient-temperature water tank 430 to be filled with water. A line (not shown) is provided for moving water from ambient-temperature water tank 430 to cold water tank 440. A water sensor 450 (FIG. 4) is provided for monitoring the presence of water in ambient-temperature water tank 430, and a water temperature sensor 460 (FIG. 6) is provided for monitoring the temperature of the water in cold water tank 440. A plurality of TEC assemblies 470, each preferably similar to the aforementioned TEC assemblies 240, are provided for chilling the water in cold water tank 440, i.e., TEC assemblies 470 includes TEC elements 473, heat sinks 475 and heat pipes 477. Heat pipes 477 of TEC assemblies 470 are preferably connected to heat dissipation assembly 90 so as to carry the heat produced by TEC assemblies 470 to heat dissipation assembly 90.

Figure 6:
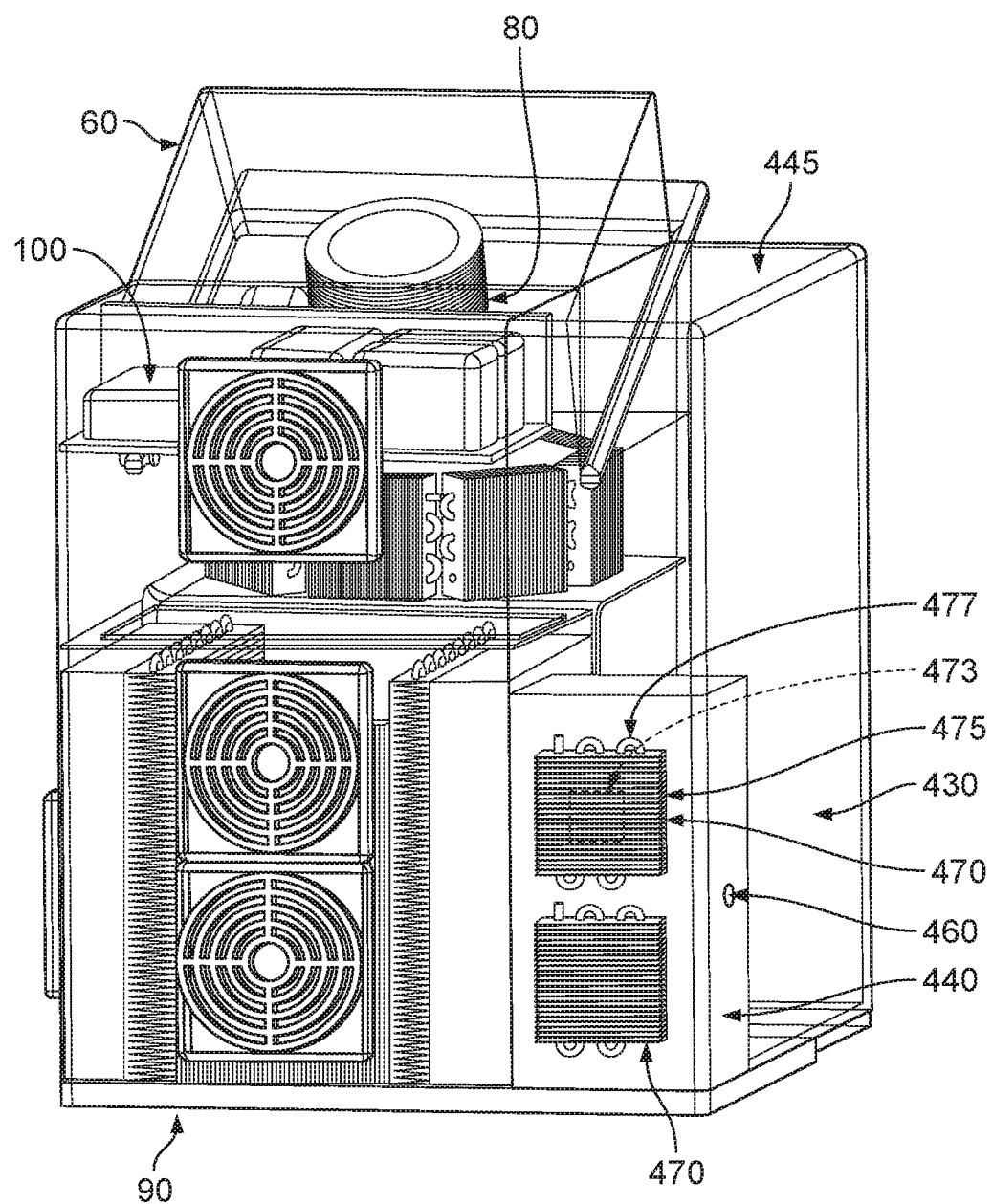

Looking next at FIGS. 6 and 14, cold water and air delivery assembly 80 generally includes a water pump 480 which pumps cold water from cold water tank 440 into hollow fang 410 of plunger 330, and an air pump 490 which pumps air into hollow fang 420 of plunger 330. Hollow fang 410 includes a spray nozzle for injecting droplets of atomized water into pod 30 (see below), whereby to facilitate the formation of the frozen confection (see below). Such spray nozzles are well known in the art of liquid dispersion. Cold water and air delivery assembly 80 also includes various fluid lines (not shown) for transferring water from cold water tank 440 to hollow fang 410 of plunger 330 and for introducing air into hollow fang 420 of plunger 330.

Figure 15:
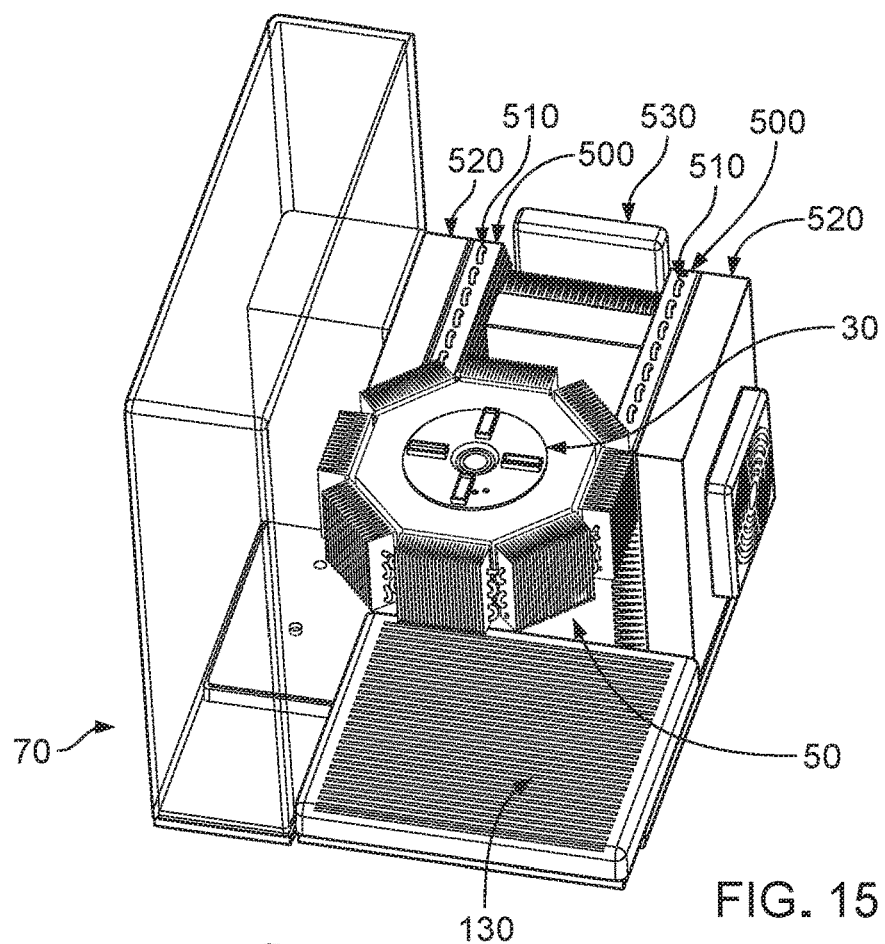
FIGS. 15 and 16 are schematic views showing, among other things, further details of the heat dissipation assembly of the system shown in FIGS. 1-6.
Figure 16:
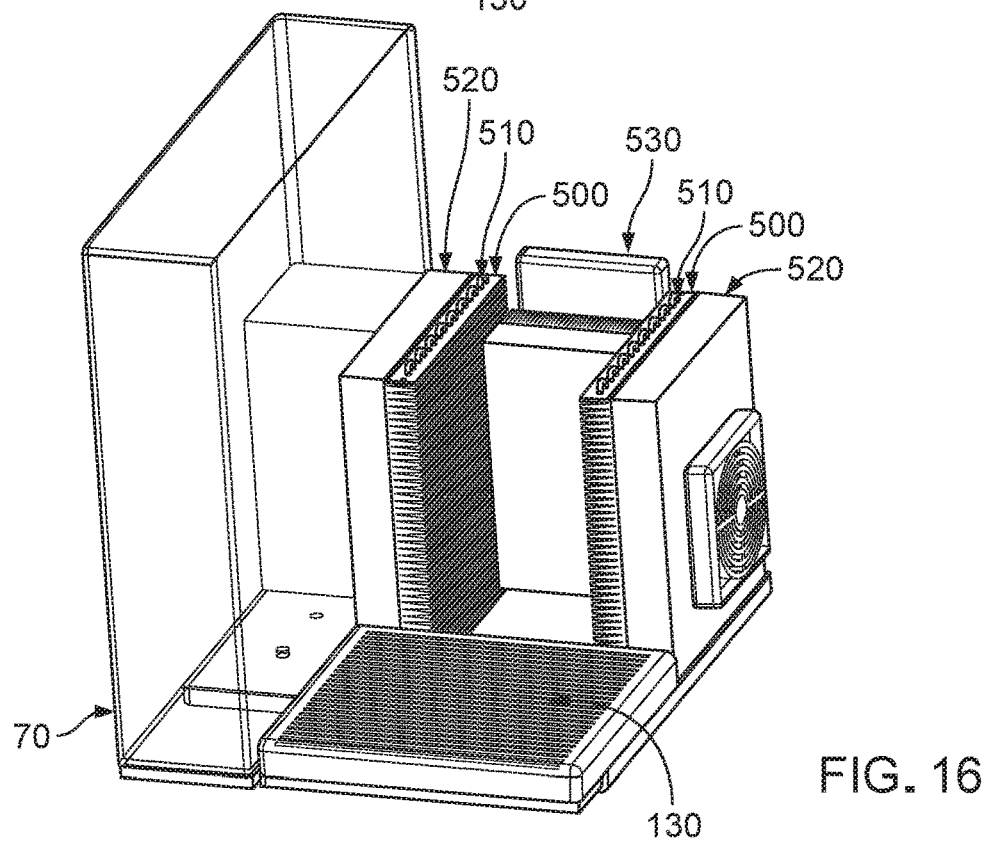

FIGS. 15 and 16 are perspective views of the heat dissipation assembly 90. Heat dissipation assembly 90 dissipates heat received from heat pipes 270 of TEC assemblies 240 of nest 140 and dissipates heat received from the heat pipes 477 of TEC assemblies 470 of cold water tank 440. Heat dissipation assembly 90 generally includes a plurality of heat sinks 500 which draw heat from heat pipes 510 (which are connected to heat pipes 270 of TEC assemblies 240 of nest 140 and heat pipes 477 of TEC assemblies 470 of cold water tank 440), a plurality of condensers 520 for receiving heat from heat sinks 500, and a plurality of fans 530 for cooling condensers 520.

Figure 17:
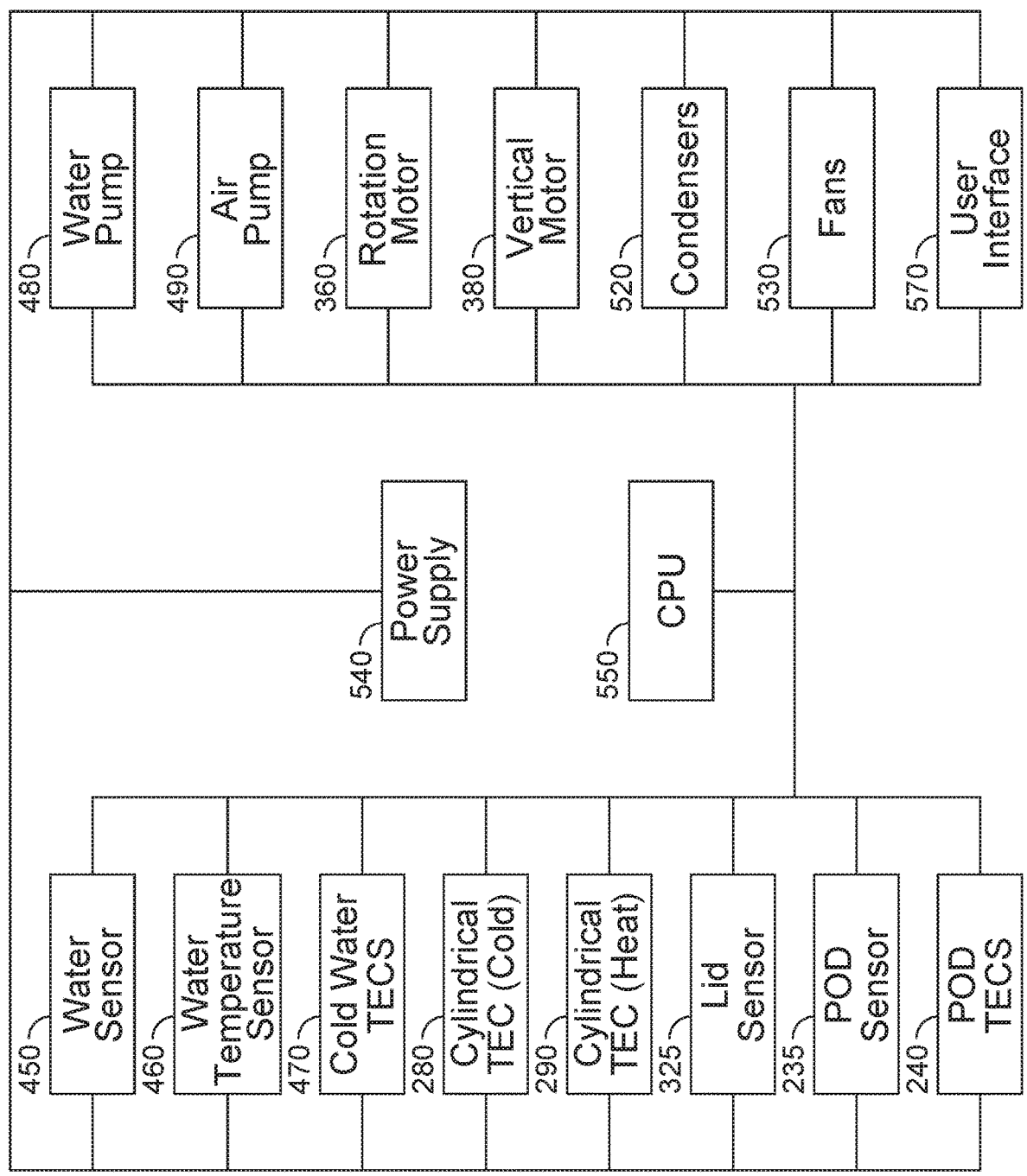
FIG. 17 is a schematic view showing further details of the control electronics of the system shown in FIGS. 1-6.

Control electronics 100 generally include a power supply 540 (FIG. 14), a central processing unit (CPU) 550 and a user interface 570 (FIG. 2), e.g., a display screen, operating buttons, etc. As seen in FIG. 17, power supply 540 and CPU 550 are connected to the aforementioned water sensor 450, water temperature sensor 460, TEC assemblies 470, cylindrical TEC 280, cylindrical TEC 290, lid sensor 325, pod sensor 235, TEC assemblies 240, water pump 480, air pump 490, rotation motor 360, vertical motor 380, condensers 520, fans 530 and user interface 570. CPU 550 is appropriately programmed to operate machine 20 in response to instructions received from user interface 570 as will hereinafter be discussed.

It will be appreciated that machine 20 is preferably configured to operate at a maximum load of 1800 watts, which is generally the maximum load that standard outlets in a kitchen can handle.

The Pod

Pod 30 contains a supply of ingredients for providing a single serving of a frozen confection (e.g., ice cream, frozen yogurt, a smoothie, etc.). Pod 30 is a single-use, disposable pod, i.e., a new pod 30 is used for each serving of the frozen confection.

As noted above, pod 30 is provided with a unique configuration and a unique construction to speed up cooling of pod 30 (and its contents), to speed up the process of producing the frozen confection.

Figure 18:
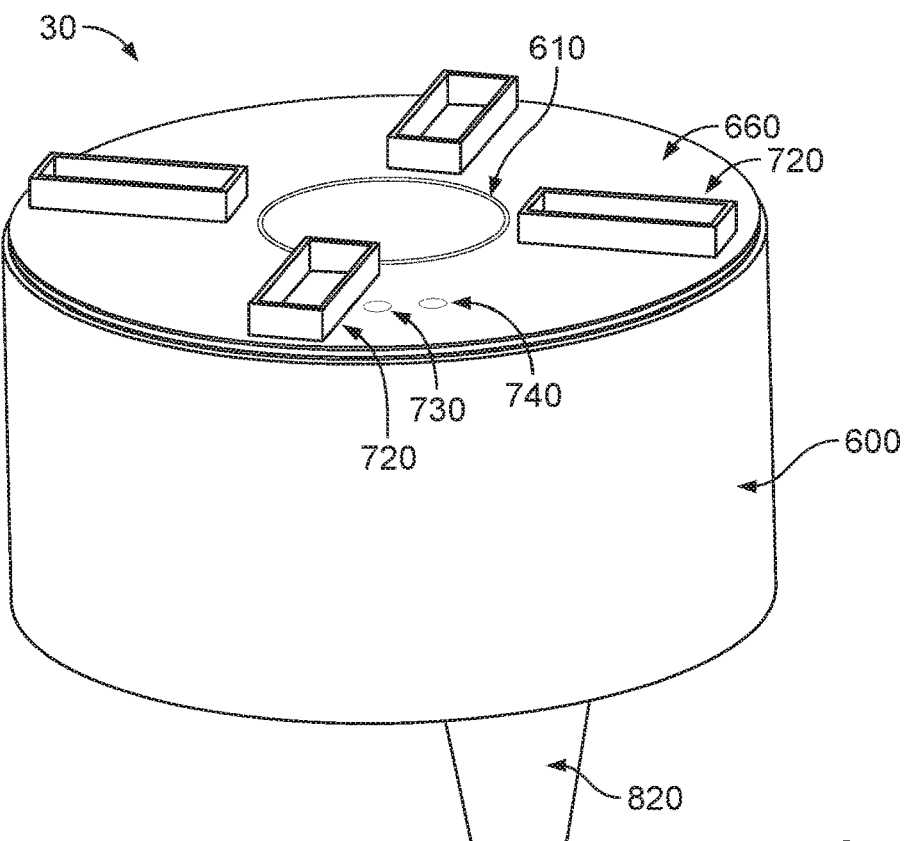
FIGS. 18-20 are schematic views showing further details of the pod of the system shown in FIGS. 1-6.
Figure 19:
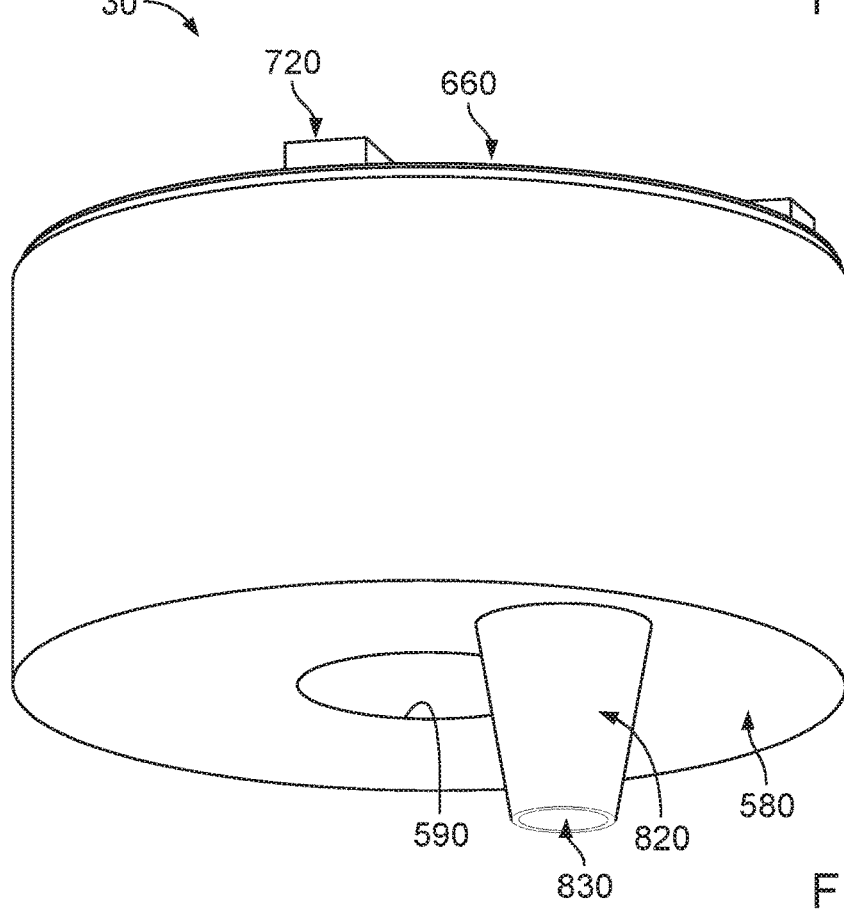
Figure 20:
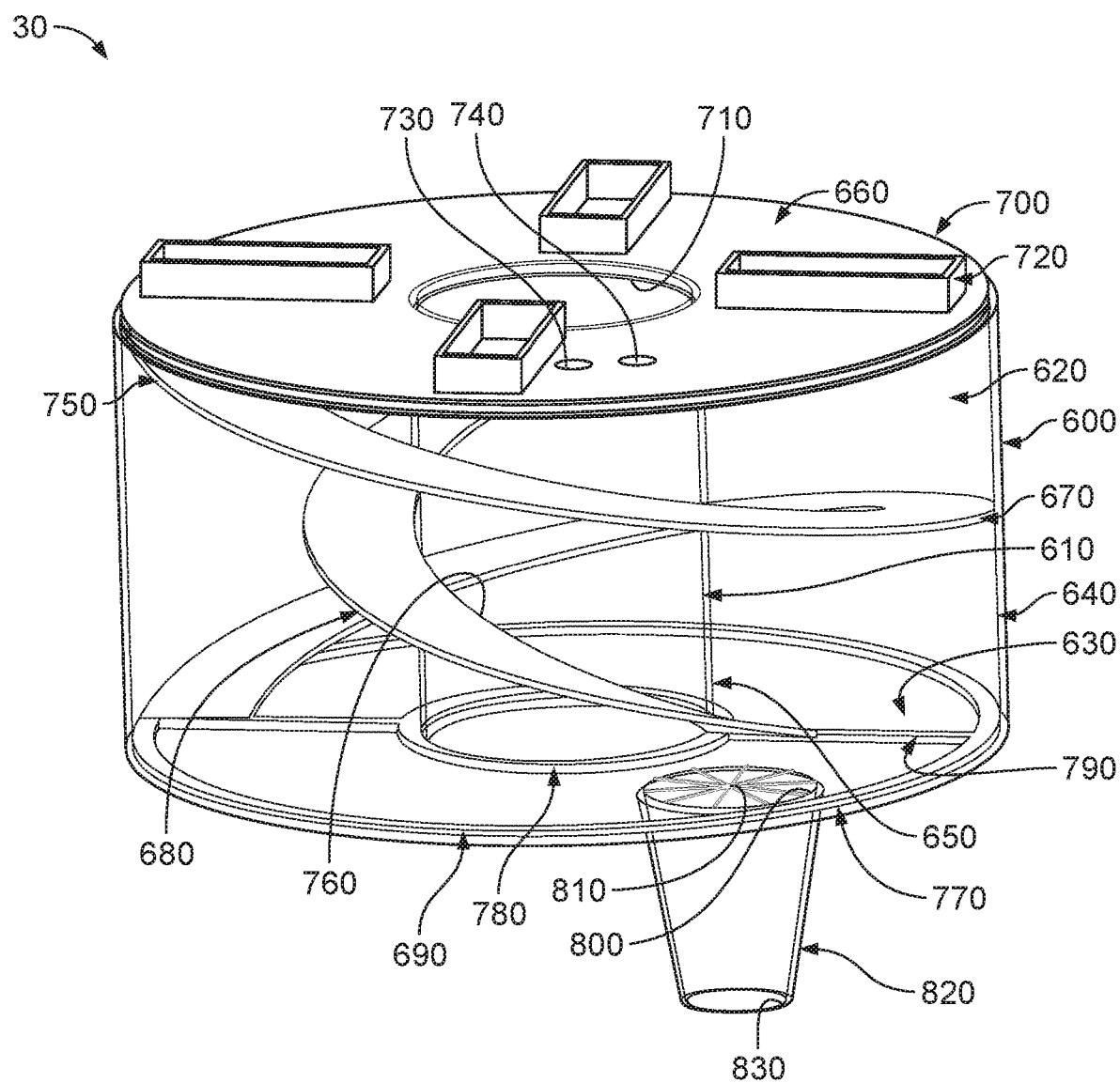

FIGS. 18-20 are perspective views of the pod 30. Pod 30 generally includes a base 580 having an opening 590 formed therein. An outer hollow tube 600 rises upward from the outer perimeter of base 580, and an inner hollow tube 610 is disposed in opening 590 of base 580 and rises upward from the inner perimeter of base 580. An annular recess 620 (i.e., a toroidal recess 620) is formed between base 580, outer hollow tube 600 and inner hollow tube 610, with annular recess 620 being generally characterized by a floor 630 (defined by base 580), an outer wall 640 (defined by outer hollow tube 600) and an inner wall 650 (defined by inner hollow tube 610). Note that the diameter of outer hollow tube 600 of pod 30 is slightly less than the diameter of counterbore 190 of nest 140, and the diameter of inner hollow tube 610 of pod 30 is slightly greater than the diameter of hollow cylinder 200 of nest assembly 50, such that pod 30 can be seated in annular recess 210 of nest 140, with outer hollow tube 600 of pod 30 making a close sliding fit with outer wall 220 of nest 140 and with inner hollow tube 610 of pod 30 making a close sliding fit with inner wall 230 of nest assembly 50.

Preferably base 580 of pod 30 includes a high heat-transfer material (e.g., aluminum, a molded polymer, etc.), outer hollow tube 600 of pod 30 includes a high heat-transfer material (e.g., aluminum, a molded polymer, etc.) and inner hollow tube 610 of pod 30 includes a high heat-transfer material (e.g., aluminum, a molded polymer, etc.). Base 580, outer hollow tube 600 and inner hollow tube 610 include a plastic/thin metallic film composite (i.e., a body of plastic having an external covering of a thin metallic film). It should be appreciated that the plastic/thin metallic film composite allows for improved thermal transfer and helps preserve the contents of pod 30, while also providing pod 30 with a unique packaging appearance. Preferably base 580, outer hollow tube 600 and inner hollow tube 610 are substantially rigid.

When a pod 30 is disposed in the annular recess 210 of nest 140, cold can be efficiently applied to outer wall 640 of pod 30 by outer wall 220 of nest 140, cold can be efficiently applied to inner wall 650 of pod 30 by inner wall 230 of nest assembly 50, and cold can be efficiently applied to base 580 of pod 30 by the floor of annular recess 210 of nest 140. As a result, machine 20 can rapidly cool pod 30 (and its contents) so as to provide a single serving of a frozen confection in a reduced period of time.

Pod 30 also includes a cap 660, an outer helical scraper paddle 670, an inner helical scraper paddle 680, and a bottom scraper paddle 690.

Cap 660 has an outer edge 700 which is sized slightly smaller than the diameter of outer wall 640 of pod 30, and cap 660 has an inner hole 710 which has a diameter slightly larger than inner hollow tube 610 of pod 30, such that cap 660 can move longitudinally into, and then along, annular recess 620 of pod 30 (see below). Cap 660 is preferably substantially rigid.

Cap 660 also includes fingers 720 for engaging counterpart fingers 400 of plunger 330, whereby rotational and longitudinal motion can be imparted to cap 660 of pod 30 by plunger 330, as will hereinafter be discussed. Cap 660 also includes two weakened portions 730, 740 for penetration by hollow fangs 410, 420, respectively, of plunger 330, as will hereinafter be discussed in further detail.

Outer helical scraper paddle 670 extends between cap 660 and bottom scraper paddle 690, and includes an outer edge 750 which makes a close sliding fit with outer wall 640 of annular recess 620. Inner helical scraper paddle 680 extends between cap 660 and bottom scraper paddle 690, and includes an inner edge 760 which makes a close sliding fit with inner hollow tube 610 of pod 30. Bottom scraper paddle 690 includes an outer ring 770 which contacts base 580 and makes a close sliding fit with outer wall 640 of annular recess 620, an inner ring 780 which contacts base 580 and makes a close sliding fit with inner hollow tube 610 of pod 30, and a pair of struts 790 which contact base 580 and extend between outer ring 770 and inner ring 780. As a result of this construction, fingers 720 may be used to turn cap 660 rotationally, such that outer helical scraper paddle 670 rotates, scrapping the interior surface of outer wall 640 of pod 30, inner helical scraper paddle 680 rotates, scraping the exterior surface of inner hollow tube 610, and struts 770 rotate, scraping floor 630 of base 580. It will be appreciated that the provision of outer helical scraper paddle 670, inner helical scraper paddle 680 and bottom scraper paddle 690 is highly advantageous, since outer helical scraper paddle 670, inner helical scraper paddle 680 and bottom scraper paddle 690 can simultaneously (i) agitate the contents of pod 30 so as to ensure uniform and rapid formation of the frozen confection, and (ii) prevent the build-up of frozen confection on base 580, outer hollow tube 600 and inner hollow tube 610, which could inhibit cooling of the contents of pod 30.

Outer helical scraper paddle 670 and inner helical scraper paddle 680 are configured and constructed so that they may be longitudinally compressed by applying a longitudinal force to cap 660, whereby to move cap 660 into, and along, annular recess 620 of pod 30, so as to bring cap 660 substantially into engagement with base 580 (see below). Outer helical scraper paddle 670 and inner helical scraper paddle 680 are made out of spring steel, with outer helical scrapper paddle 670 and inner helical scraper paddle 680 compressing to substantially flat configurations when a longitudinal force drives cap 660 against base 580 (or, more precisely, substantially against base 580, since the flattened outer helical scraper paddle 670 and the flattened inner helical scraper paddle 680 will be disposed between, and slightly separate, cap 660 from base 580). Bottom scraper paddle 690 may also be formed out of spring steel. Outer helical scraper paddle 670 and/or inner helical scraper paddle 680 (and/or bottom scraper paddle 690) may be made out of a plastic. If desired, outer helical scraper paddle 670 and/or inner helical scraper paddle 680 (and/or bottom scraper paddle 690) may include a shape memory material (e.g., Nitinol).

Other pod-machine interfaces that can be used with machine 20 and similar machines are described in more detail in U.S. patent application Ser. No. 16/459,322 filed Jul. 1, 2019 and incorporated herein by reference in its entirety.

A bore 800 passes through base 580 and communicates with the interior of annular recess 620. A weakened portion 810 normally closes off bore 800 but may be ruptured upon the application of an appropriate force so as to pass material (e.g., frozen confection) therethrough. An exit nozzle 820 is mounted to base 580 adjacent to bore 800 so that exit port 830 of exit nozzle 820 communicates with the interior of annular recess 620 when weakened portion 810 has been ruptured.

Pod 30 generally has a surface area-to-volume ratio which is greater than 2:1, and which is preferably approximately 8:1. It will be appreciated that increasing the surface area of pod 30 increases the speed of forming the frozen confection in pod 30, since it allows heat to be drawn out of pod 30 (and its contents) more quickly. It will also be appreciated that forming pod 30 with a toroidal configuration (i.e., with both interior and exterior access surfaces) provides increased surface area and enables more rapid cooling of pod 30 and its contents, inasmuch as cold may be simultaneously applied to both the outer surfaces of pod 30 and the inner surfaces of pod 30.

By way of example but not limitation, pod 30 has an outer diameter of 2.25 inches and a height of 3.75 inches (i.e., outer hollow tube 600 has an outer diameter of 2.25 inches and a height of 3.75 inches), whereby to provide a surface area of 26.49 square inches and a volume of 14.90 cubic inches; and pod 30 has an inner diameter of 1.4 inches and a height of 3.75 inches (i.e., inner hollow tube 610 has an inner diameter of 1.4 inches and a height of 3.75 inches), whereby to provide a surface area of 16.49 square inches and a volume of 5.77 cubic inches; thereby yielding a total pod surface area of 42.98 square inches (i.e., 26.49 square inches+16.49 square inches=42.98 square inches) and a total pod volume of 9.13 cubic inches (i.e., 14.90 cubic inches−5.77 cubic inches=9.13 cubic inches), and a surface area-to-volume ratio of 8.47:1.

Pod 30 contains a fresh supply of ingredients for forming the frozen confection (e.g., ice cream, frozen yogurt, smoothie, etc.). More particularly, pod 30 may contain a frozen confection mix (dry or liquid) containing, for example, sugar and powder crystals, preferably many of which are less than 50 µm in size, and preferably containing at least 0.1% stabilizers by volume. A dry frozen confection mix preferably has at least 50% of its constituents (e.g., the sugar and powder crystals) having a size of 50 µm or less.

Where pod 30 is to produce a single serving of ice cream, pod 30 may hold approximately 4-6 ounces of ingredients, and the ingredients may include approximately 8% fat (e.g., cream, butter, anhydrous milk fat, vegetable fat, etc.), approximately 1% milk solids-non-fat (MSNF) (e.g., skim milk power (SMP), whole milk powder (WMP), evaporated milk, condensed milk, etc.), approximately 13% sucrose, approximately 0.5% emulsifier and approximately 0.5% stabilizer.

By way of further example but not limitation, if pod 30 contains 1.25 ounces of dry yogurt mix, 5 ounces of frozen yogurt will be formed in pod 30 after running machine 20.

Figure 21:
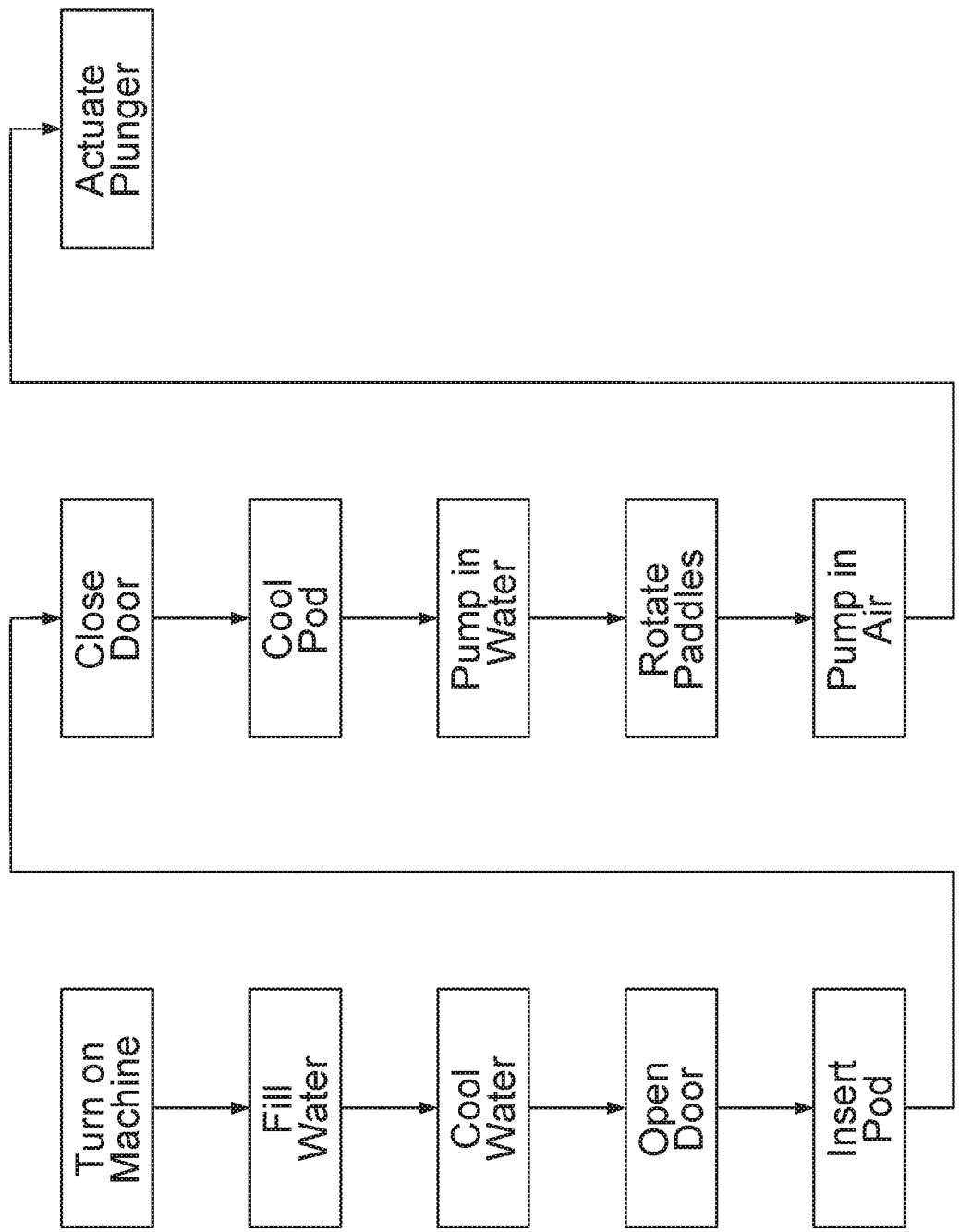
FIG. 21 is a schematic view showing exemplary operation of the system shown in FIGS. 1-6.

FIG. 21 is an operational flow chart of machine 20. Machine 20 is prepared for use by introducing water into ambient-temperature water tank 430 and turning on machine 20. Water sensor 450 confirms that there is water in ambient-temperature water tank 430. Machine 20 then pumps water from ambient-temperature water tank 430 into cold water tank 440 and chills the water in cold water tank 440 using TEC assemblies 470. Water temperature sensor 460 monitors the temperature of the water in cold water tank 440. Preferably the water in cold water tank 440 is cooled to between approximately 1-3 degrees C. Machine 20 then sits in this standby condition, re-cooling the water in cold water tank 440 as needed, until a single serving of a frozen confection (e.g., ice cream, frozen yogurt, smoothie, etc.) is to be prepared.

When a single serving of a frozen confection is to be prepared, lid assembly 60 of machine 20 is opened and a fresh pod 30 is positioned in annular recess 210 of nest 140. This is done so that exit nozzle 820 of pod 30 seats in exit nozzle 233 of nest 140. Then lid assembly 60 is closed so that fingers 400 of plunger 330 engage fingers 720 of pod 30, and so that hollow fangs 410, 420 of plunger 330 penetrate the two weakened portions 730, 740 of pod 30. In addition, a container (i.e., the container from which the frozen confection will be consumed) is placed on tray 130 of machine 20, with the container being centered below exit nozzle 233 of nest assembly 50 (alternatively, where the frozen confection is to be consumed from a cone, the cone is held above tray 130).

When pod sensor 235 senses the presence of a pod 30 in annular recess 210 of nest 140, machine 20 cools nest assembly 50 via TEC assemblies 240 and cylindrical TEC 280, which in turn cools the pod 30 (and its contents) which is located in annular recess 210 of nest 140. Note that TEC assemblies 240 cool the outer faces 170 of nest 140 so as to cool outer wall 220 of annular recess 210, whereby to cool hollow outer tube 600 of pod 30, and cylindrical TEC 280 cools hollow cylinder 200 so as to cool inner wall 230 of annular recess 210, whereby to cool hollow inner tube 610 of pod 30. Note that the high surface area-to-volume ratio of pod 30, provided by its toroidal configuration, allows for faster cooling of the pod 30 (and its contents). By way of example but not limitation, the contents of pod 30 can be cooled to a temperature of approximately −30 degrees C. so as to form ice cream within 2 minutes (the contents of pod 30 will turn to ice cream at a temperature of −18 degrees C., a lower temperature will produce ice cream even faster). Note also that the heat removed from pod 30 via TEC assemblies 240 and cylindrical TEC 280 is transferred to heat dissipation assembly 90 for dissipation to the environment.

When pod 30 has been appropriately cooled, water pump 480 pumps an appropriate amount of cold water (e.g., at least 1.25 ounces of cold water) from cold water tank 440 into hollow fang 410 in plunger 330, and then through weakened portion 730 in cap 660, so that the cold water is sprayed into the interior of pod 30 and mixes with the contents of pod 30. For example, in some implementations, 4 ounces of water at 2 degrees C. is sprayed into pod 30. At the same time, rotation motor 360 rotates plunger 330, whereby to rotate cap 660 of pod 30, which causes outer helical scraper paddle 670, inner helical scraper paddle 680 and bottom scraper paddle 690 to rotate within annular recess 620 of pod 30.

Note that only cap 660, outer helical scraper paddle 670, inner helical scraper paddle 680 and bottom scraper paddle 690 rotate, and the remainder of pod 30 remains stationary, as exit nozzle 820 of pod 30 is disposed in exit nozzle 233 of nest assembly 50.

This rotational action agitates the contents of pod 30 so as to ensure uniform and rapid mixing of the contents of pod 30. The rotational speed of the scrapper paddles can change from approximately 5 to approximately 400 RPM depending on the viscosity of the frozen confection. A torque sensor is provided which adjusts the rotational speed of the scraper paddles in response to the changing viscosity of the frozen confection in pod 30 (e.g., the rotational speed of the scraper paddles slows with the increasing viscosity of the frozen confection). In addition, this rotational action causes outer helical scraper paddle 670, inner helical scraper paddle 680 and bottom scraper paddle 690 to continuously scrape the walls of pod 30 so as to prevent the build-up of frozen confection on the walls of pod 30 (which could inhibit cooling of the contents of pod 30). Then air pump 490 pumps air into hollow fang 420 in plunger 330, and then through weakened portion 740 in cap 660, so that the air enters the interior of pod 30 and mixes with the contents of pod 30. Preferably enough air is pumped into pod 30 to provide an approximately 30%-50% overrun (i.e., air bubbles) in pod 30, whereby to give the ice cream the desired "loft". As this occurs, outer helical scraper paddle 670, inner helical scraper paddle 680 and bottom scraper paddle 690 continue to agitate the contents of pod 30 so as to ensure uniform and rapid mixing of the contents of pod 30 and so as to continuously scrape the walls of pod 30, whereby to prevent a build-up of frozen confection on the walls of pod 30 (which could inhibit cooling of the contents of pod 30).

In order to create a "smooth" frozen confection, the majority of ice crystals formed in the frozen confection should be smaller than approximately 50 μm. If many of the ice crystals are larger than 50 μm, or if there are extremely large ice crystals (i.e., over 100 μm) present, the frozen confection will be "coarse". System 10 is designed to produce a "smooth" frozen confection by providing a majority of ice crystals smaller than approximately 50 μm.

More particularly, to develop ice crystals with the proper dispersion (number, size and shape), it is necessary to control the freezing process: rates of nucleation vs. growth of crystals. System 10 does this by simultaneously scraping the inner and outer surfaces of annular recess 620 of pod 30. In addition, in order to generate numerous small ice crystals, the freezing conditions within pod 30 must promote nuclei formation and minimize ice crystal growth. Promoting ice nucleation requires very low temperatures, e.g., ideally as low as −30 degrees C., in order to promote rapid nucleation. System 10 freezes the contents of pod 30 very quickly (e.g., under 2 minutes), thereby preventing ice crystals from having the time to "ripen" (i.e., grow). Furthermore, once ice nuclei have formed, conditions that minimize their growth are needed to keep the ice crystals as small as possible. To obtain the smallest possible ice crystals, it is necessary to have the shortest residence time possible in order to minimize "ripening" (i.e., growth) of the ice crystals. System 10 achieves this by using multiple internal scraper paddles to remove ice crystals from the walls of the pod, which helps create high-throughput rates which keeps the ice crystals small (e.g., under 50 μm).

When the frozen confection in pod 30 is ready to be dispensed into the container which has been placed on tray 130 of machine 20 (i.e., the container from which the frozen confection will be consumed), or into a cone held above tray 130, vertical motor 380 moves plunger 330 vertically, causing plunger 330 to force cap 660 of pod 30 downward, toward base 580 of pod 30, with outer helical scraper paddle 670 and inner helical scraper paddle 680 longitudinally compressing with the advance of cap 660. This action reduces the volume of annular recess 620. Vertical motor 380 continues to move plunger 330 vertically, reducing the volume of annular recess 620, until the force of the frozen confection in pod 30 ruptures weakened portion 810 of pod 30 and the frozen confection is forced out exit port 830 of pod 30, whereupon the frozen confection passes through exit port 234 of nest 140 and into the container set on tray 130 (i.e., the container from which the frozen confection will be consumed) or into the cone held above tray 130. This action continues until cap 660 has been forced against base 580, effectively ejecting all of the frozen confection out of pod 30 and into the container from which the ice cream will be consumed.

Thereafter, the used pod 30 may be removed from machine 20 and, when another single serving of a frozen confection is to be prepared, it may be replaced by a fresh pod 30 and the foregoing process repeated.

Alternative Approaches for Cooling the Inner Portion of the Nest Assembly

Figure 22:
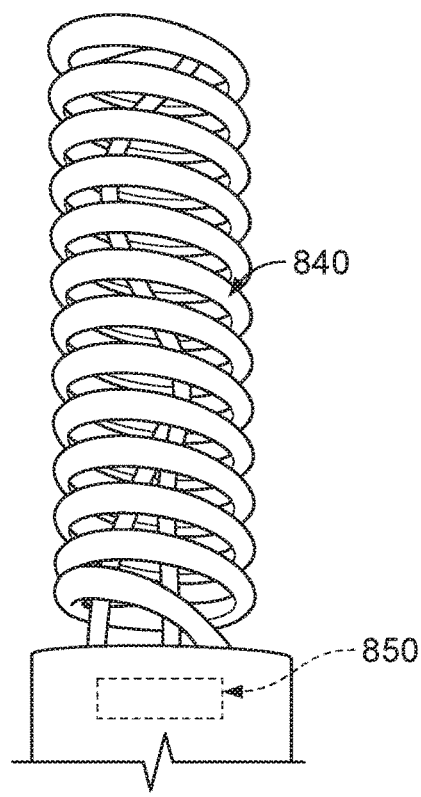
FIGS. 22 and 23 are schematic views showing alternative approaches for cooling the inner portion of the nest assembly of the system shown in FIGS. 1-6.

If desired, and looking now at FIG. 22, cylindrical TEC 280 may be replaced by a helical coil 840 which is itself cooled by a TEC element 850.

Figure 23:
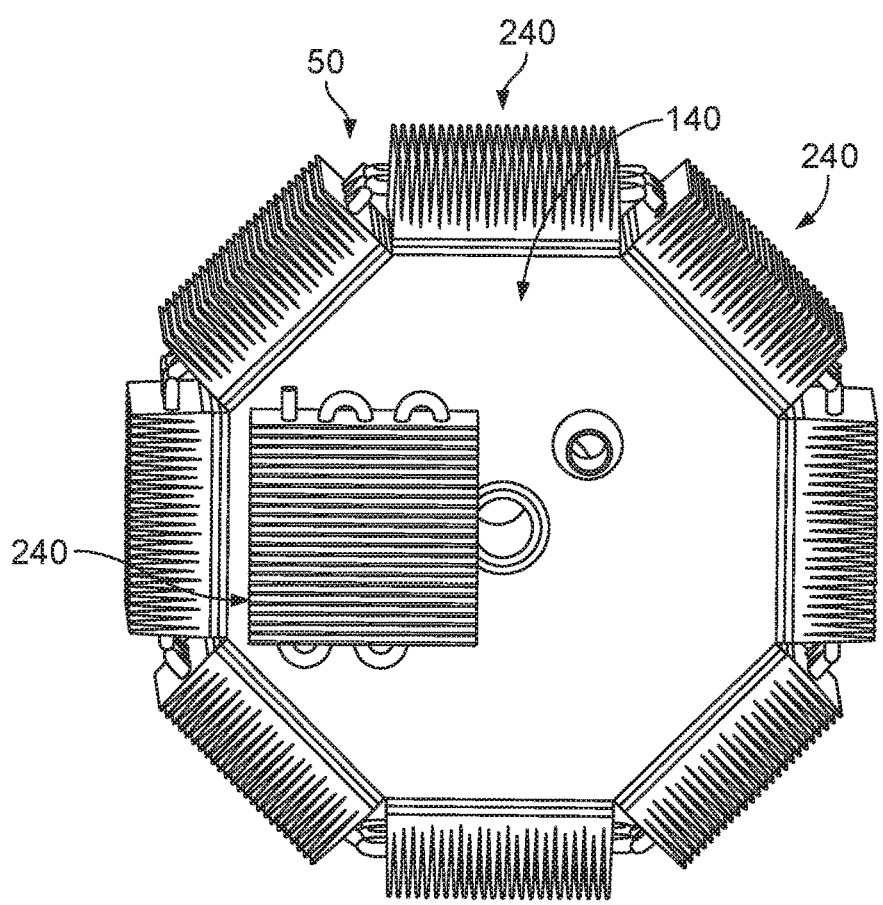
Figure 24:
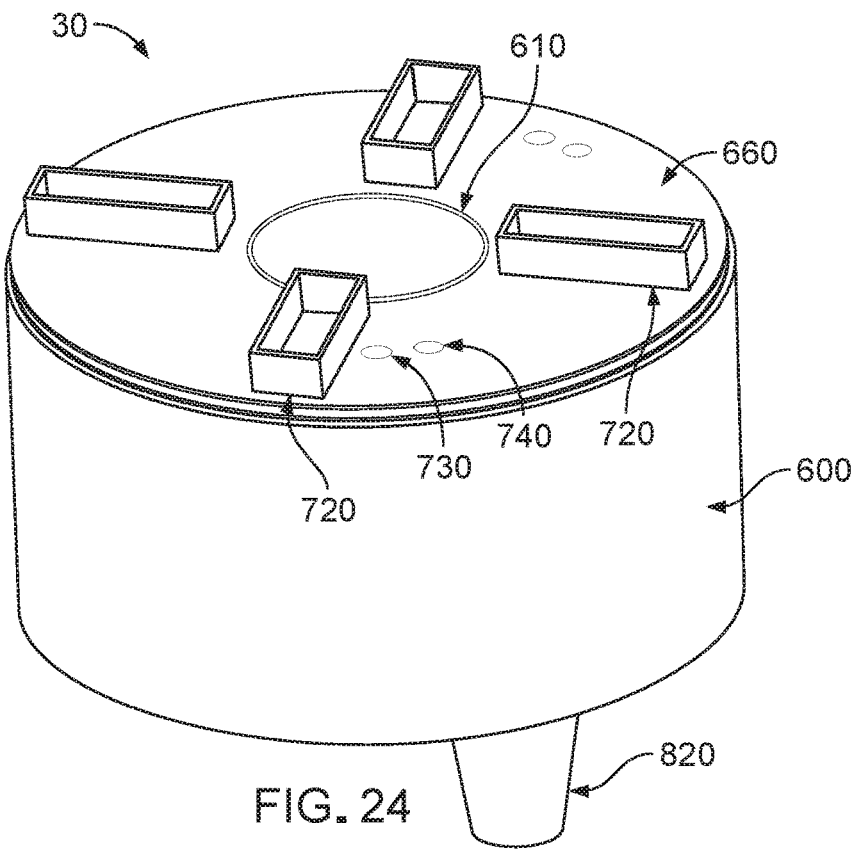
FIGS. 24-27 are schematic views showing another pod which may be used with the system shown in FIGS. 1-6.
Figure 25:
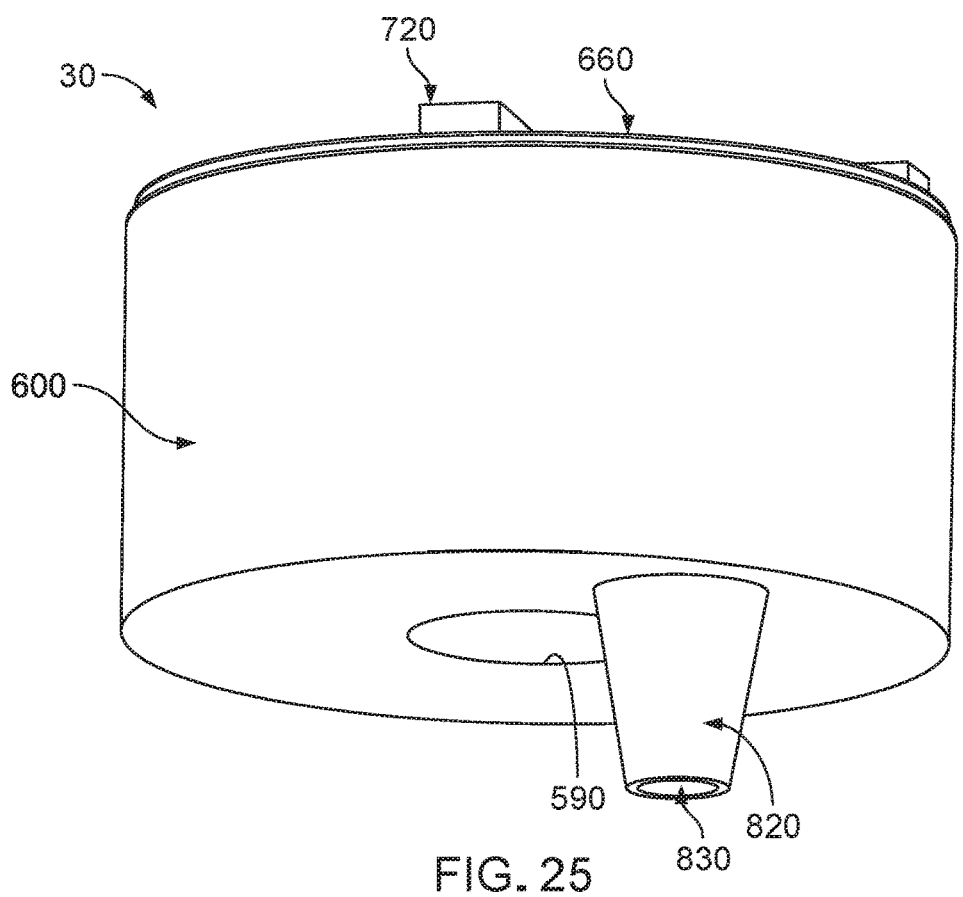
Figure 26:
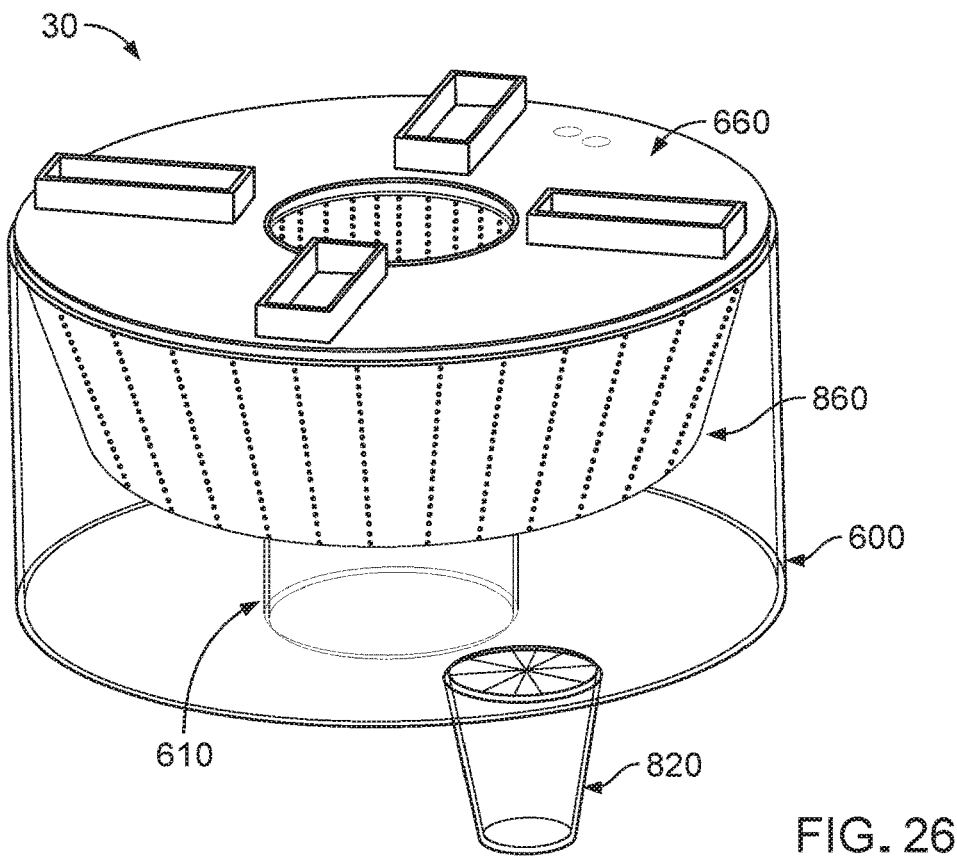
Figure 27:
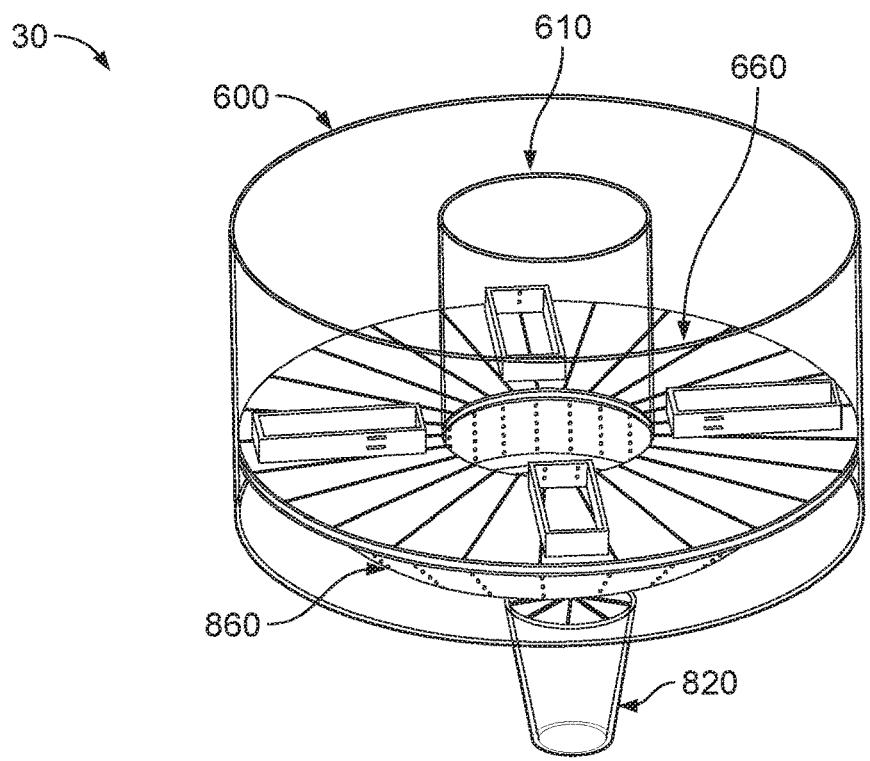

Alternatively, if desired, and looking now at FIG. 23, a TEC assembly 240 may be mounted to bottom surface 160 of nest 140 so that TEC assembly 240 can cool hollow cylinder 200 of nest 140 (as well as the bottom surface of nest 140).

Using the System to Provide a Cold Beverage

System 10 can also be used to provide a single serving of a cold beverage. Pod 30 may contain a supply of ingredients for forming cold tea (also sometimes referred to as "iced tea"), cold coffee (also sometimes referred to as "iced coffee"), cold soda, cold beer, etc. Pod 30 may contain a dry or liquid cold tea mix, a dry or liquid cold coffee mix, a dry or liquid soda mix or a dry or liquid beer mix, etc.

Where system 10 is to be used to provide a single serving of a cold beverage, a pod 30, containing a supply of the ingredients used to form the cold beverage, is inserted into nest assembly 50. Nest assembly 50 is then used to cool pod 30, and cold water is pumped from cold water tank 440 into pod 30, where it is combined with the ingredients contained within pod 30, and mixed by outer helical scraper paddle 670, inner helical scraper paddle 680 and bottom scraper paddle 690. When mixing is completed, vertical motor 380 is activated to eject the cold beverage into a waiting container.

It will be appreciated that where a cold beverage is to be produced, air may or may not be pumped into pod 30 (e.g., air may not be pumped into pod 30 when cold tea or cold coffee is being produced, and air may be pumped into pod 30 when cold soda or cold beer is being produced).

It will also be appreciated that where a cold beverage is to be produced, outer helical scraper paddle 670, inner helical scraper paddle 680 and bottom scraper paddle 690 may be omitted from pod 30 if desired.

Using the System to Provide a Hot Beverage

System 10 can also be used to provide a single serving of a hot beverage. Pod 30 may contain a supply of ingredients for forming a hot beverage, e.g., hot chocolate, hot coffee, etc. In this situation, pod 30 may contain a dry mix formed from ingredients which, when mixed with hot water, provide the desired beverage, e.g., a hot chocolate powder, an instant coffee mix, etc.

Where system 10 is to be used to provide a single serving of a hot beverage, a pod 30, containing a supply of the ingredients used to form the hot beverage, is inserted into nest assembly 50. Nest assembly 50 is then used to heat pod 30, and ambient-temperature water is pumped from ambient-temperature water tank 430 into pod 30, where it is combined with the ingredients contained within pod 30, and mixed by outer helical scraper paddle 670, inner helical scraper paddle 680 and bottom scraper paddle 690. Note that TEC assemblies 240 may be used to supply heat to the outer surfaces of nest 140 by simply reversing the direction of the electric current flow supplied to TEC elements 250, and cylindrical TEC 290 may be used to supply heat to the inner column of nest 140, whereby to heat the contents of pod 30. In addition, if desired, the ambient-temperature water in ambient-temperature water tank 430 may be heated before injection into pod 30, e.g., via resistance heaters positioned in the line between ambient-temperature water tank 430 and hollow fang 410 of plunger 330. It will be appreciated that where a hot beverage is to be produced, air is generally not pumped into pod 30.

In many cases, it may be desirable to "brew" a hot beverage by passing water through a supply of granulated ingredients, e.g., such as in the case of coffee or tea.

FIGS. 24-27 are perspective views of pod 30 with a filter 860 which contains a supply of the granulated ingredients (e.g., ground coffee beans, tea leaves, etc.) which is to be brewed. Filter 860 is disposed adjacent to cap 660, e.g., filter 860 is secured to cap 660, and outer helical scraper paddle 670, inner helical scraper paddle 680 and bottom scraper paddle 690 are omitted from pod 30. Note also that when plunger 330 collapses cap 660 towards base 580, filter 860 will preferably also collapse, whereby to allow compression of the granulated ingredients contained within filter 860, so as to press the fluid out of filter 860, e.g., in the manner of a so-called "French Press" coffee maker. It should also be appreciated that filter 860 is constructed so that it will maintain its structural integrity during collapse so that the granulated contents of filter 860 do not pass out of pod 30.

Cabinet Configuration

Figure 28:
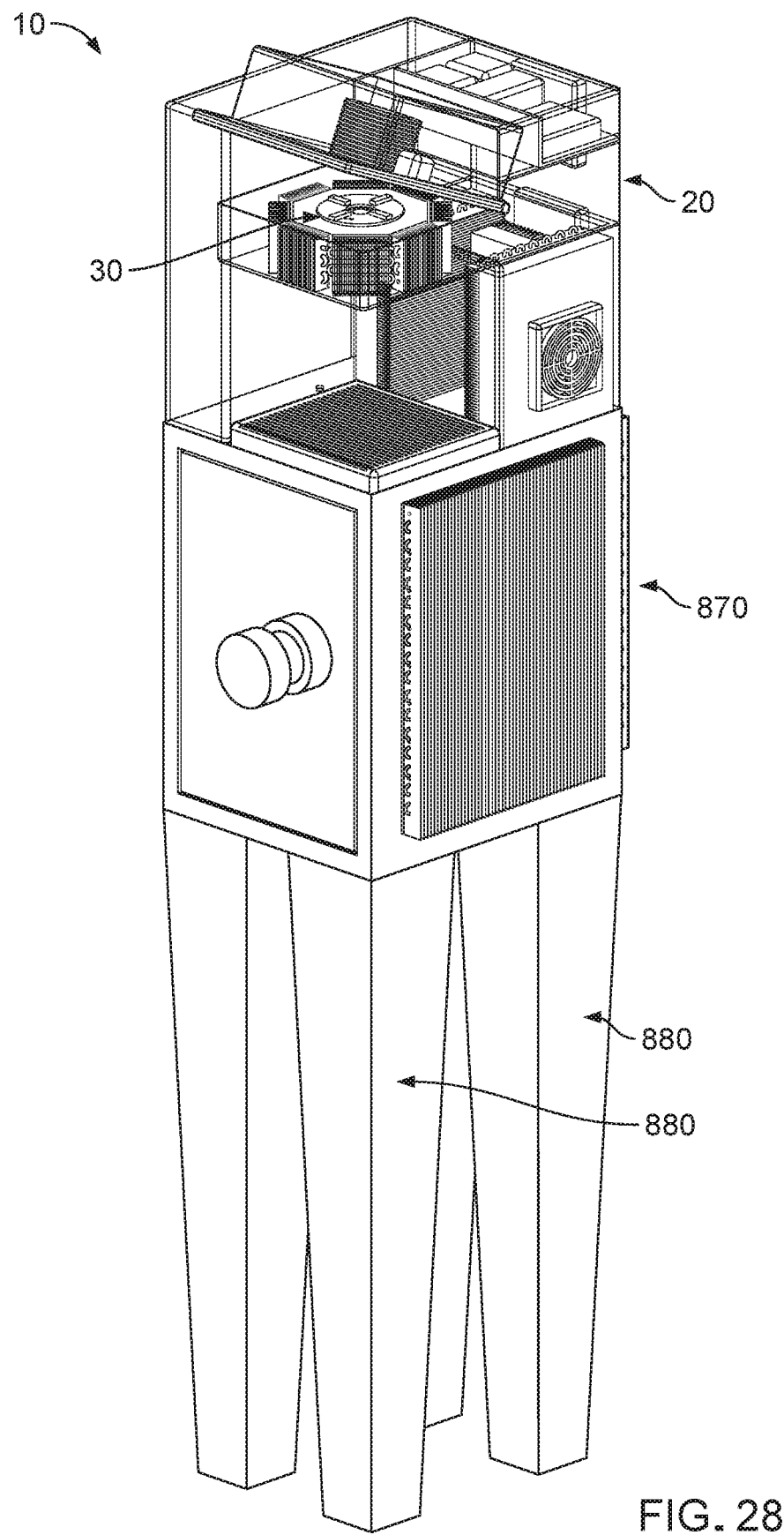
FIG. 28 is a schematic view showing another novel system for providing a single serving of a frozen confection.

FIG. 28 is a perspective view of machine 20 mounted to a cabinet 870, where cabinet 870 sits on legs 880. Cabinet 870 can include additional cooling apparatus for removing heat from heat dissipation assembly 90 (e.g., additional heat pipes, condensers and fans, or a conventional refrigeration unit, etc.). Cabinet 870 may also be configured so as to house fresh pods 30 and/or containers for receiving the frozen confections (e.g., bowls and cones), cold beverages (e.g., cups) and hot beverages (e.g., cups).

Chilling the Pod with a Refrigeration Coil

Figure 30:
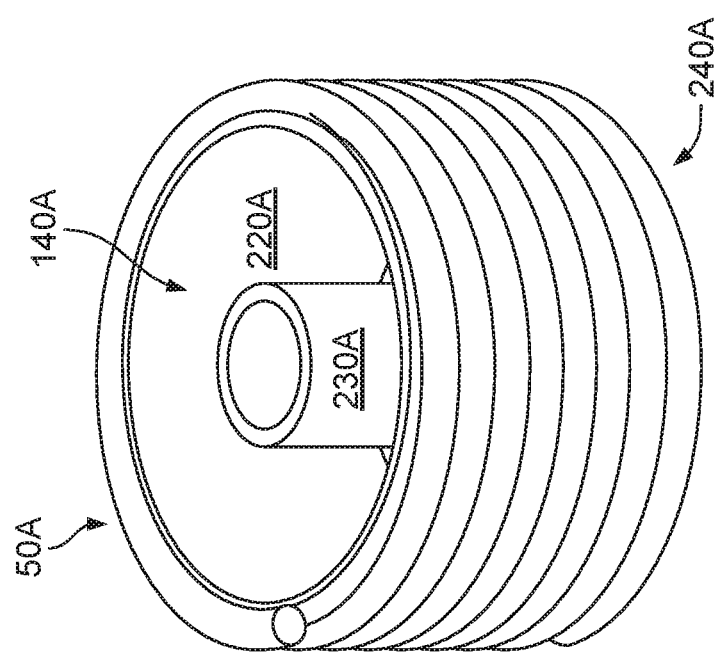
FIGS. 29-31 are schematic views showing another novel system for providing a single serving of a frozen confection.
Figure 29:
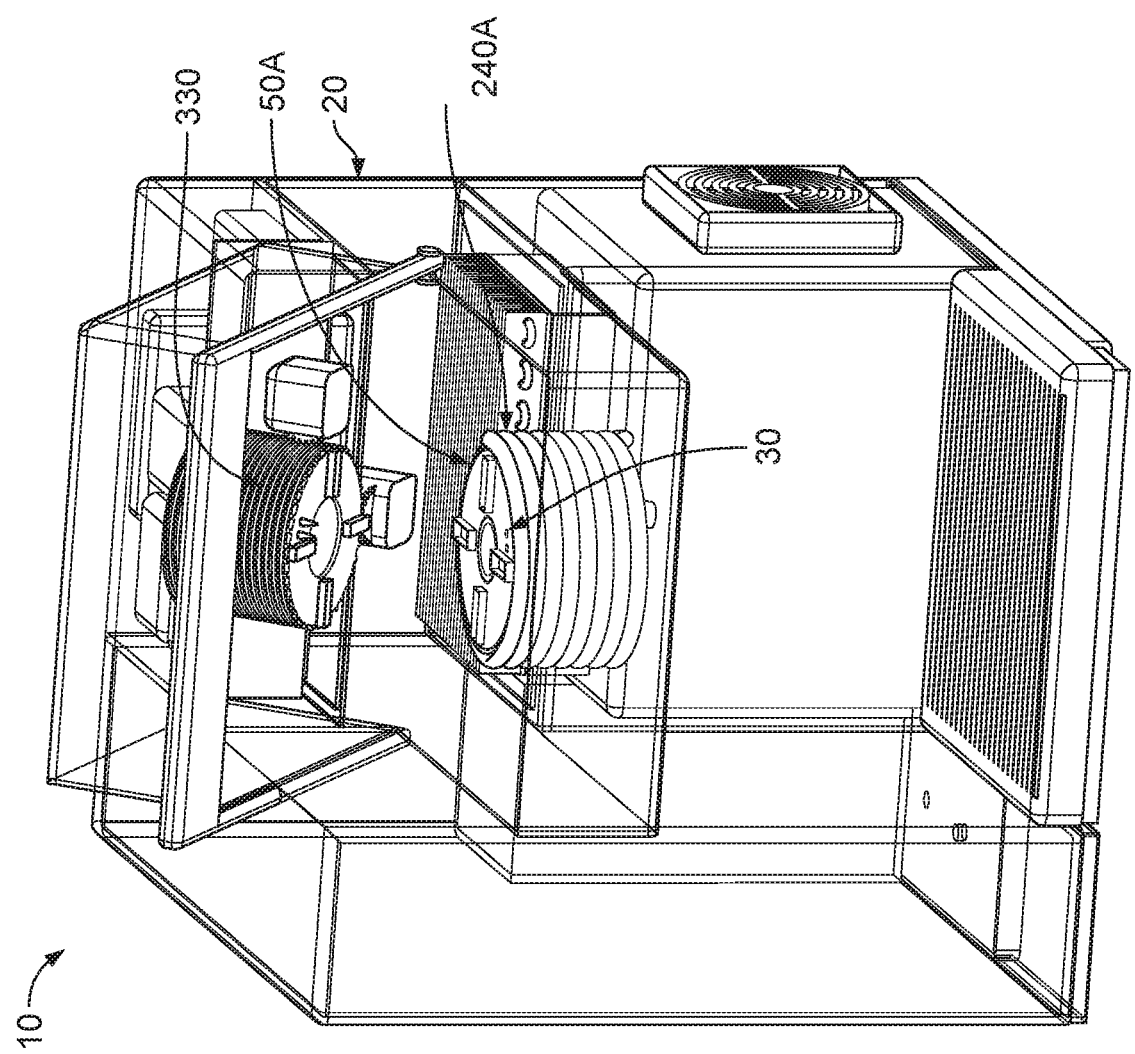
Figure 31:
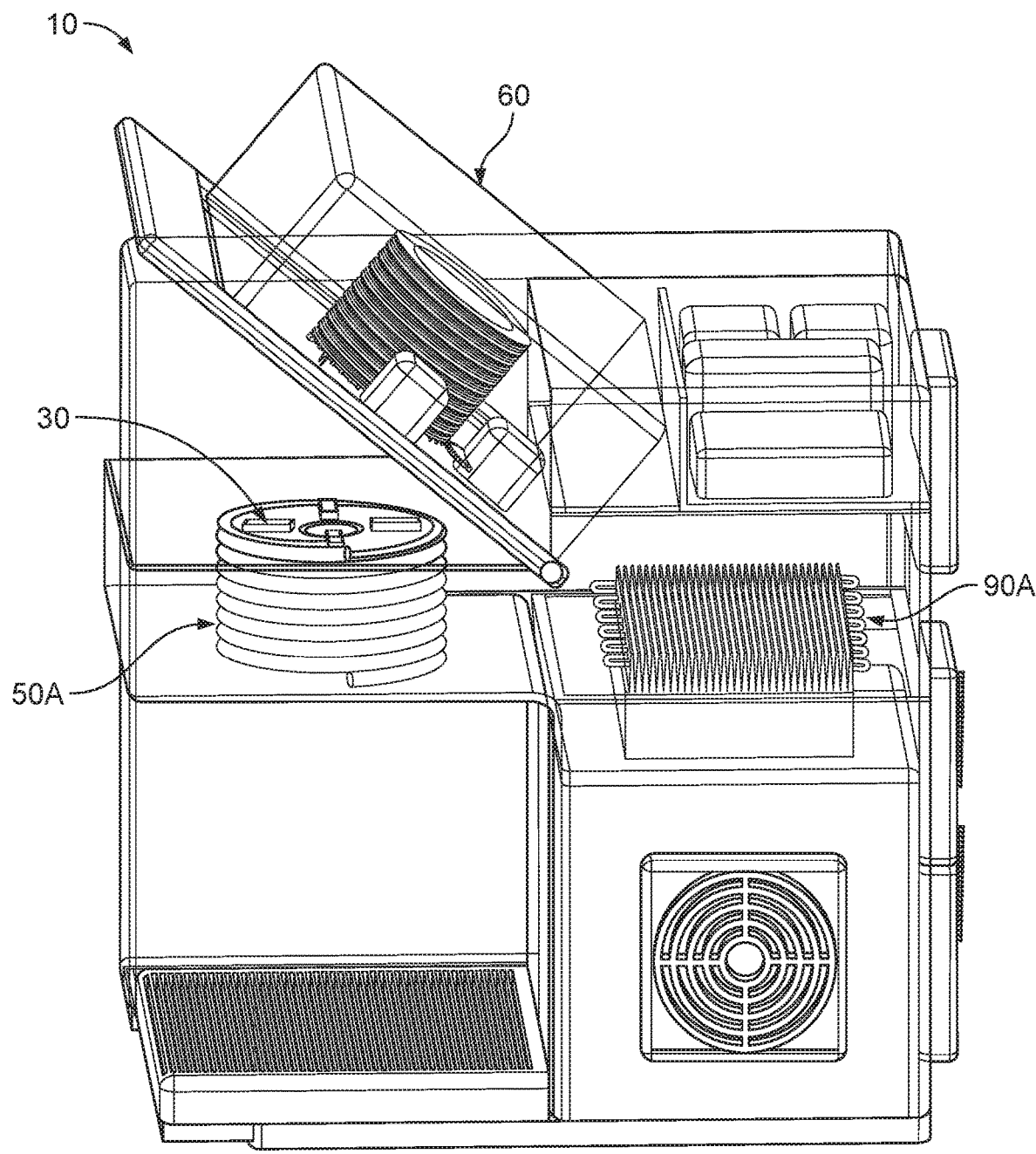
Figure 32:
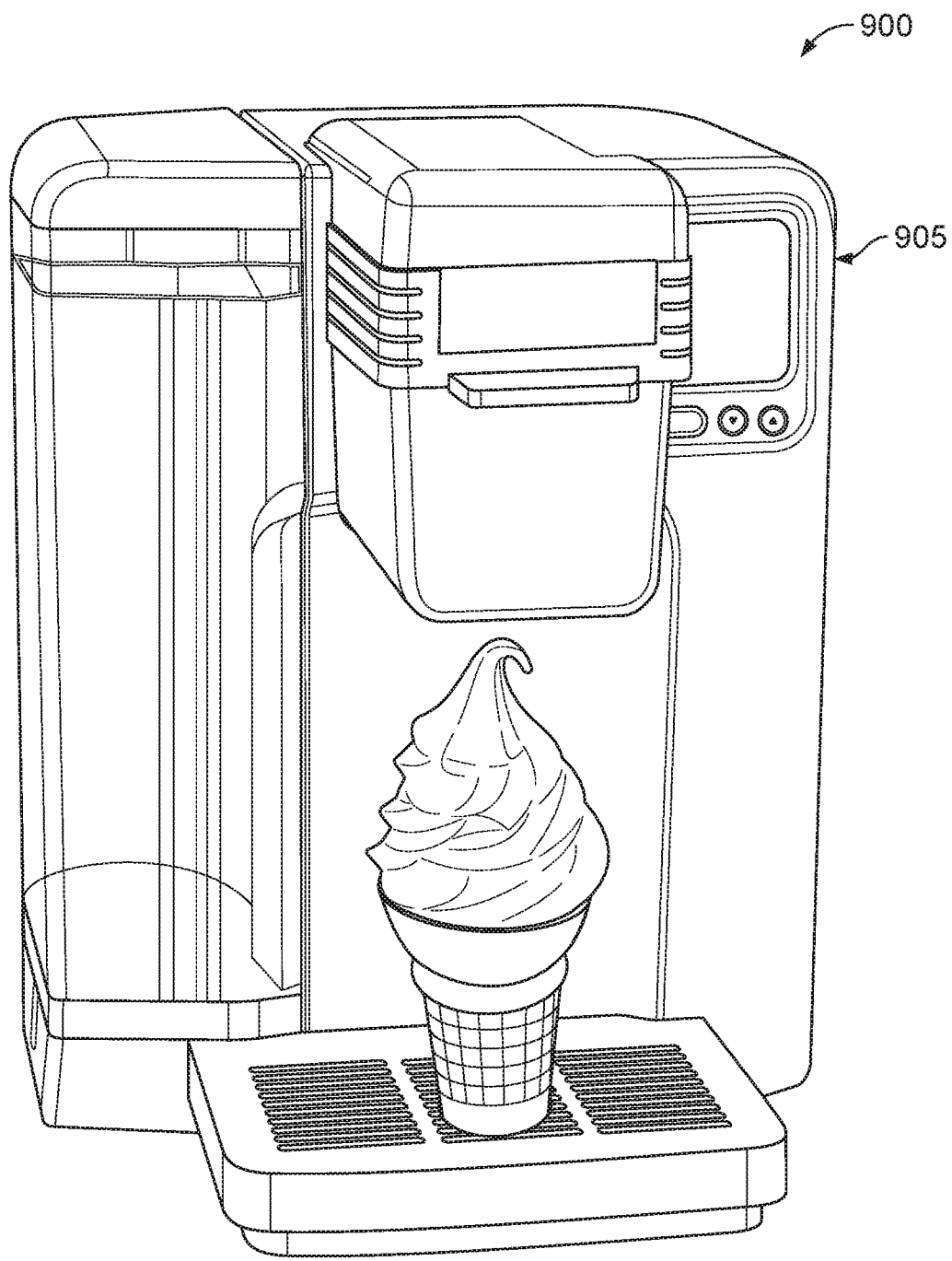
FIGS. 32-35 are schematic views showing another novel system including a compressor-cooled machine with a fixed-cap pod.
Figure 33:
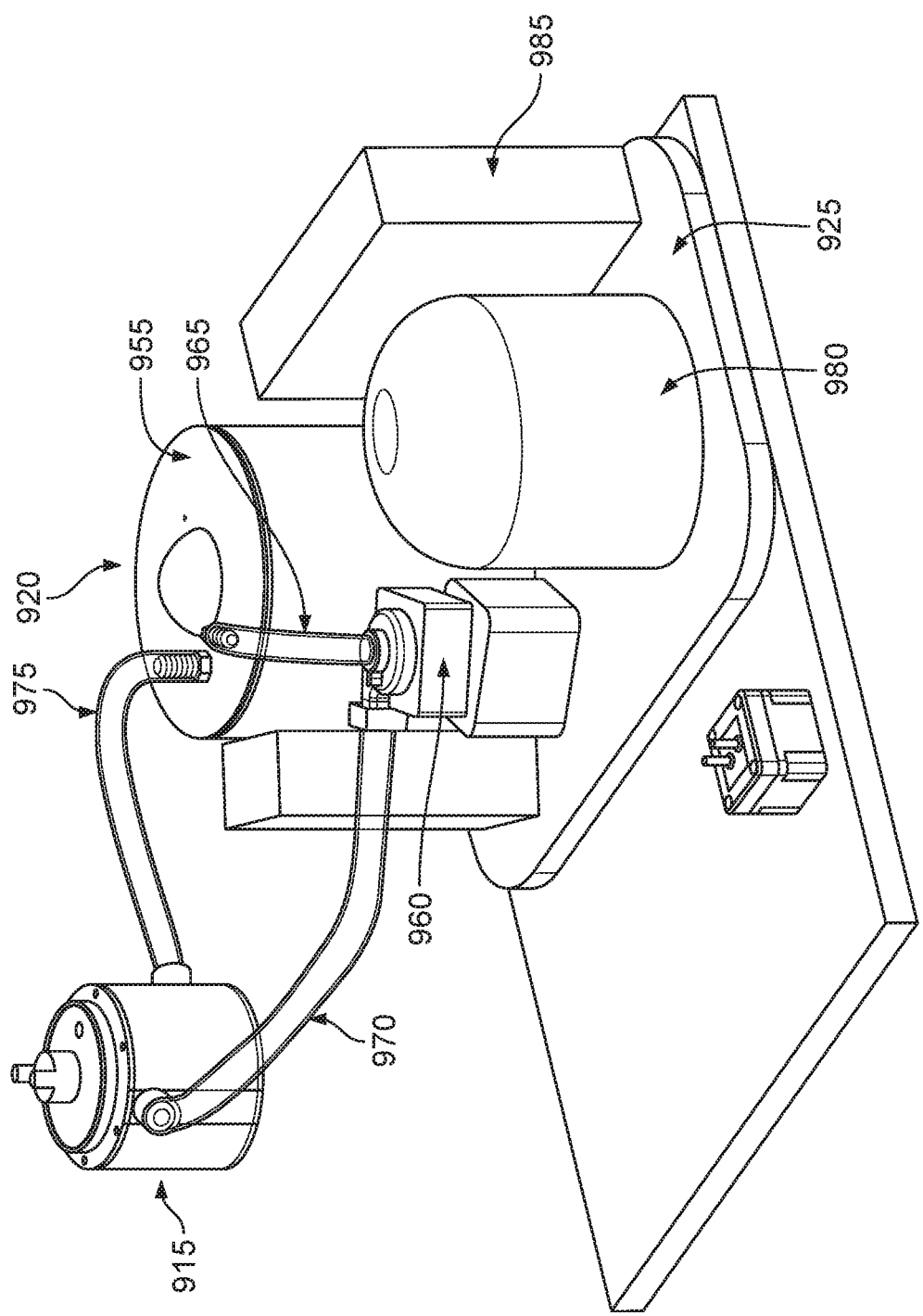
Figure 34:
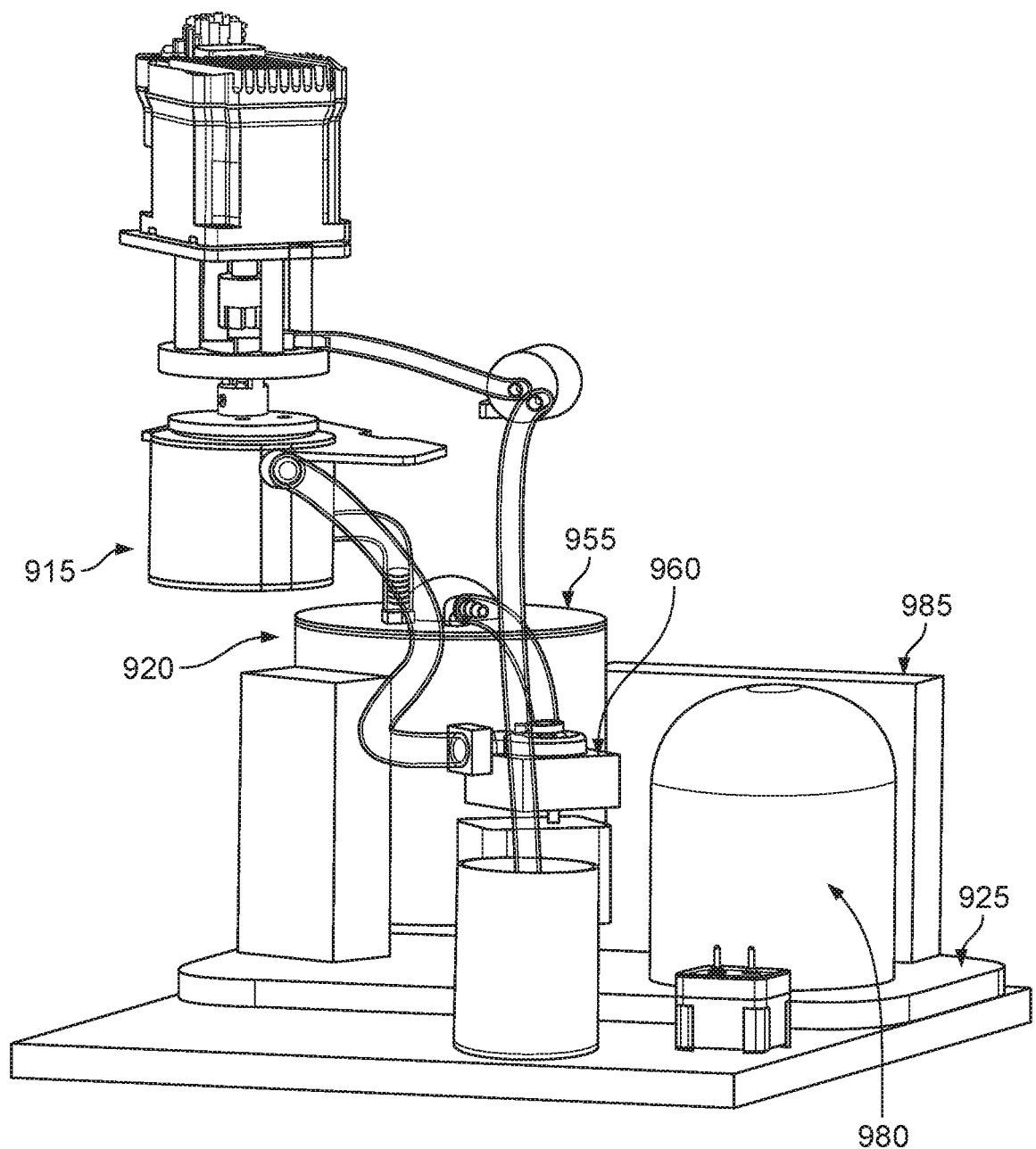
Figure 35:
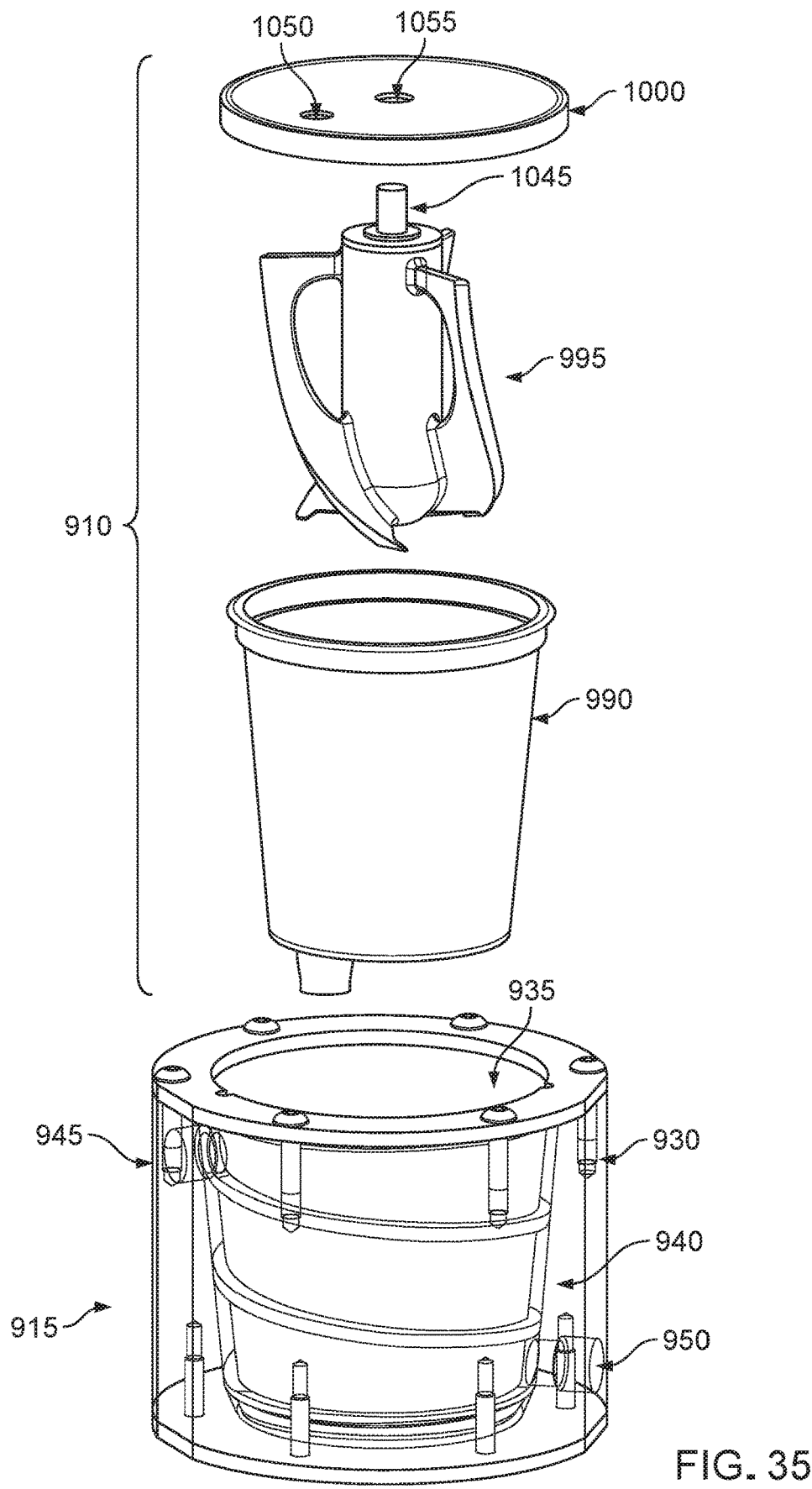
Figure 35A:
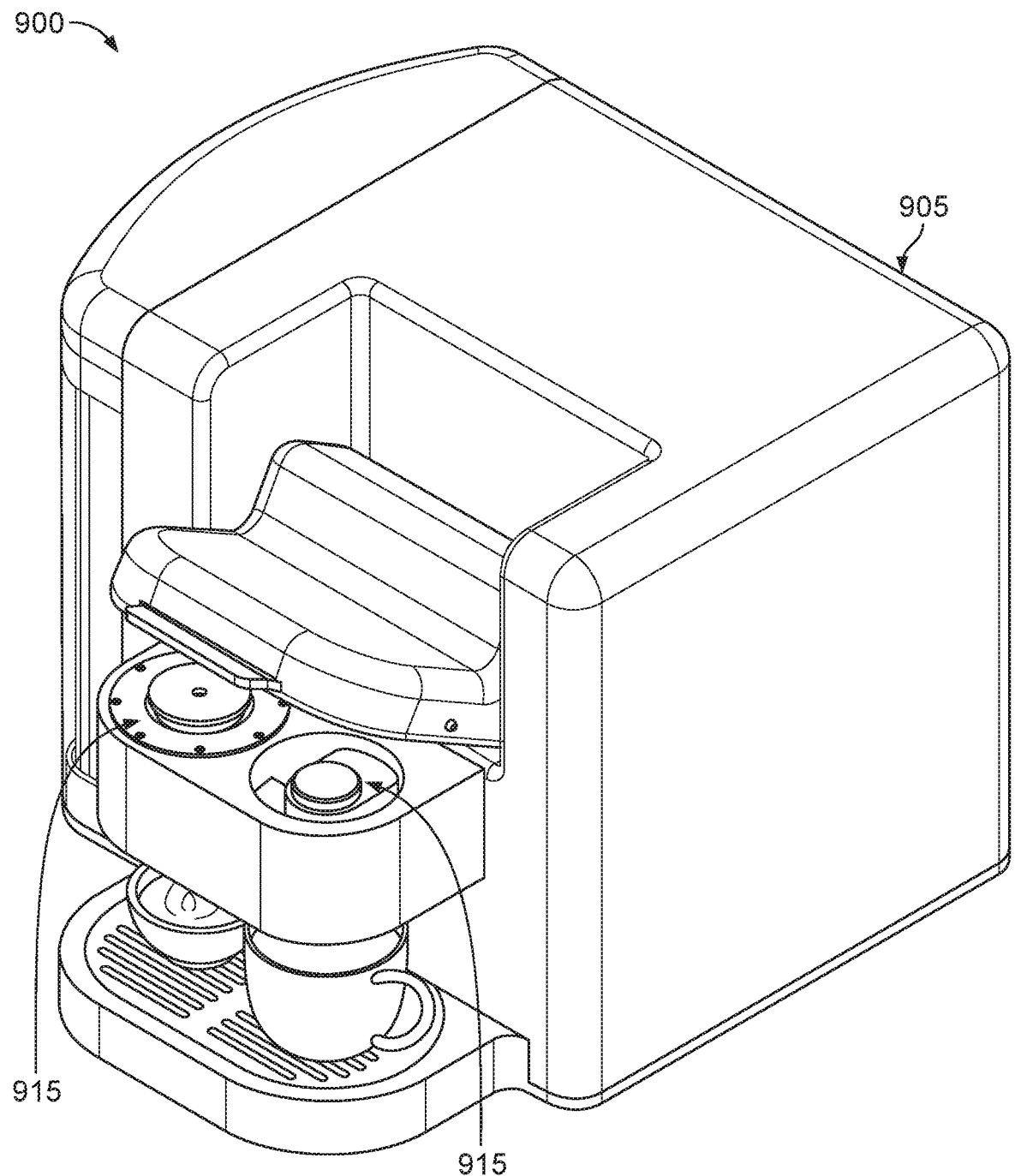
FIG. 35A is a schematic view showing another novel system including a pair of nests for producing a desired cold confection or a desired hot or cold beverage.
Figure 35B:
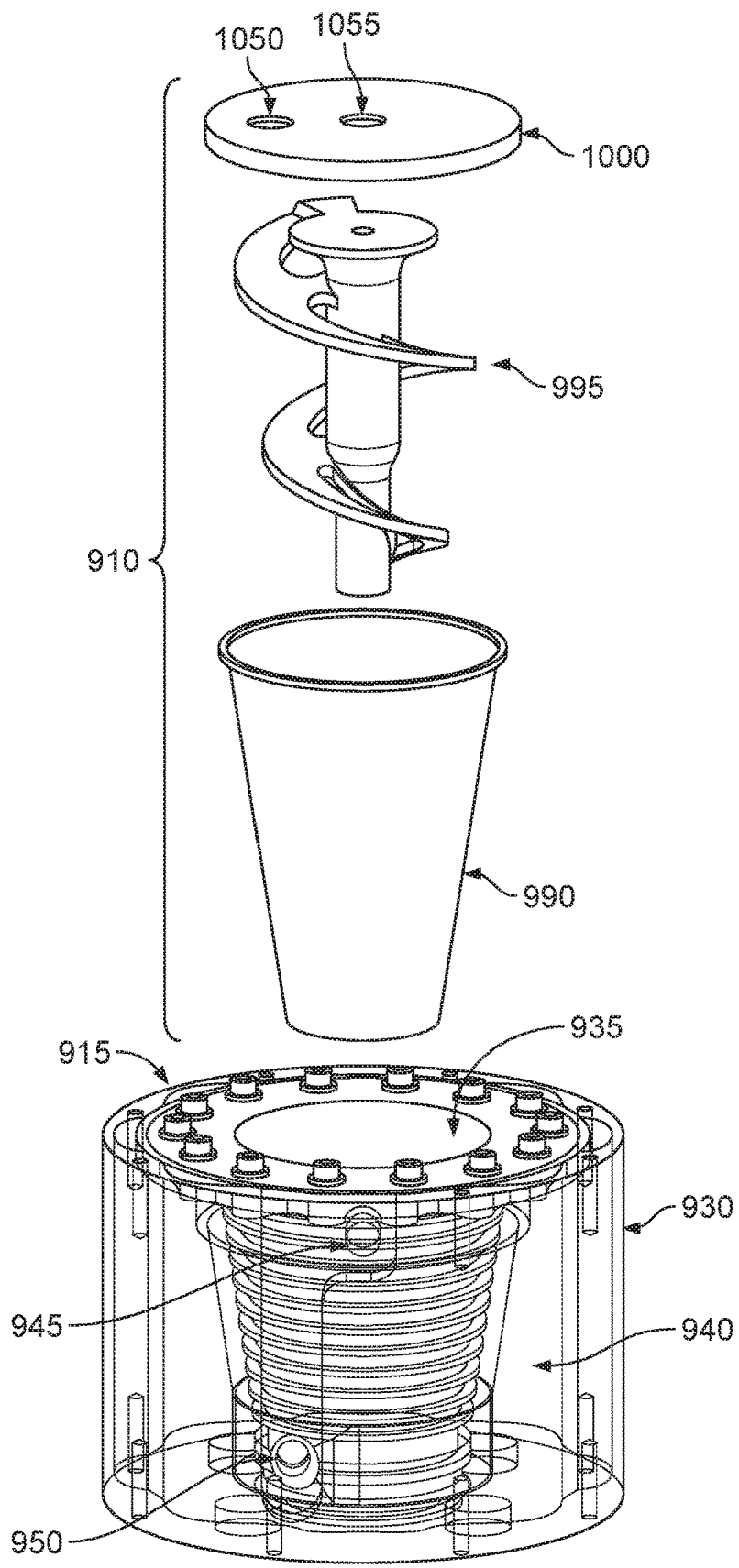
FIGS. 35B and 35C are schematic views showing additional nest and pod configurations.
Figure 35C:
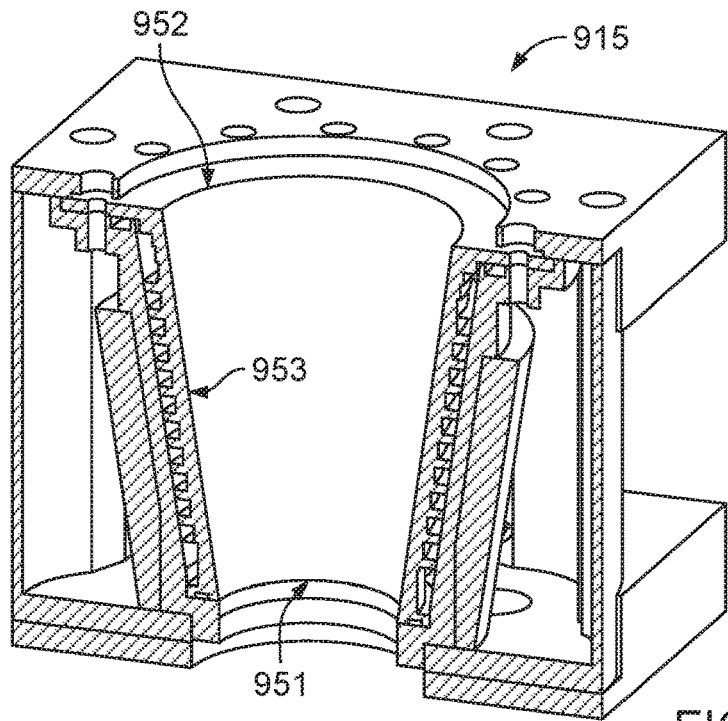

FIGS. 29-31 are perspective views of an alternative nest assembly 50A replacing nest assembly 50. Nest 140A in the form of a torus characterized by an outer wall 220A and an inner wall 230A, wherein the torus is formed out of a high heat-transfer material (e.g., aluminum), and further wherein TEC assemblies 240 are replaced by a refrigeration coil 240A which is connected to heat dissipation assembly 90A, wherein heat dissipation assembly 90A includes a compressor for driving refrigeration coil 240A.

It will be appreciated that, as a result of this construction, nest assembly 50A (and hence a pod 30 disposed in nest assembly 50A) can be cooled via a conventional refrigeration system. This construction can be advantageous since it can quickly cool a pod 30 to −40 degrees C., which is beyond the thermal performance of TEC elements 250.

Alternative Nest and Pod Constructions

In the foregoing disclosure, nest assembly 50 and nest assembly 50A include an internal cooling element (e.g., hollow cylinder 200 containing TEC 280) as well as external cooling elements (e.g., TEC assemblies 240), and pod 30 includes an inner opening (i.e., the lumen of inner hollow tube 610) for receiving the internal cooling element of nest assemblies 50 and 50A. However, if desired, the internal cooling element may be omitted from nest assemblies 50 and 50A, in which case the inner opening of pod 30 may also be omitted.

Compressor-Cooled Machine with Fixed-Cap Pod

FIGS. 32-35, 35A, 35B and 35C are perspective views of another novel system 900 for providing a single serving of a frozen confection, e.g., ice cream (soft serve or hard), frozen yogurt, a frozen protein shake, a smoothie, etc. A single serving of a frozen confection may be considered to be approximately 2 fluid ounces to approximately 8 fluid ounces.

System 900 is also capable of providing a single serving of a cold beverage, and/or a single serving of a hot beverage.

System 900 may include two nests 915, where one nest 915 is configured to receive a frozen confection pod at 5-8 ounces and another adjacent nest 915, which may be smaller in size, is configured to receive a coffee pod (e.g., a K-Cup pod) or a cold beverage pod (e.g., an iced tea pod). Water (hot or cold) is directed to the proper nest 915 to form the desired cold confection or the desired hot or cold beverage. See, for example, FIG. 35A, which shows two nests 915 for producing a desired cold confection or a desired hot or cold beverage (note that the configuration of system 900 may differ slightly depending on whether a single nest or double nest is to be provided). Preferably, a pod detector (not shown, the pod detectors are substantially similar to pod sensor 235) is provided in each nest 915 to identify which nest has received which type of pod (e.g., frozen confection, hot coffee, iced tea, etc.) so that the machine sends the appropriate cold or hot water to the appropriate nest.

System 900 generally includes a machine 905 and a pod 910, wherein machine 905 is configured to, among other things, receive pod 910 containing a supply of ingredients for forming a single serving of the frozen confection, cool pod 910 (and its contents), introduce cold water and air into pod 910 (where appropriate, see below), agitate the contents of pod 910 so as to form the frozen confection, and then eject 3 to 8 ounces of the frozen confection from pod 910 directly into the container (e.g., a pre-chilled bowl, an ambient bowl, a cone, etc.) from which it will be consumed.

System 900 is able to form a frozen confection without introducing water and/or air into pod 910 (see below).

Machine 905

Machine 905 is generally similar to machine 20 described above, except that machine 905 uses a compressor to cool pod 910 and water supply 70 may be omitted in some circumstances (see below). More particularly, machine 905 includes a nest 915 for receiving pod 910, a coolant unit 920 for cooling nest 915, and a refrigeration unit 925 for cooling coolant unit 920. Machine 905 weighs less than 50 lbs and is configured to produce and dispense single servings of frozen confections or hot or cold beverages in quantities of approximately 1 quart or less within 5 minutes or less. The frozen confection will have between 10-60% overrun (i.e., air content) per single serving batch. It should be appreciated that the amount of overrun varies according to the particular product being made in pod 910.

More particularly, nest 915 includes a body 930 defining a tapered (preferably frustoconical) recess 935 for receiving a correspondingly tapered (preferably frustoconical) pod 910 and an interior chamber 940 for cooling recess 935 of nest 915. Nest 915 further includes an inlet 945 leading to interior chamber 940 and an outlet 950 leading from interior chamber 940.

Tapered recess 935 of nest 915 includes a smaller first end 951, a larger second end 952 and a tapered side wall 953 extending between the smaller first end 951 and the larger second end 952. Tapered recess 935 is frustoconical. Tapered side wall 953 of recess 935 has a taper of approximately 5 degrees or greater. Smaller first end 951 may be closed off. Smaller first end 951 may be partially open. Smaller first end 951 may be completely open. See, for example, FIG. 35B and FIG. 35C, which show additional configurations for nest 915 (and which also show additional configurations for pod 910).

It should be appreciated that where smaller first end 951 of nest 915 is either partially open or completely open, it may be possible to create a better fit of pod 910 in nest 915. More particularly, with the bottom of nest 915 partially or fully open, pod 910 fits in nest 915 without "bottoming out" so a better fit is created between the walls of the nest and the walls of the pod, thereby allowing for much more efficient cooling of the pod.

Coolant unit 920 includes a reservoir 955 for containing a supply of coolant, a circulation motor 960, a line 965 connecting reservoir 955 to circulation motor 960, a line 970 connecting circulation motor 960 with inlet 945 of nest 915, and a line 975 connecting outlet 950 of nest 915 with reservoir 955. As a result of this construction, coolant contained in reservoir 955 can be circulated through interior chamber 940 of nest 915 so as to cool a pod 910 contained in recess 935 of nest 915.

Refrigeration unit 925 includes a refrigeration cycle including a compressor 980, a condenser 985, an expansion valve (not shown) located downstream of the condenser, and an evaporator (not shown, but could be an immersion coil in a coolant tank) located at reservoir 955 of coolant unit 920, such that compressor 980 can drive a refrigerant through the refrigeration cycle to cool the coolant disposed within reservoir 955 of coolant unit 920.

As a result of this construction, refrigeration unit 925 can be used to cool coolant unit 920, and coolant unit 920 can be used to cool a pod 910 disposed in nest 915. Note that by selecting an appropriate coolant for coolant unit 920, and by providing a reservoir 955 of appropriate size, sufficient "cold" can be accumulated within coolant unit 920 so that multiple batches of frozen confection can be sequentially produced with substantially no lag time.

Eutectic Solution

At least one container holding a eutectic solution is disposed adjacent to the pod seat of nest 915. This eutectic solution is used to store "cold" at the nest. More particularly, coolant unit 920 is used to cool the eutectic solution to the point of freezing, and then the eutectic solution absorbs heat from pod 910, whereby to produce the frozen confection.

More particularly, while system 900 is idle (i.e., prior to producing servings of a frozen confection), compressor 980 of refrigeration unit 925 is turned on. Compressor 980 circulates its refrigerant (e.g., Freon, Norflurane referred to as R-134A, R-407C, R-404A, R-410A, etc.) through its refrigeration cycle so as to cool the coolant in reservoir 955 of coolant unit 920, and then the coolant in reservoir 955 cools the eutectic solution contained within at least one container in nest 915 to 0° C. to −114° C. Once the eutectic solution surrounding nest 915 is cooled to 0° C. to −114° C., system 900 automatically turns off compressor 980 of refrigeration unit 925. Note that compressor 980 of refrigeration unit 925 does not need to run while system 900 is making the frozen confection, since the already-cooled coolant in coolant unit 920, and/or the eutectic solution in at least one container in the nest, is actually used to cool a pod 910 in nest 915. Of course, compressor 980 of refrigeration unit 925 may be run while system 900 is making the frozen confection if desired.

It will be appreciated that the cold lost from the eutectic solution by removing heat from pod 910 is replaced by a heat exchange as the cooled eutectic solution slowly warms. This maintains the temperature of nest 915 between −40° C. and 0° C. while making multiple pods of a frozen confection in quick succession. As the eutectic solution warms, circulation motor 960 of coolant unit 920 keeps pumping coolant to the nest to help carry the cooling load of the eutectic container. Additionally, compressor 980 of refrigeration unit 925 automatically turns back on, pumping refrigerant to coolant unit 920 (which is re-cooling the eutectic solution).

Between cooling of a pod and/or between uses of machine 905, frost may accumulate on the inside of nest 915. Flashing heat to the surface of nest 915 defrosts the surface of nest 915. This flash heat may be in the form of warm air, induction coil heat, resistance heat, etc.

It should be appreciated that the eutectic solution includes a phase change material. In this respect, it should also be appreciated that phase change materials (PCMs) are compositions that store and release thermal energy during the processes of warming and cooling. Phase change materials typically release (in the form of latent heat) large amounts of energy upon cooling, but absorb equal amounts of energy from the immediate environment upon warming. In this way, phase change materials enable thermal energy storage: heat or cold being stored at one period of time and used at a later point in time.

Figure 36:
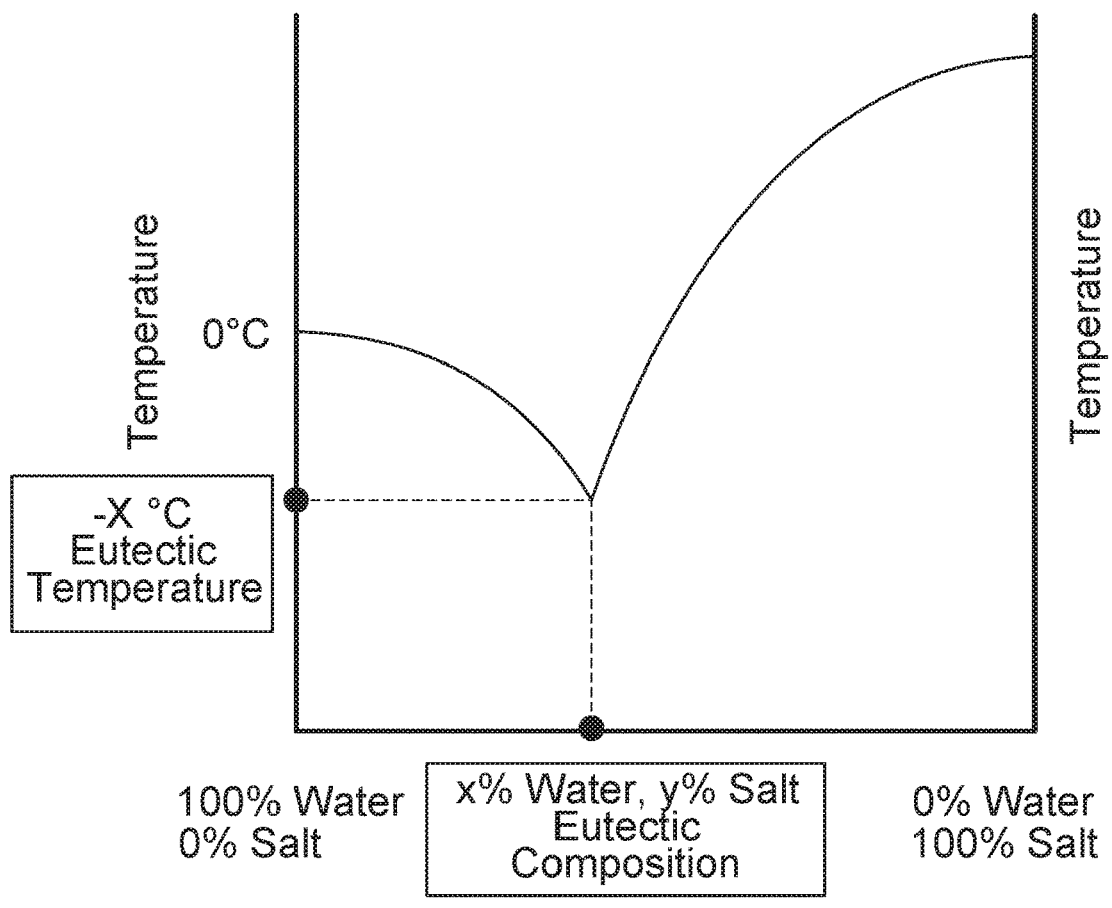
FIG. 36 is a graph showing the eutectic point of a eutectic solution.

It should be appreciated that a simple, cheap and effective phase change material is water/ice. Unfortunately, water/ice has a freezing point of 0° C. (+32° F.), which precludes water/ice from the majority of energy storage applications. However, a number of alternative phase change materials have been identified and developed that cool and warm like water/ice, but at temperatures from the cryogenic range to several hundred degrees centigrade. When salts are added to water, they depress the freezing point of the water. Adding more salt generally depresses the freezing temperature further, but these solutions do not freeze cleanly and at a precise temperature, instead they tend to form a slush. However, if a particular salt at a particular concentration is added to water, the resulting solution freezes and melts cleanly at a constant temperature, releasing and storing large amounts of energy as it does so. This temperature is called the eutectic point and the composition is called a eutectic solution. This is represented in the simplified graph shown in FIG. 36. The curved line on the graph of FIG. 36 represents the freezing curve. Starting from the left of the curve, the composition is 100% water and the freezing point is 0° C. (32° F.). As salt is added, the freezing point of the salt/water mixture decreases. When freezing occurs in this section of the graph, only pure water freezes out of solution and the salt remains in solution. If more salt is added, the freezing point depresses further until the eutectic point is reached at the lowest freezing point on the curve. Some PCMs are a gel. PCMs can be made of sodium polyacrylate, salt hydrates, or paraffins which are high molecular mass hydrocarbons with a waxy consistency at room temperature. Paraffins are made up of straight chain hydrocarbons and vegetable based PCMs. Below is a list of sub-zero eutectic PCM solutions with phase changes ranging from 0 to −114° C.

| PCM Type | Phase Change Temperature (° C.) | Phase Change Temperature (° F.) | Density (kg/m3) | Density (lb/ft3) | Latent Heat Capacity (kJ/kg) | Latent Heat Capacity (Btu/lb) |
|---|---|---|---|---|---|---|
| E0 | 0 | 32 | 1,000 | 62.4 | 332 | 143 |
| E-2 | −2.0 | 28 | 1,070 | 66.8 | 306 | 132 |
| E-3 | −3.7 | 25 | 1,060 | 66.2 | 312 | 134 |
| E-6 | −6.0 | 21 | 1,110 | 69.3 | 275 | 118 |
| E-10 | −10.0 | 14 | 1,140 | 71.2 | 286 | 123 |
| E-11 | −11.6 | 11 | 1,090 | 68.0 | 301 | 129 |
| E-12 | −12.3 | 10 | 1,110 | 69.3 | 250 | 108 |
| E-14 | −14.8 | 5 | 1,220 | 76.2 | 243 | 105 |
| E-15 | −15.0 | 5 | 1,060 | 66.2 | 303 | 130 |
| E-19 | −18.7 | −2 | 1,125 | 70.2 | 282 | 121 |
| E-21 | −20.6 | −5 | 1,240 | 77.4 | 263 | 113 |
| E-22 | −22.0 | −8 | 1,180 | 73.7 | 234 | 101 |
| E-26 | −26.0 | −15 | 1,250 | 78.0 | 280 | 112 |
| E-29 | −29.0 | −20 | 1,420 | 88.6 | 222 | 95 |
| E-32 | −32.0 | −26 | 1,290 | 80.5 | 243 | 105 |
| E-34 | −33.6 | −28 | 1,205 | 75.2 | 240 | 103 |
| E-37 | −36.5 | −34 | 1,500 | 93.6 | 213 | 92 |
| E-50 | −49.8 | −58 | 1,325 | 82.7 | 218 | 94 |
| E-75 | −75.0 | −103 | 902 | 56.3 | 102 | 44 |
| E-78 | −78.0 | −108 | 880 | 54.9 | 115 | 49 |
| E-90 | −90.0 | −130 | 786 | 49.1 | 90 | 39 |
| E-114 | −114.0 | −173 | 782 | 48.8 | 107 | 46 |

| PCM Type | Volumetric Heat Capacity (MJ/m3) | Volumetric Heat Capacity (Btu/ft3) | Specific Heat Capacity (kJ/kgK) | Specific Heat Capacity (Btu/lb° F.) | Thermal Conductivity (W/mK) | Thermal Conductivity (Btu/ft2h° F.) |
|---|---|---|---|---|---|---|
| E0 | 332 | 8,911 | 4.186 | 0.992 | 0.580 | 0.335 |
| E-2 | 327 | 8,777 | 3.80 | 0.900 | 0.580 | 0.335 |
| E-3 | 331 | 8,884 | 3.84 | 0.910 | 0.600 | 0.347 |
| E-6 | 305 | 8,186 | 3.83 | 0.907 | 0.560 | 0.324 |
| E-10 | 326 | 8,750 | 3.33 | 0.789 | 0.560 | 0.324 |
| E-11 | 328 | 8,804 | 3.55 | 0.841 | 0.570 | 0.329 |
| E-12 | 278 | 7,462 | 3.47 | 0.822 | 0.560 | 0.324 |
| E-14 | 296 | 7,945 | 3.51 | 0.832 | 0.530 | 0.306 |
| E-15 | 321 | 8,616 | 3.87 | 0.917 | 0.530 | 0.306 |
| E-19 | 344 | 9,233 | 3.29 | 0.779 | 0.580 | 0.335 |
| E-21 | 326 | 8,750 | 3.13 | 0.741 | 0.510 | 0.295 |
| E-22 | 276 | 7,408 | 3.34 | 0.791 | 0.570 | 0.329 |
| E-26 | 325 | 8,723 | 3.67 | 0.869 | 0.580 | 0.335 |
| E-29 | 264 | 7,086 | 3.69 | 0.874 | 0.640 | 0.370 |
| E-32 | 313 | 8,401 | 2.95 | 0.699 | 0.560 | 0.324 |
| E-34 | 286 | 7,676 | 3.05 | 0.723 | 0.540 | 0.312 |
| E-37 | 302 | 8,106 | 3.15 | 0.746 | 0.540 | 0.312 |
| E-50 | 283 | 7,596 | 3.28 | 0.777 | 0.560 | 0.324 |
| E-75 | 92 | 2,469 | 2.43 | 0.576 | 0.170 | 0.098 |
| E-78 | 101 | 2,716 | 1.96 | 0.464 | 0.140 | 0.081 |
| E-90 | 71 | 1,906 | 2.56 | 0.606 | 0.140 | 0.081 |
| E-114 | 84 | 2,255 | 2.39 | 0.566 | 0.170 | 0.098 |

Compressor 980

If desired, a conventional reciprocating compressor (e.g., the Tecumseh TC1413U-DS7C compressor) may be used for compressor 980 of refrigeration unit 925. Alternatively, rotary compressors (e.g., such as those made by Aspen Systems, Samsung and Rigid) may be used for compressor 980 of refrigeration unit 925. Alternatively, a Direct Current Compressor R290-12-24 V by Danfoss with evaporating temperatures ranging from −40° C. to 10° C. may be used.

Tubing for the Refrigeration Cycle

Figure 37A:
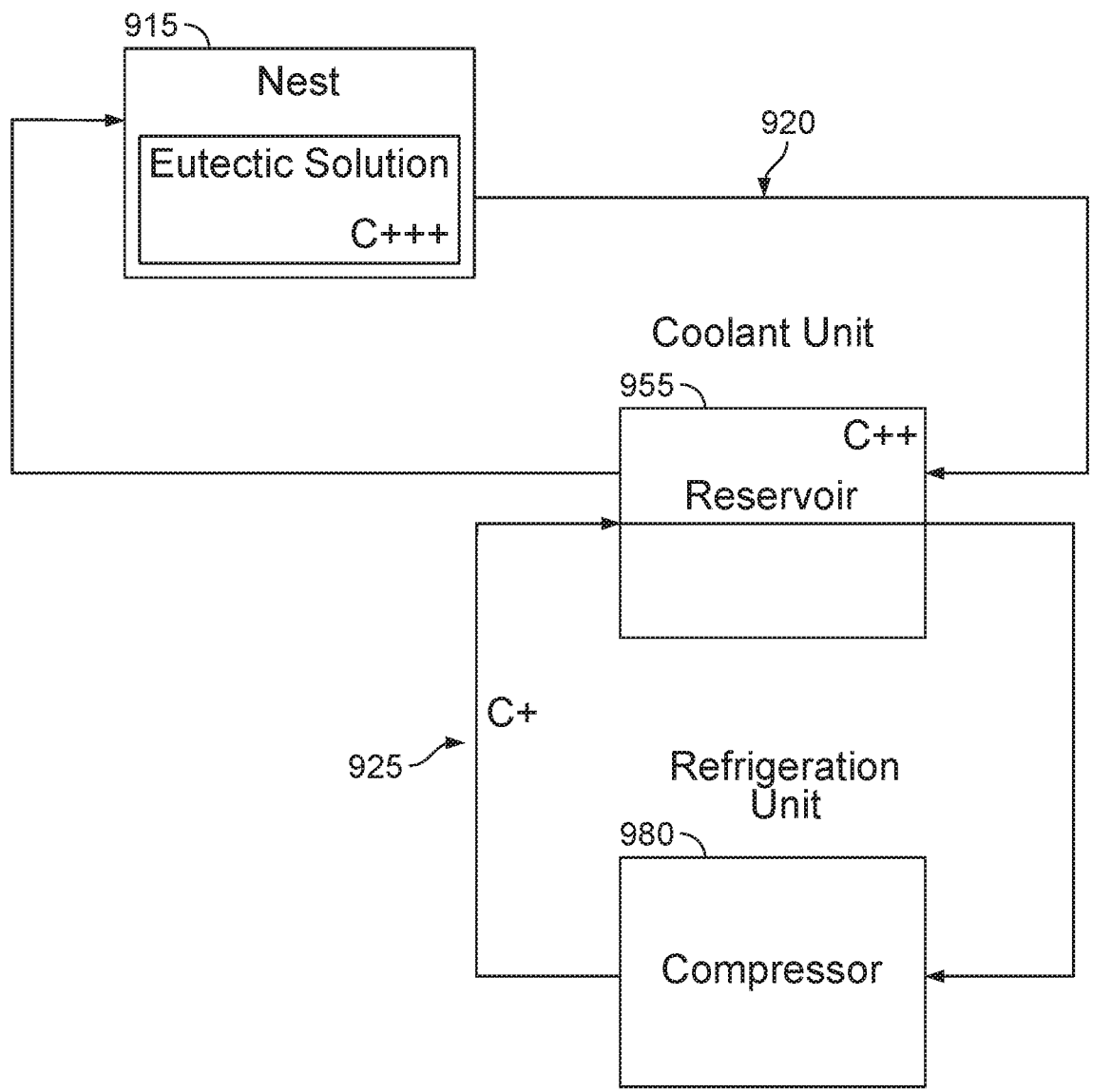
FIG. 37A is a schematic view showing one preferred arrangement for cooling a pod disposed in the nest.

As noted above, refrigeration unit 925 circulates refrigerant from compressor 980, through condenser 985, through an expansion valve (not shown) located downstream of the condenser, and through an evaporator (not shown) located at reservoir 955 of coolant unit 920. Conventional refrigeration tubing is used to transfer the refrigerant between the various components of refrigeration unit 925. Looking now at FIG. 37, a coaxial refrigeration tube may be used to transfer the refrigerant between the various components of refrigeration unit 925, whereby to gain enhanced refrigeration efficiency.

An Arrangement for Cooling a Pod Disposed in the Nest

Where nest 915 is cooled using a eutectic solution contained in one or more containers at nest 915, both coolant unit 920 and the eutectic solution container(s) are able to store "cold" so as to increase the efficiency of system 900. More particularly, compressor 980 drives refrigerant through reservoir 955 of coolant unit 920 so as to cool the coolant in reservoir 955, whereby to store "cold" in reservoir 955. The coolant in reservoir 955 is then driven to the eutectic solution container(s) in nest 915 by circulation motor 960 of coolant unit 920 so as to cool the eutectic solution, whereby to store additional "cold" in the nest. See FIG. 37A. In this way, multiple batches of frozen confection may be made in succession inasmuch as there is sufficient "cold" stored in the system to allow for cooling of multiple pods without having to wait for refrigeration unit 925 to cool multiple batches of frozen confection. Additionally, compressor 980 does not need to be constantly running in order for multiple batches of frozen confection to be made.

Direct Expansion Refrigeration of Nest 915

Figure 38A:
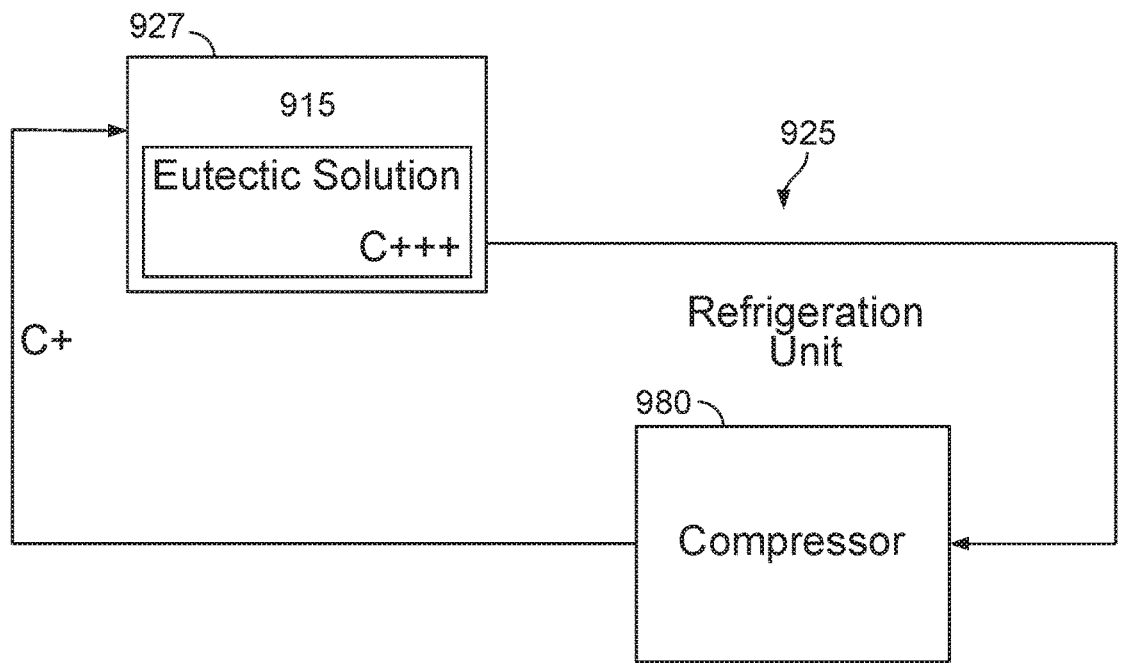
FIG. 38A is a schematic view showing another preferred arrangement for cooling a pod disposed in the nest.
Figure 39:
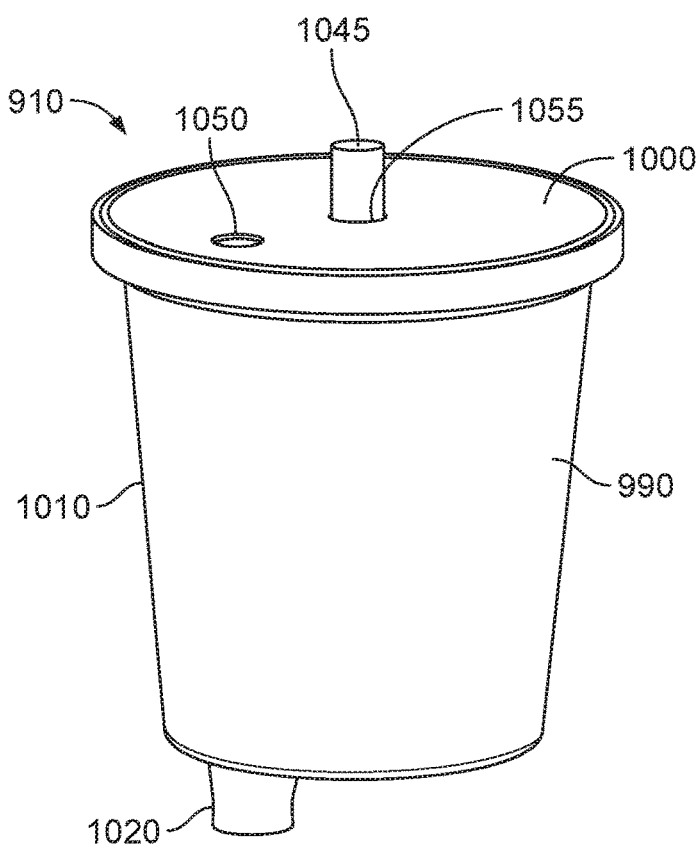
FIGS. 39-42 are schematic views showing another form of pod.
Figure 40:
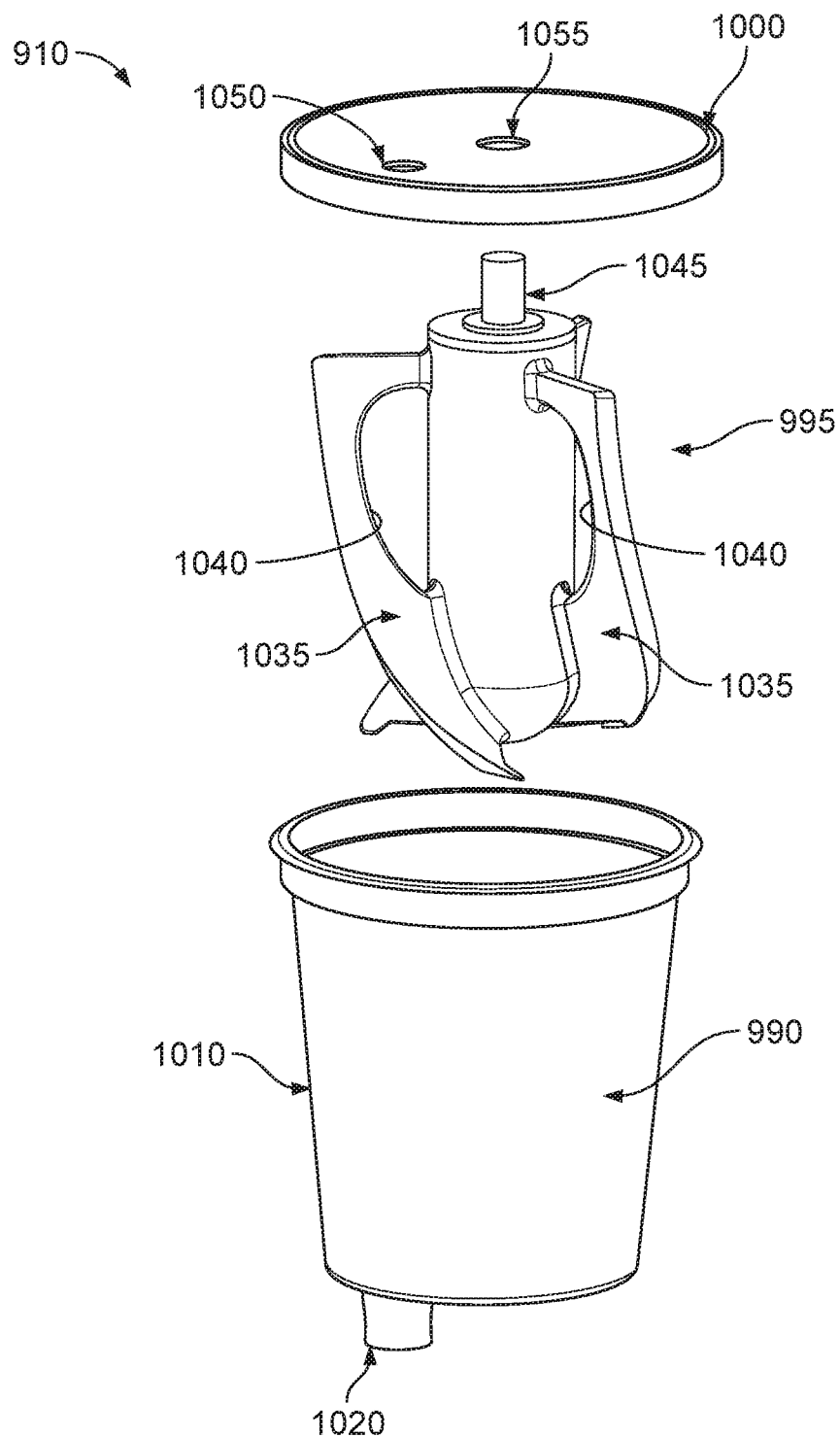
Figure 41:
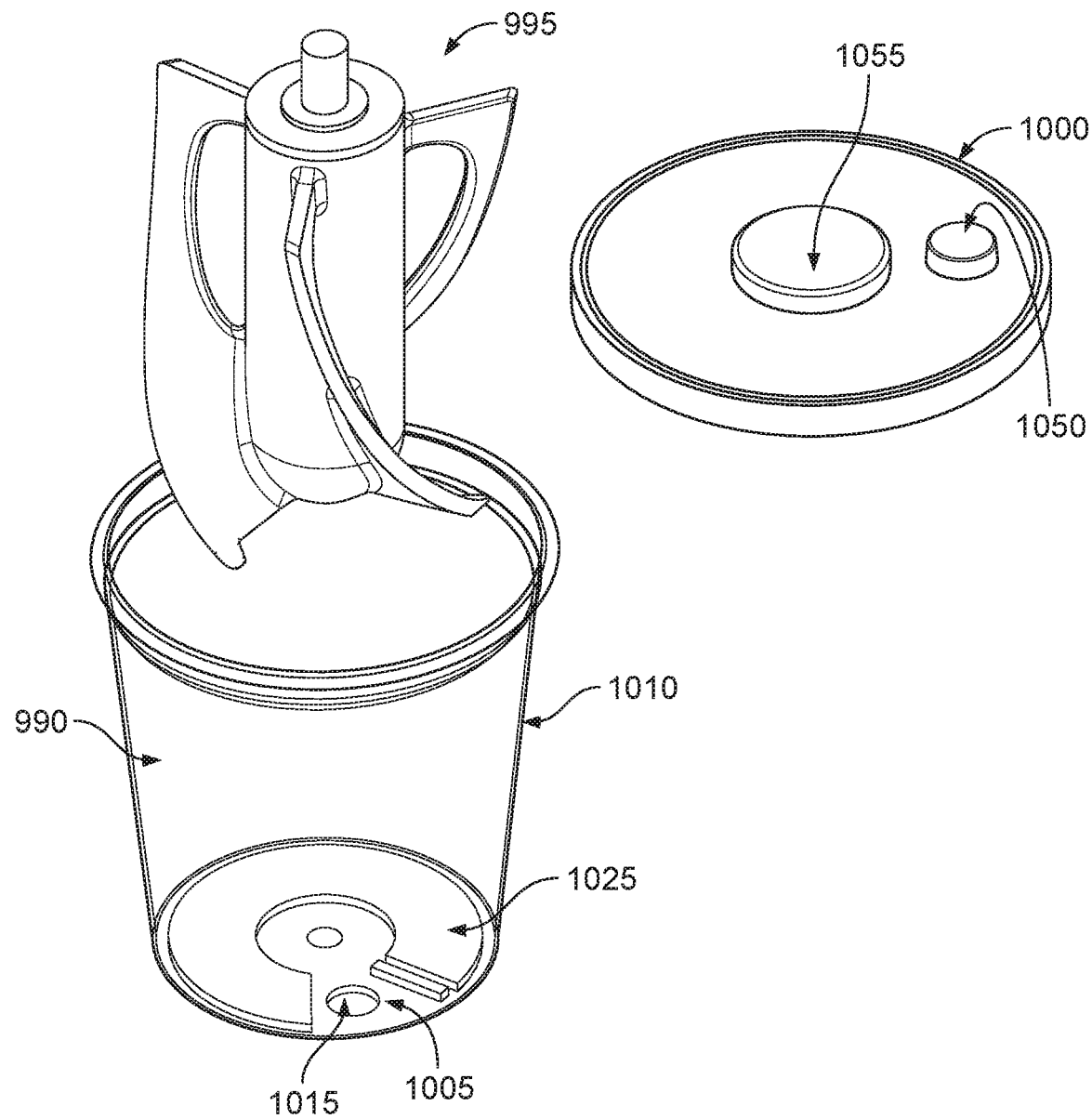

Refrigeration unit 925 is used to cool the coolant in reservoir 955 of coolant unit 920, and coolant unit 920 is used to cool nest 915 (or the eutectic solution contained in one or more containers at nest 915), whereby to cool a pod 910 disposed in nest 915. However, if desired, a direct expansion system may be used to cool nest 915. A direct expansion system eliminates the use of a secondary coolant loop (i.e., the coolant loop of coolant unit 920) and uses the refrigerant of refrigeration unit 925 to directly cool nest 915 via a cold plate. The cold plate can be customized to generate a very high heat flux, operating at temperatures well below ambient. In the cold plate of a direct expansion system, the refrigerant from refrigeration unit 925 undergoes an isothermal phase change, offering tight temperature control across the cold plate. As seen in FIG. 38, a direct expansion system consists of the basic 4 components of a vapor compression refrigeration system: a compressor, a condenser, an expansion valve, and an evaporator. In a direct expansion system 927, the evaporator absorbs heat directly from nest 915. Inasmuch as no secondary coolant loop is required (i.e., coolant unit 920 is eliminated), minimal parts are needed in the direct expansion system. No fans are required to circulate cool air and no pump is required to circulate the coolant, which simplifies system construction and improves system efficiency.

Another Arrangement for Cooling a Pod Disposed in the Nest

At least one container holding a eutectic solution is disposed adjacent to the pod seat of nest 915. Refrigeration unit 925 is used to directly cool the eutectic solution to the point of freezing. Coolant unit 920 is eliminated. Compressor 980 drives refrigerant directly through nest 915 so as to cool the eutectic solution in the container(s) adjacent to the pod seat in nest 915, whereby to store "cold" in the nest. See FIG. 38A. In this way, multiple batches of frozen confection may be made in succession as there is sufficient "cold" stored in the nest to allow for cooling of multiple pods without having to wait for refrigeration unit 925 to cool multiple batches of frozen confection. Additionally, compressor 980 does not need to be constantly running in order for multiple batches of frozen confection to be made.

Pod 910

Pod 910 is generally similar to pod 30 described above, except that pod 910 has its cap permanently fixed in place and is sealed shut. Pod 910 is provided as a single use, disposable pod, i.e., a new pod is used for each serving of the frozen confection (or hot or cold beverage). However, it should be appreciated that, if desired, pod 910 may be provided as a multi-use, reusable pod, i.e., a pod may be reused (after filling with fresh ingredients) to provide additional servings of the frozen confection (or hot or cold beverage). Where pod 910 is reusable, the cap of the pod is selectively removable from the remainder of the pod.

Pod 910 is provided with an inner scraper paddle made of plastic which is configured to eject the frozen confection out the bottom of the pod by reversing the direction of the inner scraper paddle. The inner scraper paddle can be made by injection molding or 3D printing.

More particularly, and looking now at FIGS. 35, 35B, 39-42, 42A and 42B, pod 910 generally includes a canister 990, an internal scraper paddle assembly 995 and a cap 1000.

Canister 990 is tapered (preferably frustoconical) and includes a floor 1005 and a side wall 1010 upstanding therefrom. Tapered canister 990 includes a smaller floor 1005, a larger cap 1000 and a tapered side wall 1010 extending between the smaller floor 1005 and the larger cap 1000. Tapered canister 990 is frustoconical. Note that the taper of canister 990 matches the taper of nest 915, so that pod 910 can make a close fit within nest 915, whereby to facilitate excellent heat transfer between the pod and the nest.

Tapered side wall 1010 has a taper of approximately 5 degrees or greater.

Canister 990 has an opening 1015 in its base. A nozzle 1020 is formed adjacent to opening 1015. A sliding gate 1025 selectively opens or closes opening 1015 as will hereinafter be discussed. A stop 1030 is formed on floor 1005 to limit movement of sliding gate 1025.

Tapered side wall 1010 has a uniform thickness along its length.

Tapered side wall 1010 has a thickness which varies along its length. More particularly, tapered side wall 1010 may be thinner adjacent to the smaller floor 1005 and may be thicker adjacent to the larger cap 1000, such that the pod ingredients will freeze faster adjacent to smaller floor 1005 than the pod ingredients will freeze adjacent to larger cap 1000.

It should be appreciated that providing canister 990 with a tapered side wall 1010 is important for creating good surface contact between pod 910 and nest 915 (i.e., between tapered side wall 1010 of pod 910 and tapered side wall 953 of nest 915). Providing a close fit between pod 910 and nest 915 is critical for adequate heat transfer from nest 915 to pod 910 in order to efficiently freeze the contents of pod 910. It should also be appreciated that providing canister 990 with a tapered side wall 1010 focuses the contents of the pod so that the contents move toward opening 1015 in canister 990 of pod 910. Specifically, when pod 910 is used to make a frozen confection, tapered side wall 1010 focuses the frozen confection as it freezes toward opening 1015 and out nozzle 1020.

Canister 990 preferably includes a thin side wall formed out of a material which has high heat transfer capability, e.g., a thin metal, a thin plastic, etc. Canister 990 is preferably 50-500 microns thick so as to provide a high heat transfer rate between nest 915 and pod 910. Canister 990 is also preferably somewhat deformable so that canister 990 has some ability to expand against nest 915, whereby to ensure high heat transfer between the pod and the nest.

Internal scraper paddle assembly 995 includes a plurality of scraper blades 1035 which have a generally helical configuration. The scrapper blades 1035 can have a rubber squeegee on the ends of the blades so as to better conform to and scrape the inner wall of pod 910. Preferably openings 1040 are formed in scraper blades 1035. Internal scraper blade assembly 995 also includes an upwardly-projecting stem 1045 which can rotate at speeds from 10 to 400 RPM.

Cap 1000 is secured to (i.e., permanently fixed to) canister 990. Cap 1000 includes an opening 1050 for admitting fluids (e.g., liquid or air) into the interior of canister 990 and an opening 1055 for permitting upwardly-projecting stem 1045 to project out of the interior of canister 990.

Cap 1000 and floor 1005 can be made of insulating materials or coated with insulating materials, e.g., aerogels.

Prior to use, opening 1015 in floor 1005, and opening 1050 in cap 1000, are closed off with rupturable membranes.

As a result of the foregoing construction, when upwardly-projecting stem 1045 is turned in a first (counterclockwise) direction, sliding gate 1025 is urged into its closed configuration and the contents of pod 910 are forced upward toward cap 1000. When upwardly-projecting stem 1045 is turned in the opposite (clockwise) direction and rotated at speeds ranging from 10 to 400 RPM, sliding gate 1025 is urged into its open configuration and the contents of pod 910 are forced downward, against floor 1005 of canister 990, whereupon the rupturable membrane covering opening 1015 in floor 1005 fails, allowing the contents of pod 910 to exit through opening 1015 and thus nozzle 1020.

Figure 42:
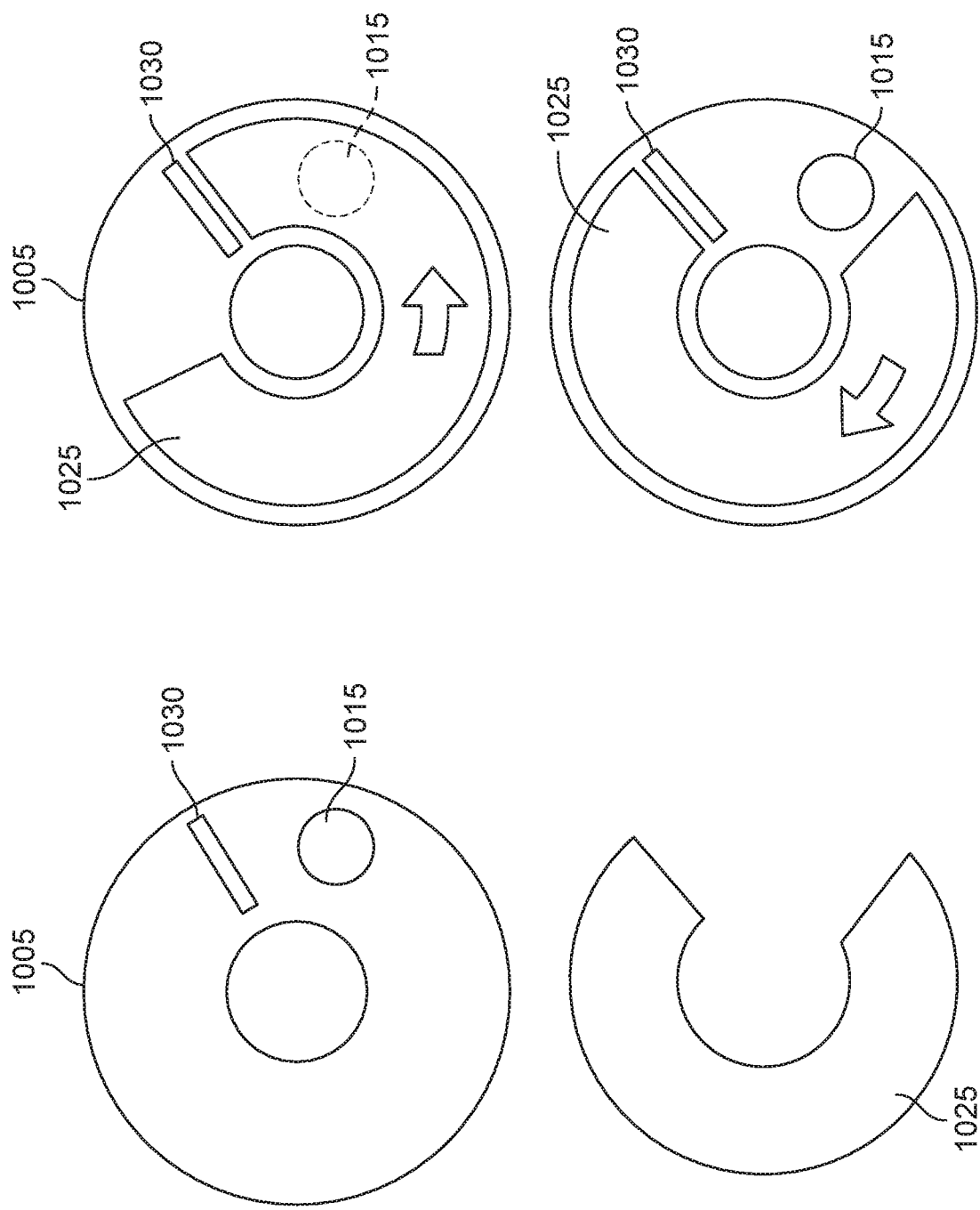
Figure 42A:
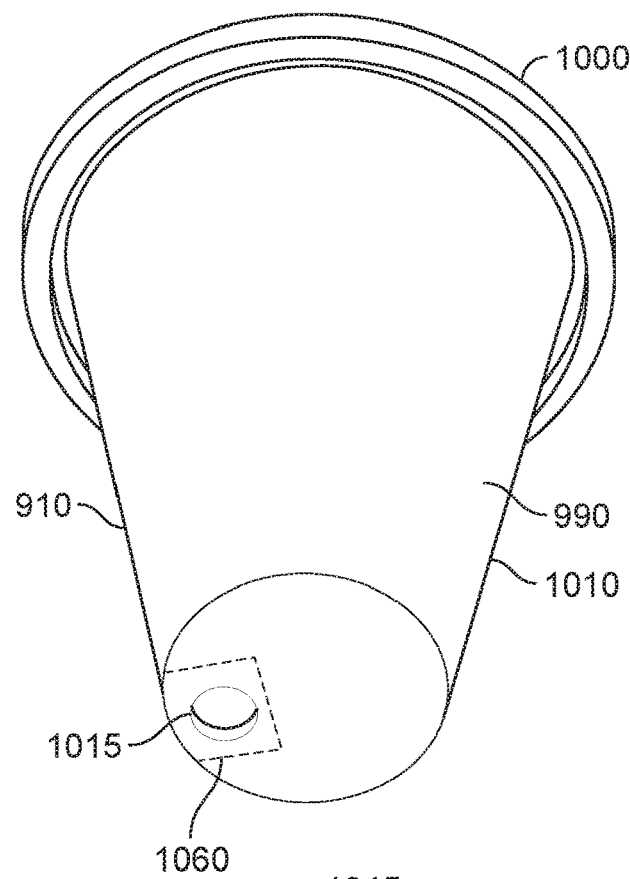
FIG. 42A is a schematic view showing another form of pod.
Figure 42B:
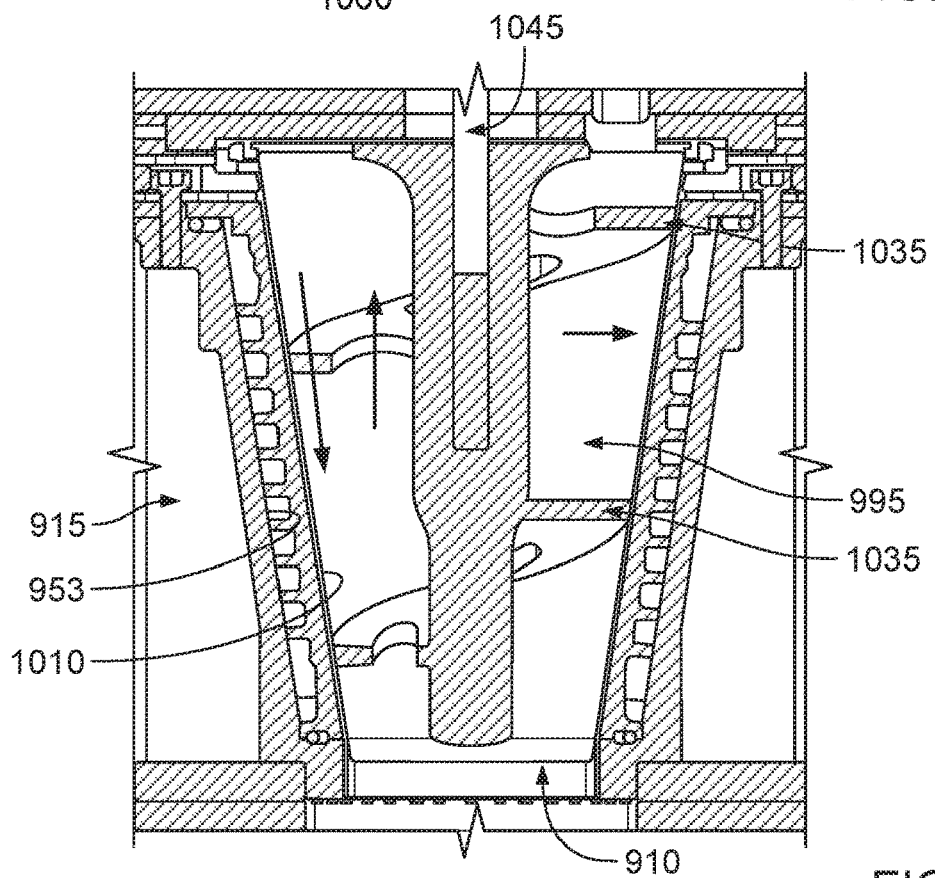
FIG. 42B is a schematic view showing movement of the contents of the pod during mixing.

Nozzle 1020, sliding gate 1025 and stop 1030 may be omitted, and opening 1015 may be closed off with a removable seal 1060 (see FIG. 42A). As internal scraper paddle assembly 995 is turned in one direction, the contents of the pod are forced downward (via plurality of scraper blades 1035) until the churning contents hit floor 1005, and then the contents move upward within the pod (see FIG. 42B), with openings 1040 of plurality of scraper blades 1035 facilitating the upward rise of the contents of the pod. Note that the contents of the pod are also forced in a radially-outward direction during mixing, which helps apply a radially-outward force to tapered side wall 953 of nest 915, which helps seating of the tapered side wall 1010 of pod 910 against the tapered side wall 953 of nest 915, which enhances heat transfer between the pod and the nest. When the contents of the pod are to be released, removable seal 1060 is removed, and the contents of the pod exit through opening 1015. The direction of turning scraper blades 1035 does not need to be reversed when discharging the frozen confection from the pod.

Pod 910 may include multiple compartments or zones that house different contents, i.e., powder ice cream in one zone and a cream or milk or water in a second zone. When the lid of machine 905 closes, the separating membrane between zones can puncture or rupture allowing the various contents to mix.

Close Fit Between Pod 910 and Nest 915

In practice, it has been found that providing a close fit between pod 910 and nest 915 facilitates rapid heat transfer between pod 910 and nest 915, and hence enables faster production of a single serving of a frozen confection. Such a close fit may be provided in a variety of ways.

By way of example but not limitation, pod 910 could include screw threads (not shown) on the outside surface of canister 990 and nest 915 could include counterpart screw threads (not shown) on the surfaces of recess 935 of nest 915, such that pod 910 can be screwed into close contact with nest 915.

By way of further example but not limitation, frustoconical canister 990 of pod 910 could have an incline, and frustoconical recess 935 of nest 915 could have a corresponding incline, such that when the lid assembly of machine 905 is closed, pod 910 is driven downward into a close fit with nest 915.

By way of still further example but not limitation, pod 910 may be configured so that when a force is applied to the upper end of pod 910, pod 910 expands slightly so as to bring itself into closer proximity with recess 935 of nest 915.

Or a pressurized fluid (e.g., air, $CO_2$ or Nitrogen) may be injected into the interior of pod 910 so as to swell the side wall of canister 990 of pod 910 into closer proximity to recess 935 of nest 915.

Figure 43:
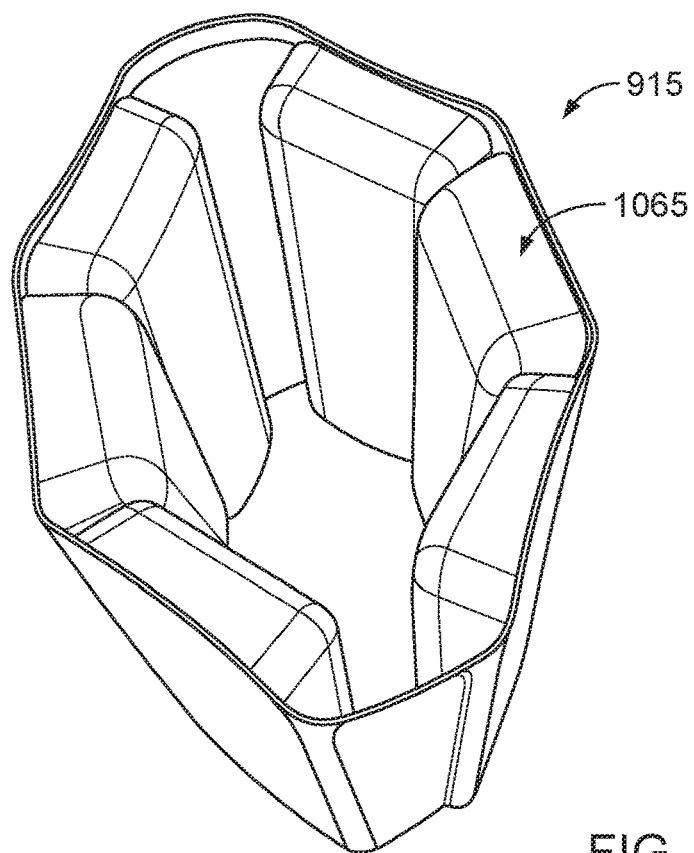
FIG. 43 is a schematic view showing how the nest assembly may include a flexible bladder for receiving a pod, such that the flexible bladder makes a close fit with a pod disposed in the nest assembly.

By way of further example but not limitation, recess 935 of nest 915 could include a flexible bladder 1065 (FIG. 43) for receiving canister 990 of pod 910, such that the flexible bladder makes a close fit with a pod 910 disposed in nest 915.

By way of further example but not limitation, recess 935 of nest 915 could include a magnetic material for receiving a ferrous alloy (i.e., steel) canister 990 of pod 910, such that pod 910 is magnetically pulled into nest 915 so as to make a close fit with a pod 910 disposed in nest 915.

Contents of Pod 910

The contents of pod 910 may be the same as the contents of pod 30 discussed above.

It should also be appreciated that, if desired, pod 910 may have a conventional yogurt product (e.g., yogurt in a gel-like form) sealed therein, such that novel system 900 thereafter forms frozen yogurt for dispensing into a container (e.g., a bowl, a cone, etc.).

Furthermore, if desired, pod 910 may contain liquid ingredients which, when cooled and agitated, form the desired frozen confection. It may not be necessary to pump any further ingredients into the pod in order to create the desired frozen confection.

Figure 44:
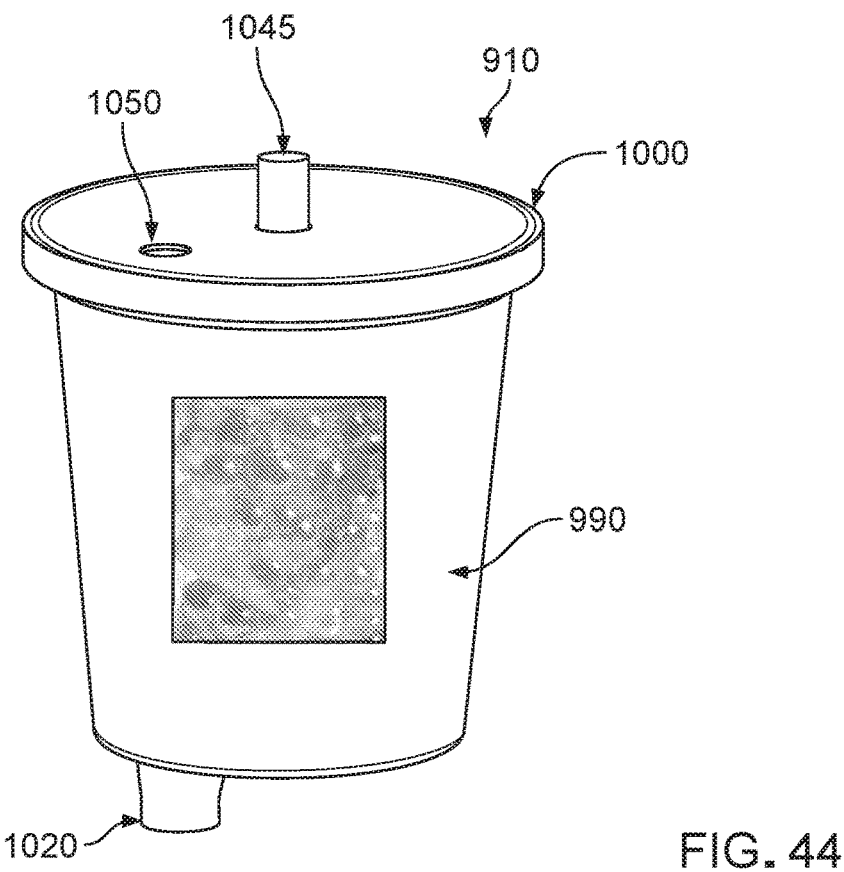
FIG. 44 is a schematic view showing "bubble beads" contained in the ingredients disposed within a pod, wherein the encapsulant is selected so that when water is added to the interior of the pod, the encapsulant dissolves, releasing the $CO_2$ or $N_2$ and creating a "fizz" in the frozen confection.

In addition to the foregoing, if desired, and looking now at FIG. 44, "bubble beads" (e.g., an encapsulant surrounding $CO_2$ or $N_2$) may be contained in the ingredients disposed within pod 910. This encapsulant is selected so that when water is added to the interior of pod 910, the encapsulant dissolves, releasing the $CO_2$ or $N_2$ and creating a "fizz" in the frozen confection.

It is also anticipated that pod 910 may include the contents necessary to make a frozen protein shake, e.g., a whey protein powder, a casein protein powder, a pea protein powder, a soy protein powder, etc., essentially any powder which, when mixed with water and chilled, will make a frozen protein shake.

Where a frozen protein shake is to be produced, the contents of pod 910 may be: 3-10% milk fat such as cream, plastic cream, butter, anhydrous milk fat/butter oil, nondairy fat such as palm oil, palm kernel oil, coconut oil and other safe and suitable vegetable oils; 9-15% milk solids non-fat (MSNF) such as concentrated (condensed/evaporated) milk, sweetened condensed milk, milk powder, skim or whole sweet cream buttermilk, concentrated or dried whey, concentrated or dried, milk protein concentrates whey protein concentrates or isolates hydrolyzed or modified milk proteins, sodium caseinate; 4-14% sugar and corn syrup sweetener ingredients; up to 0.5% stabilizers or thickeners such as sodium carboxymethyl cellulose (cellulose gun), guar gum, locust bean gum, sodium alginate, propylene glycol alginate, xanthan, carrageenan, modified starches, microcrystalline cellulose (cellulose gel), gelatin, calcium sulfate, propylene glycol monostearate or other monoesters, and others; up to 0.5% emulsifiers such as mono- and diglycerides, distilled monoglycerides (saturated or unsaturated), polyoxyethylene sorbitan monostearate (60) or monooleate (80), and others; and have 5 to 60 grams of protein in the form of whey, casein, pea, soy and or a combination of said proteins.

In each 3-8 ounce serving of frozen protein shake, there ideally would be greater than 10 grams of protein and less than 200 calories.

Further examples of the pod ingredients can include the following soft serve ice cream powder, powder yogurt, powder shake mix, liquid slush mix, powder coffee base mix, powder smoothie mix, powder or liquid low sweet neutral base and premium neutral base ingredients are listed below:

|  | Item # | Type | Manufacturer |
|---|---|---|---|
| SOFT SERVE |  |  |  |
| Dole Vanilla Soft Serve | D500 | Powder | Precision Foods |
| Dole Chocolate soft Serve | D510 | Powder | Precision Foods |
| Frostline Vanilla Soft Serve | D400 | Powder | Precision Foods |
| Frostline Chocolate Soft Serve | D410 | Powder | Precision Foods |
| Frostline Vanilla Soft Serve (RTU) | DL28 | Liquid | Precision Foods |
| Frostline Chocolate Soft Serve (RTU) | DL27 | Liquid | Precision Foods |
| FROZEN YOGURT |  |  |  |

-continued

| | Item # | Type | Manufacturer |
|---|---|---|---|
| Frostline Vanilla Yogurt | Y800 | Powder | Precision Foods |
| Frostline Chocolate Yogurt | Y810 | Powder | Precision Foods |
| SHAKES | | | |
| Frostline Vanilla Shake Mix | D425 | Powder | Precision Foods |
| SLUSH | | | |
| Flavor Burst Premium Neutral Base 6 half-gallon jugs per case - 1:5 mixing ration | FLANB-3 | Liquid | Flavor Burst Company |
| FROZEN COFFEES | | | |
| JavaLatte Coffee Base requires soft service mix - see available soft serve mixes above | FLA-JL-2 | Powder | Flavor Burst Company |
| SMOOTHIES | | | |
| Frostline Smoothie Base Mix | D595 | Powder | Precision Foods |
| FROZEN CARBONATED BEVERAGE (FCB) | | | |
| National Fruits Flavors | | Liquid | National Fruit Flavor |
| Chilly Willee National, Inc | | Liquid | Chilly Willee |
| FRUIT COCKTAILS - See receipt below! | | | |
| Low Sweet Neutral Base | | Powder | United Citrus |
| Flavor Burst Premium Neutral Base | FLA-NB-3 | Liquid | Flavor Burst Company |

Soft Serve Ice Cream Mix Construction

When forming a single serving of soft serve ice cream, water supply 70 may be replaced by a cooler (not shown). The cooler may accept a container (e.g., a plastic bottle or a plastic bag) which holds approximately 1.0 liter to approximately 3.0 liters of liquid soft serve ice cream mix. Pod 910 is used to form the single serving of soft serve ice cream, by receiving the liquid soft serve ice cream mix and agitating the single serving of soft serve ice cream mix while it is cooling.

It should be appreciated that by injecting a liquid soft serve ice cream mix into pod 910, fluid (i.e., air or liquid) does not need to be subsequently injected into the pod in order to create the frozen confection (i.e., the soft serve ice cream). When pod 910 has been appropriately cooled, rotation of internal paddle assembly 995 forms a single serving of soft serve ice cream in pod 910.

Additionally, a separate water reservoir tank (not shown) may be provided which is able to pump approximately 0.5 ounce to approximately 1.0 ounce of water through the tube connecting the container (e.g., the plastic bottle or the plastic bag) to the pod so as to flush residual liquid soft serve ice cream mix from the tube before the next single serving of soft serve ice cream is prepared using novel system 900.

Modifications of the Embodiments

It should be understood that many additional changes in the details, materials, steps and arrangements of parts, which have been herein described and illustrated in order to explain the nature of the present disclosure, may be made by those skilled in the art.

Figure 45:
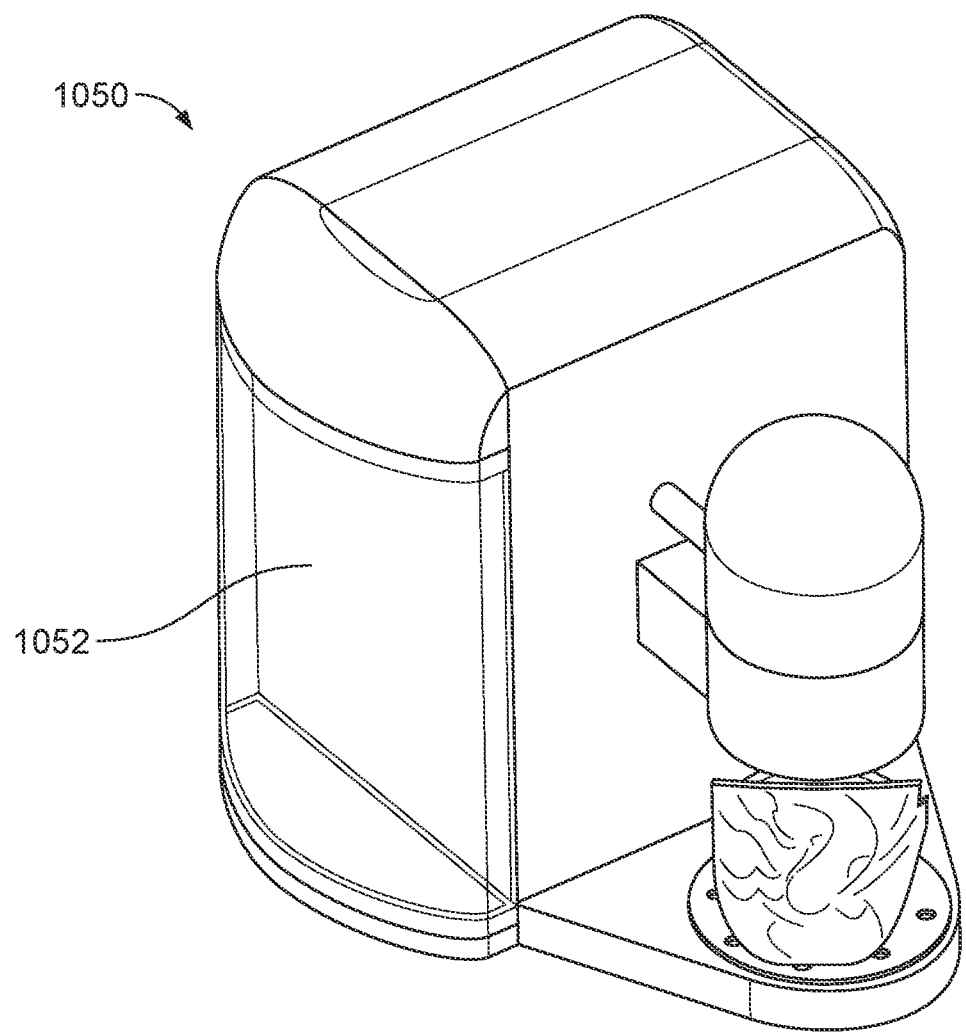
FIG. 45 is a schematic view of a machine that can brew and then cool a beverage.

FIG. 45 shows a machine 1050 that can brew and then cool a beverage. The machine 1050 adds heated water, for example, to a commercially available coffee pod. The water can be heated, for example, by an induction coil. The brewed beverage is received in a reservoir in an evaporator. The brewed beverage can be dispensed from the reservoir without cooling. Alternatively, the evaporator can be used to cool the brewed beverage before it is dispensed. In some embodiments, the brewed beverage is pumped or drained into a pod or canister in the evaporator. After cooling, the cold or frozen beverage can be dispensed out of the pod or the pod can double as a drinking vessel and washed and reused.

The machine 1050 includes a water tank 1052 as a water source. In some machines, the water source is a continuous water source.

Figure 46:
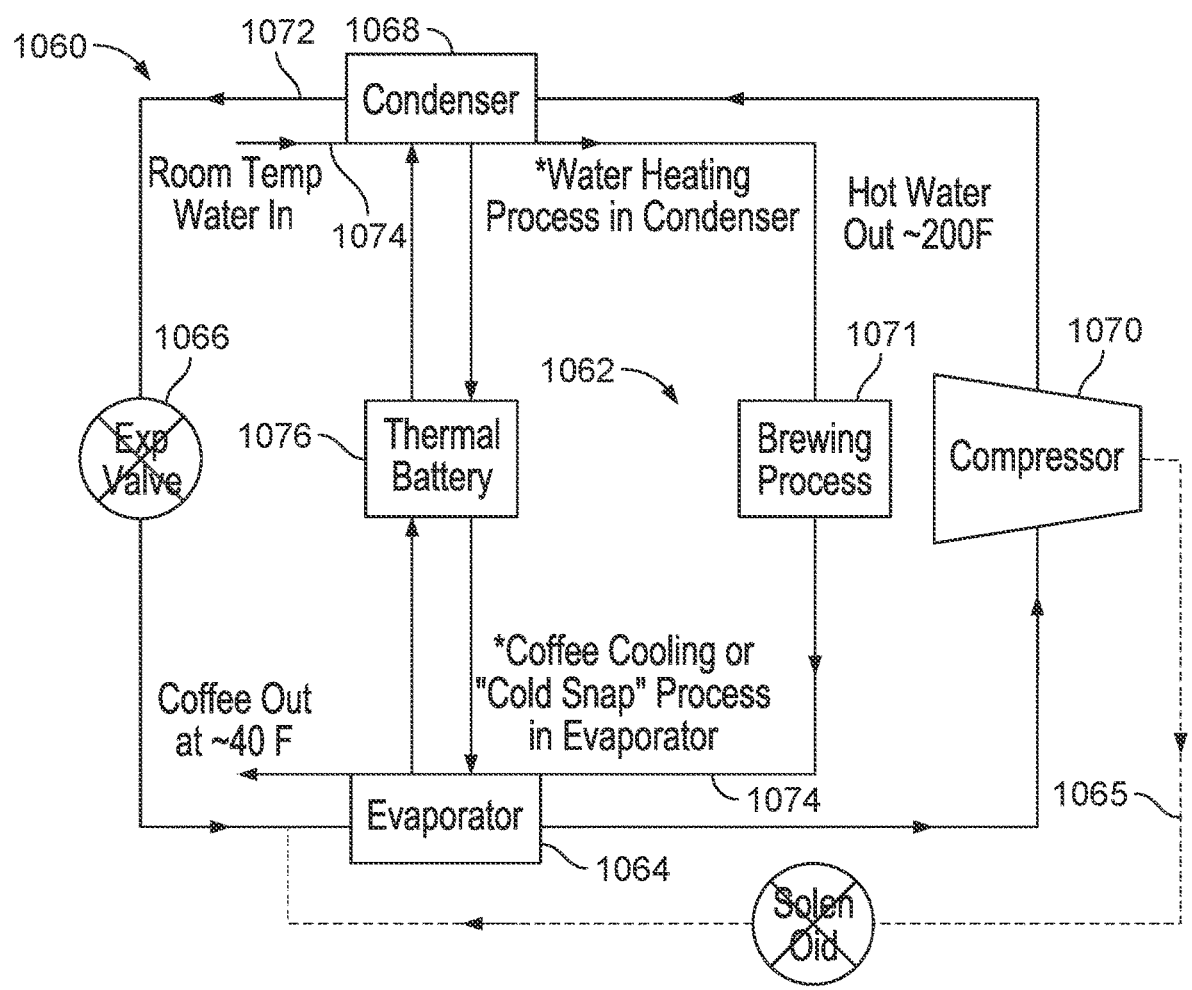
FIG. 46 is a schematic of a refrigeration system and a brewing system.

FIG. 46 is a schematic of a refrigeration system 1060 and a brewing system 1062. The refrigeration system 1060 includes an evaporator 1064, an expansion valve 1066, a condenser, 1068, and a compressor 1070, all fluidly connected via refrigerant lines 1072. Refrigerant flows through the refrigerant lines 1072 and through the evaporator 1064, expansion valve 1066, condenser 1068, and compressor 1070. High-pressure, liquid refrigerant flows from the condenser 1070 through the expansion valve 1066 to the evaporator 1064. The expansion valve 1066 restricts the flow of the liquid refrigerant fluid and lowers the pressure of the liquid refrigerant as it leaves the expansion valve 1066. The low-pressure liquid then moves to the evaporator 1064 where heat absorbed from a pod in the evaporator 1064 changes the refrigerant from a liquid to a gas. The gas-phase refrigerant flows from the evaporator 1064 to the compressor 1070. The refrigerant enters the compressor 1070 as a low-pressure gas and leaves the compressor 1070 as a high-pressure gas. The gas then flows to the condenser 1068 where heat exchange cools and condenses the refrigerant to a liquid.

The refrigeration system 1060 includes a bypass line 1. The bypass line 190 enables the application of warm gas to the evaporator 1064 to defrost the evaporator 1064.

The refrigeration system 1060 also includes a thermal battery 1076 that connects to the condenser 1068 and the evaporator 1064. The thermal battery 1076 extends the range of the refrigeration cycle allowing the condenser 1068 to heat the water to about 185° F.-205° F.

The brewing system 1062 uses the condenser 1068 as a water heater and includes the water tank 1052, an insertable pod 1071, the reservoir in the evaporator, and brewing flow line 1074. The brewing flow line extends from the water tank 1052 through the condenser 1068 and the insertable pod 1072 to the evaporator 1064. Water flows from the water tank 1052 through the condenser 1068, which heats the water to about 185° F.-205° F. The water then flows through the insertable pod 1072, brewing coffee. The hot coffee flows from the insertable pod 1072 to a reservoir in the evaporator 1064 in which the hot coffee is quickly cooled to around 40° F. and dispensed from the machine 1060 into a waiting receptacle (e.g., a mug or cup). In some brewing systems, the brewing flow line branches after exiting the insertable pod. This configuration provides the option for dispensing the hot coffee into the receptacle instead of cooling it first. In some machines, the brewing flow line enters and exits a container that houses the insertable pod for brewing.

Some refrigeration systems cool the hot coffee using single phase cooling or two phase cooling. Single-phase cooling use water, ethylene glycol, or a refrigerant to circulate from a pump through a cold plate where it removes the waste heat from the device. The working fluid, now at an elevated temperature, goes to a heat exchanger, where the waste heat is dissipated. The working fluid then goes to a reservoir tank where it is ready for the next cycle.

Two-phase or evaporative cooling systems use the same basic system level components as the pumped single-phase system. However, pumped two-phase systems typically use refrigerants as the working fluid. Through refrigerant selection and appropriate controls, the refrigerant is designed to boil as it acquires heat from the hot surface of the device. More heat can be removed through the boiling process, otherwise known as latent heat, than through sensible heat with single phase cooling. Boiling across the entire evaporator surface, offers a further advantage, in that the evaporator will have a very uniform surface temperature, typically within a few degrees. This near-isothermal performance is important for many applications such as laser devices, which have wavelength emission sensitivity. Two-phase or evaporative systems do not require high coolant flow rates. As a result, smaller pumps requiring less power and weight can be used to remove higher amounts of heat, in effect, increasing the Coefficient of Performance, or C.O.P., of the cooling system; removing more heat over a given surface with less pumping power.

Figure 47:
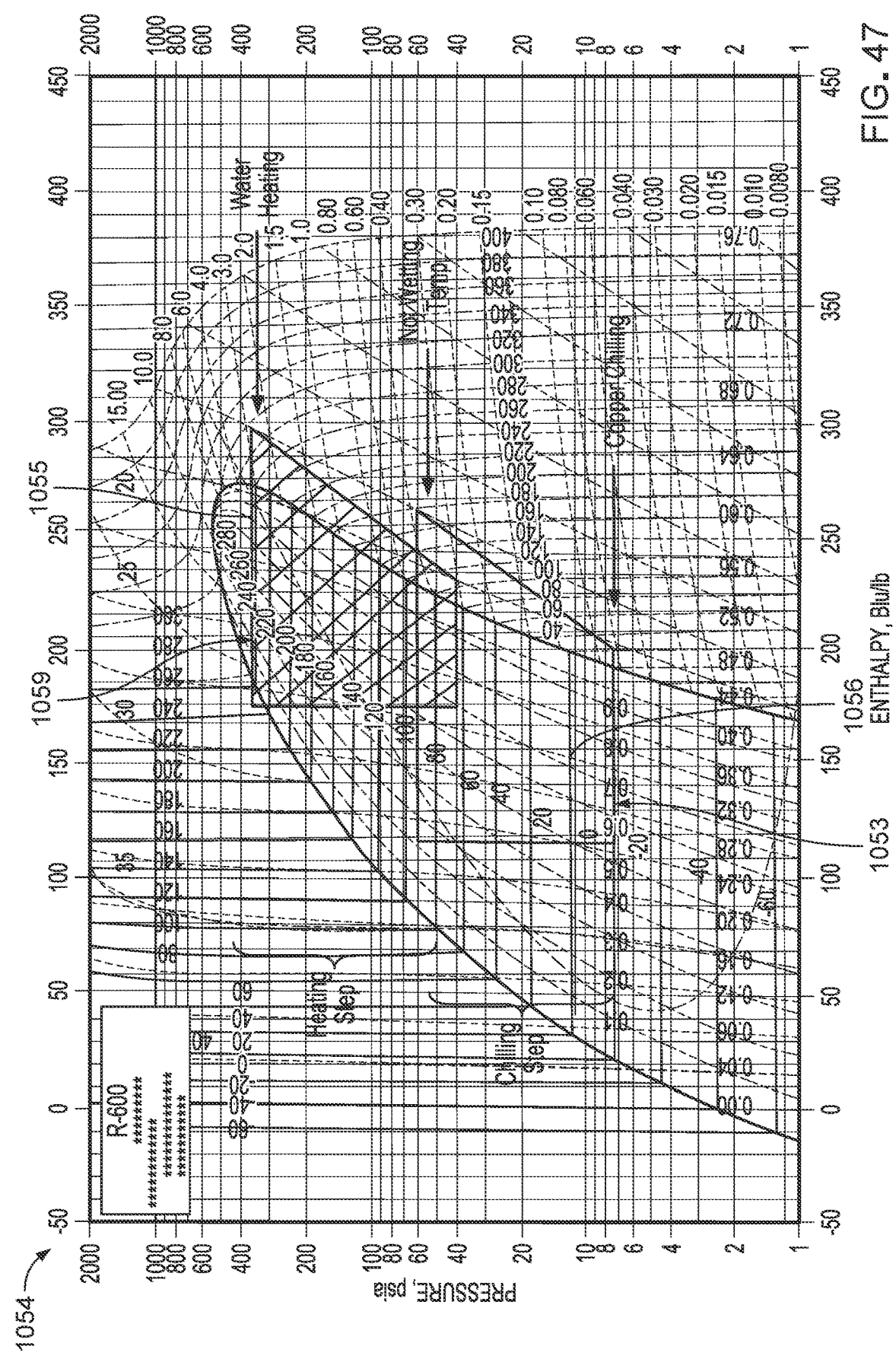
FIG. 47 is a graph that compares enthalpy (Btu/lb) to Pressure (psia) showing a heating step of the thermal battery and a cooling step of the thermal battery.

FIG. 47 is a graph 1054 of that compares enthalpy (Btu/lb) to Pressure (psia) showing a heating step of the thermal battery 1076 and a cooling step of the thermal battery 1076.

During the heating step, the condenser 1068 heats water for coffee brewing. The refrigerant is routed to thermal battery 1076. At this step, the thermal battery 1076 acts as an evaporator to provide heat load and increase condensing temperature.

During the chilling step, the refrigerant is routed back to the evaporator 1064 to chill coffee. The thermal battery 1076 is cooled to about room temp and acts as a condenser for this step, thereby reducing the evaporator side temp to coffee chilling temps.

The graph 1054 shows the heating step 1054 and the chilling step 1053 are cascading cycles or a "floating cascade". In the cascade, the water is heated at the highest temperature 1055 and the coffee is chilled at the lowest temperature 1056. A floating cascade allows a broad range of temperatures within one refrigeration system. The current state of the art would provide two refrigeration systems linked in a cascade. This configuration, one system can perform two different refrigeration cycles, reducing the number of components and the cost. This configuration is particularly useful in systems in which heating and cooling are not done simultaneously.

Figure 48:
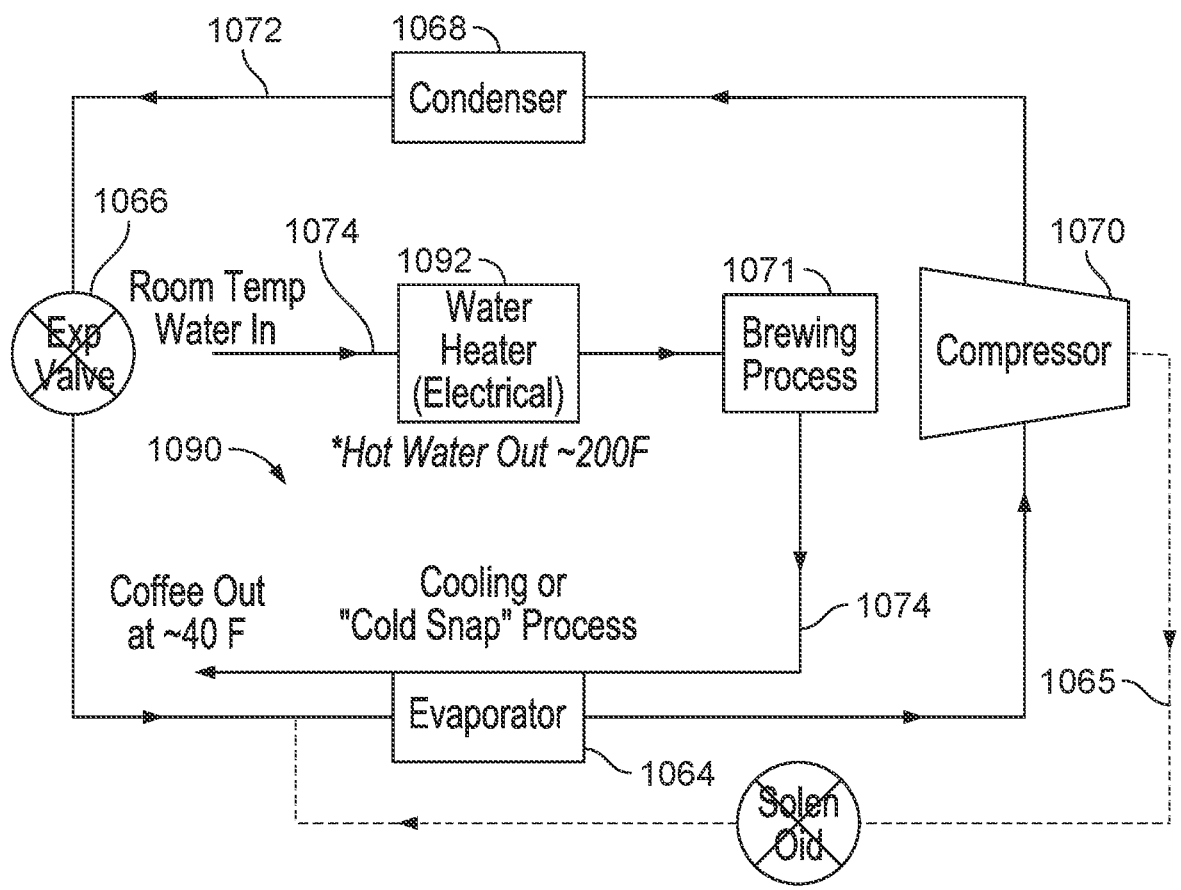
FIG. 48 is a schematic view of a refrigeration system and a brewing system.

FIG. 48 shows a refrigeration system 1060 and a brewing system 1090. The brewing system 1090 is substantially similar to brewing system 1062. However, brewing system 1090 uses an electric water heater 1092 rather than the thermal battery 1076 and the condenser 1068 to heat the water. The brewing flow line 1074 extends from the water tank 1052 through the electric water heater 1092 and the insertable pod 1071 into the reservoir in the evaporator 1064. The water from the water tank 1052 flows through the electric water heater 1092 and into the insertable pod 1071 to brew into coffee. From the insertable pod 1071, the hot coffee flows into the reservoir in the evaporator 1064 to cool before dispensing into a receptacle. The electric water heater 1092 heats the water using electrical resistance. Electrical resistance heating (ERH) uses the flow of alternating current electricity to heat soil and groundwater and evaporate contaminants. Electric current is passed through a targeted soil volume between subsurface electrode elements. The resistance to electrical flow that exists in the soil causes the formation of heat; resulting in an increase in temperature until the boiling point of water at depth is reached. After reaching this temperature, further energy input causes a phase change, forming steam and removing volatile contaminants. ERH is typically more cost effective when used for treating contaminant source areas.

Other brewing systems heat the water using induction methods. Induction heating is the process of heating an electrically conducting object (usually a metal) by electromagnetic induction, through heat generated in the object by eddy currents. An induction heater consists of an electromagnetic, and an electronic oscillator that passes a high-frequency alternating current (AC) through the electromagnet. The rapidly alternating magnetic field penetrates the object, generating electric currents inside the conductor called eddy currents. The eddy currents flowing through the resistance of the material heat it by Joule Heating.

Figure 49:
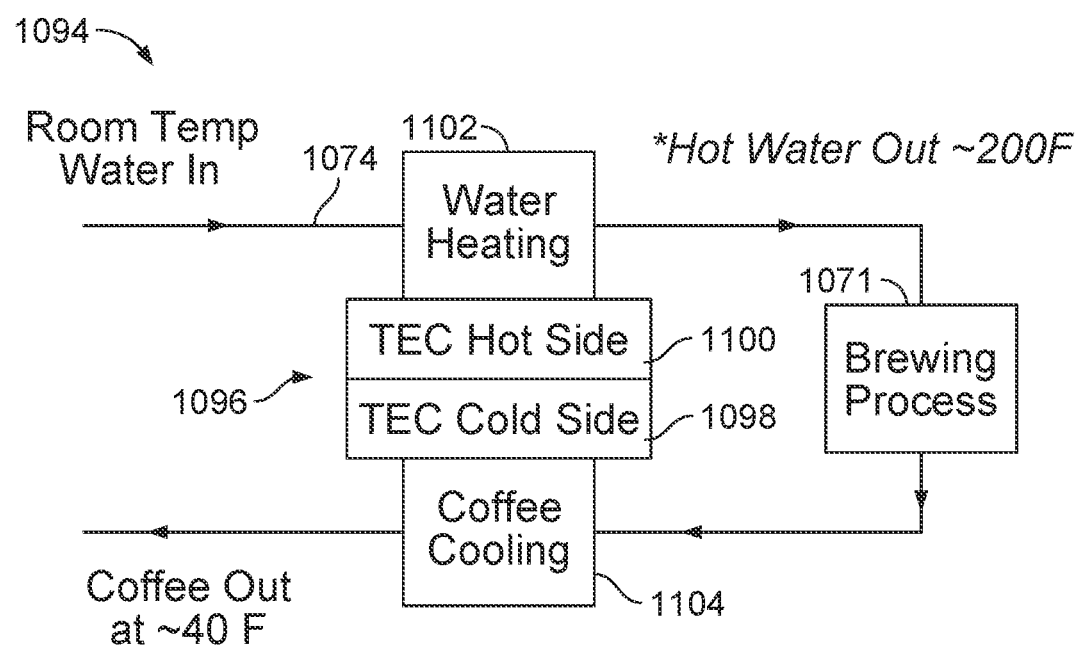
FIG. 49 is a schematic view of a brewing system that includes a single thermoelectric unit or multi-stack of thermoelectric units to heat water and cool brewed coffee.

FIG. 49 shows a brewing system 1094 that includes a single thermoelectric unit or multi-stack of thermoelectric units (TEC unit 1096) to heat water and cool brewed coffee. Thermoelectric cooling uses the Peltier effect to create a heat flux at the junction between of two different types of materials. A Peltier cooler, heater, or thermoelectric heat pump is a solid-state active heat pump, which transfers heat from one side of the device to the other, with consumption of electrical energy, depending on the direction of the current. Such an instrument is also called a Peltier device, Peltier heat pump, solid-state refrigerator, or thermoelectric cooler (TEC). Therefore, when electricity is applied to the TEC unit 1096, the TEC unit 1096 generates a cool side 1098 and a hot side 1100.

The hot side 1100 of the TEC unit 1096 heats water flowing in brewing line 1074 and is upstream of the insertable pod 1071. The cool side 1098 of the TEC unit 1096 is downstream of the insertable pod 1071 and chills hot coffee that exits the insertable pod 1071. In brewing system 1094, the hot side 1100 heats the water by heating a container 1102 that contacts the water. The cool side 1098 chills the water by cooling a container 1104 that contacts the hot coffee. The brewing fluid line may have valves that hold the water in the containers 1102, 1104 while the TEC unit 1096 heats and cools the water and coffee respectively.

In some brewing system, the water is heated using an Electrical resistance heating (ERH) and the hot coffee is chilled using Thermoelectric Cooling (TEC). If the TEC is sandwiched between the insertable pod (e.g. coffee brew area) and the cooling container, the heat generated from brewing the coffee in conjunction with running a current thru the TEC causes opposite side of the TEC to become cold, chilling the cooling container and chilling the coffee in the cooling container. Electrical resistance heating (ERH) and then Two Phase Cooling is the fastest combination of the cooling methods in this disclosure.

To summarize, the coffee can be chilled using thermoelectric cooling, one phase cooling, two phase cooling, two phase cooling with thermal battery, or a combination thereof. The water can be heated using, electrical resistance heating (ERH), induction heating, thermoelectric heating, a refrigeration condenser, or a combination thereof.

Figure 50A:
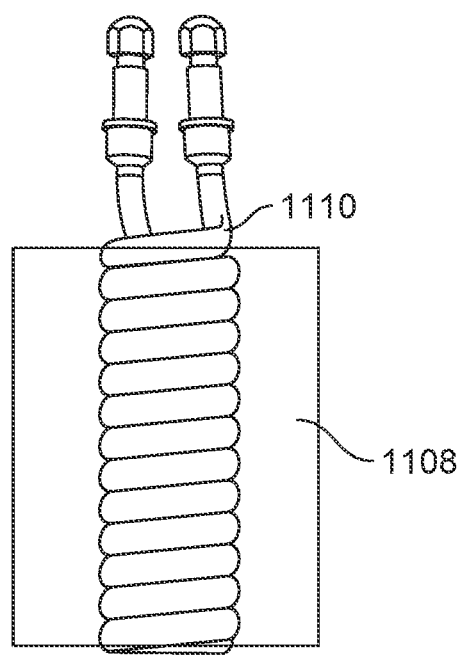
FIG. 50A is a schematic view of a cooling container that holds hot coffee.

FIG. 50A is a view of a cooling container 1108 that holds hot coffee. A cooling coil 1110 is disposed in the cooling container 1108 to cool the hot coffee in the cooling container 1108. The cooling coil 1110 is an evaporator through which flows cold refrigerant from a refrigeration system.

Figure 50B:
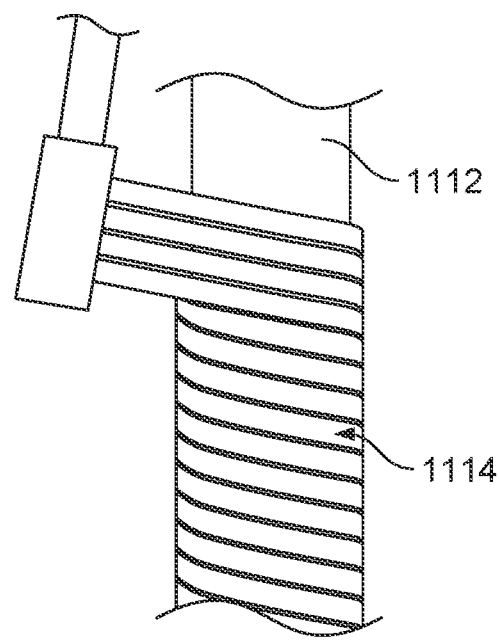
FIG. 50B is a schematic view of a cooling container and a cooling coil wrapped around the cooling container.

FIG. 50B is a view of a cooling container 1112 and a cooling coil 1114 wrapped around the cooling container 1112. The cooling coil 1114 is an evaporator through which flows cold refrigerant from a refrigeration system to cool the cooling container 1112.

Figure 50C:
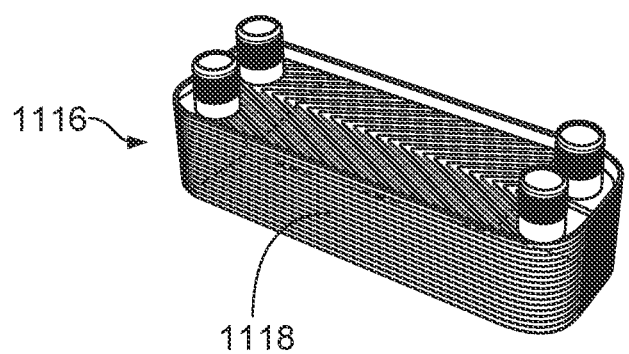
FIG. 50C is a schematic view of a plate heat exchanger that contains cold refrigerant on a first side of the heat plate exchanger.

FIG. 50C is a plate heat exchanger 1116 that contains cold refrigerant on a first side 1118 of the heat plate exchanger 1116. The hot coffee enters the heat plate exchanger 1116 and is chilled by the refrigerant on the first side 1118.

A number of systems and methods have been described. Nevertheless, it will be understood that various modifications may be made without departing from the spirit and scope of this disclosure. For example, although the evaporators have been generally illustrated as being in vertical orientation during use, some machines have evaporators that are oriented horizontally or an angle to gravity during use. Accordingly, other embodiments are within the scope of the following claims.

What is claimed is:

1. A machine for brewing and cooling a beverage, the machine comprising: a first nest arranged in a housing and comprising a first pod detector, the first nest configured to receive a pod containing a filter and granulated ingredients; a first fluid connection between a fluid reservoir and the first nest, the first fluid connection configured to transfer water from the reservoir to the pod in the first nest; a second nest arranged in the housing and comprising a second pod detector, the second nest configured to receive a pod containing ingredients and a mixing paddle; a refrigeration system; comprising a compressor and a condenser, wherein the second nest is an evaporator in the refrigeration system; a motor operable to move the mixing paddle; and a controller within the machine, the controller operable to receive first signals from the first detector, wherein first pod detector is operable to sense a pod type of a pod in the first nest, the controller operable to receive second signals from the second pod detector, wherein the second pod detector is operable to sense a pod type of a pod in the second nest.

2. The machine of claim 1, further comprising one or more thermoelectric units of the refrigeration system, each of the one or more thermoelectric units generating a cool side and a hot side when electricity is applied to the respective one or more thermoelectric units, wherein the hot side is used to heat the water and the cool side is used to cool the receptacle.

3. A machine for brewing and cooling a beverage, the machine comprising:
a housing;
a refrigeration system located within the housing;
a first nest arranged in the housing, the first nest having a first recess accessible to a user of the machine;
a fluid system configured to transfer water to the first recess of the first nest
a second nest arranged in the housing, the second nest having walls defining a second recess accessible to a user, wherein the refrigeration system is configured to cool the walls of the second nest; and
an exit bore fluidly connected to the recess of the first nest of the machine.

4. The machine of claim 3, wherein the fluid system is configured to transfer a beverage from the first receptacle directly to the exit bore when the beverage is to be dispensed.

5. The machine of claim 3, further comprising one or more thermoelectric units of the refrigeration system, each of the one or more thermoelectric units generating a cool side and a hot side when electricity is applied to the respective one or more thermoelectric units, wherein the cool side is configured to cool the second nest.

6. The machine of claim 3, further comprising a mixing paddle arranged in the first nest, the mixing paddle configured to distribute the beverage and facilitate quicker heat transfer.

7. The machine of claim 3, wherein the hot side of the thermoelectric units is configured to heat water in the fluid system.

8. The machine of claim 3, wherein the first recess of the first nest is frustoconically shaped.

9. The machine of claim 3, wherein the second recess of the second nest is frustoconically shaped.

10. The machine of claim 3, further comprising a mixing paddle arranged in the second nest.

11. The machine of claim 3, wherein the refrigeration system comprises a heater configured to heat a flow of water from a water tank.

12. The machine of claim 3, wherein the refrigeration system comprises a cooler configured to cool a flow of water or a tank of water.

13. The machine of claim 3, wherein the fluid system is fluidly connected to the second nest and is configured to transfer water to the second recess of the second nest.

14. The machine of claim 3, wherein the first recess of the first nest is defined by walls, wherein the refrigeration system is configured to cool the walls of the first recess.

15. The machine of claim 3, wherein the second recess is sized to receive a pod containing ingredients of a frozen confection or ingredients of a beverage.

16. The machine of claim 3, wherein the first recess is sized to receive a pod containing granulated ingredients of a cooled beverage or a hot beverage.

17. The machine of claim 3, further comprising a pod sensor arranged in the first nest, the pod sensor configured to detect a pod type of a pod in the first recess of the first nest and configured to transmit the pod type to a processing unit of the machine.

18. The machine of claim 17, wherein the processing unit of the machine is programmed to operate machine, wherein the processing unit performs operations, the operations comprising:
   determining a water temperature based on the type of pod sensed in the first recess of the first nest and
   instructing the fluid system to flow the water into the first recess of the first nest, wherein the water is at the determined temperature.

19. The machine of claim 3, further comprising a pod sensor arranged in the second nest, the pod sensor configured to detect a pod type of a pod in the second recess of the second nest and configured to transmit the pod type to a processing unit of the machine.

20. The machine of claim 19, wherein the processing unit of the machine is programmed to operate machine, wherein the processing unit performs operations, the operations comprising:
   determining a water temperature based on the type of pod sensed in the second recess of the second nest and
   instructing the fluid system to flow the water into the second recess of the second nest, wherein the water is at the determined temperature.

21. The machine of claim 3, wherein the second nest comprises a bore on a bottom surface of the second nest, wherein the bore communicates with an interior of the second recess.

22. The machine of claim 21, further comprising an exit bore mounted on the bottom surface of the second nest, aligned with the bore of the bottom surface of the second nest, wherein the exit bore communicates with an interior of the second recess.

23. The machine of claim 3, further comprising an air delivery assembly fluidly connected to the first nest and fluidly connected to the second nest, wherein the air delivery assembly is configured to inject air into a pod in the first recess of the first nest, into a pod in the second recess of the second nest, or into both a pod in the second recess and a pod in the first recess.

* * * * *